US012521358B2

(12) United States Patent
Iida et al.

(10) Patent No.: US 12,521,358 B2
(45) Date of Patent: Jan. 13, 2026

(54) METHOD FOR SELECTING CANCER PATIENTS FOR WHOM COMBINATION THERAPY WITH RETINOID AND CANCER THERAPEUTIC AGENT IS EFFECTIVE, AND COMBINATION MEDICAMENT WITH RETINOID AND CANCER THERAPEUTIC AGENT

(71) Applicant: RaQualia Pharma Inc., Aichi (JP)

(72) Inventors: Tadashi Iida, Aichi (JP); Atsushi Enomoto, Aichi (JP); Yasuyuki Mizutani, Aichi (JP); Masahide Takahashi, Aichi (JP); Mitsuhiro Fujishiro, Aichi (JP); Hiroki Kawashima, Aichi (JP); Yoshihisa Matsukawa, Aichi (JP); Takayuki Owaki, Aichi (JP)

(73) Assignee: RaQualia Pharma Inc., Aichi (JP)

( * ) Notice: Subject to any disclaimer, the term of this patent is extended or adjusted under 35 U.S.C. 154(b) by 0 days.

(21) Appl. No.: 18/010,686

(22) PCT Filed: Jun. 28, 2021

(86) PCT No.: PCT/JP2021/024382
§ 371 (c)(1),
(2) Date: Dec. 15, 2022

(87) PCT Pub. No.: WO2021/261601
PCT Pub. Date: Dec. 30, 2021

(65) Prior Publication Data
US 2023/0301950 A1 Sep. 28, 2023

(30) Foreign Application Priority Data

Jun. 26, 2020 (JP) ................................ 2020-110560
May 6, 2021 (JP) ................................ 2021-078852

(51) Int. Cl.
*A61K 31/192* (2006.01)
*A61K 31/203* (2006.01)
*A61K 45/06* (2006.01)
*A61K 48/00* (2006.01)
*A61P 35/00* (2006.01)
*C12Q 1/6841* (2018.01)
*G01N 33/574* (2006.01)

(52) U.S. Cl.
CPC .......... *A61K 31/192* (2013.01); *A61K 31/203* (2013.01); *A61K 45/06* (2013.01); *A61K 48/0058* (2013.01); *A61P 35/00* (2018.01); *C12Q 1/6841* (2013.01); *G01N 33/57438* (2013.01); *G01N 2474/20* (2021.08)

(58) Field of Classification Search
None
See application file for complete search history.

(56) References Cited

U.S. PATENT DOCUMENTS

| 8,686,052 B2 * | 4/2014 | Niitsu .................. A61K 31/713 514/44 A |
| 2010/0144659 A1 | 6/2010 | Niitsu et al. |
| 2014/0127187 A1 | 5/2014 | Niitsu et al. |
| 2017/0079942 A1 | 3/2017 | Kurisaki et al. |
| 2020/0061007 A1 | 2/2020 | Kurisaki et al. |

FOREIGN PATENT DOCUMENTS

| JP | 2017-048225 | 3/2017 |
| WO | 2015/178426 | 11/2015 |
| WO | 2020/024017 | 2/2020 |

OTHER PUBLICATIONS

Berdiel-Acer et al. (Molecular Oncology 8 (2014) 1290-1305) (Year: 2014).*
Atsushi Enomoto, "True Nature of Cancer Mechanobiology of Cancer Stroma Reveals", Significance of the mechanobiology of cancer stroma in understanding cancer, Experimental Medicine vol. 38 No. 7 (Special Edition) 2020, pp. 100 (1160)-106 (1166).
English Translation of Written Opinion of the International Searching Authority mailed Sep. 14, 2021 in International (PCT) Application No. PCT/JP2021/024382, pp. 1-3.
Written Opinion filed by the Applicant dated Jun. 30, 2023 in Japanese Patent Application No. 2022-532558, with machine English translation, pp. 1-2.
Written Amendment filed by the Applicant dated Jun. 30, 2023 in Japanese Patent Application No. 2022-532558, with machine English translation, pp. 1-4.
Decision to Grant a Patent dated Jul. 3, 2023 in Japanese Patent Application No. 2022-532558, with machine English translation, pp. 1-4.
Notice of Reasons for Refusal dated Apr. 26, 2023 in Japanese Patent Application No. 2022-532558, with machine English translation, pp. 1-2.
Yasuyuki Mizutani et al., "Meflin-Positive Cancer-Associated Fibroblasts Inhibit Pancreatic Carcinogenesis", Cancer Research, 2019, 79:5367-5381.
Yuki Miyai et al., "Cancer-associated fibroblasts that restrain cancer progression: Hypotheses and perspectives", Cancer Science, 2020, 111:1047-1057.
Extended European Search Report issued Feb. 14, 2024 in corresponding European Patent Application No. 21830069.7.
Elisa D'Arcangelo et al., "The life cycle of cancer-associated fibroblasts within the tumour stroma and its importance in disease outcome", British Journal of Cancer, vol. 122, No. 7 (Jan. 29, 2020), pp. 931-942.

(Continued)

*Primary Examiner* — Sharon X Wen
(74) *Attorney, Agent, or Firm* — Wenderoth, Lind & Ponack, L.L.P.

(57) ABSTRACT

The present invention provides a method for selecting a cancer patient for whom a combination therapy with a retinoid and a cancer treatment agent is effective, which comprises a step of selecting a cancer patient having a malignant tumor with the infiltration of cancer-associated fibroblasts in the stroma. In addition, the present invention provides a medicament which comprises a cancer patient having a malignant tumor with the infiltration of cancer-associated fibroblasts in the stroma is a subject and is administered in combination of a retinoid and a cancer therapeutic agent.

14 Claims, 32 Drawing Sheets

(56) References Cited

OTHER PUBLICATIONS

International Search Report dated Sep. 14, 2021 in International (PCT) Application No. PCT/JP2021/024382.
Enomoto, A., "True Nature of Cancer Mechanobiology of Cancer Stroma Reveals", Significance of the mechanobiology of cancer stroma in understanding cancer, Experimental Medicine, May 1, 2020, vol. 38, No. 7, pp. 1160-1166, with English translation.
Mizutani, Y., et al., "Meflin-Positive Cancer-Associated Fibroblasts Inhibit Pancreatic Carcinogenesis", Cancer Research, Oct. 15, 2019, vol. 79, No. 20, pp. 5367-5381.
Miyai, Y., et al., "Cancer-associated fibroblasts that restrain cancer progression: Hypotheses and perspectives", Cancer Science, Feb. 14, 2020, vol. 111, No. 4, pp. 1047-1057.
Madden, J.I., Press Release, "Infinity Reports Update From Phase 2 Study of Saridegib Plus Gemcitabine in Patients With Metastatic Pancreatic Cancer", Infinity Pharmaceuticals, Jan. 27, 2012, 3 pages, https://www.sec.gov/Archives/edgar/data/1113148/000119312512026049/d290658dex991.htm.
Özdemir, B.C., et al., "Depletion of Carcinoma-Associated Fibroblasts and Fibrosis Induces Immunosuppression and Accelerates Pancreas Cancer with Reduced Survival", Cancer Cell, Jun. 16, 2014, vol. 25, pp. 719-734.
Rhim, A.D., et al., "Stromal Elements Act to Restrain, Rather Than Support, Pancreatic Ductal Adenocarcinoma", Cancer Cell, Jun. 16, 2014, vol. 25, pp. 735-747.
Jaster, R., et al., "Regulation of pancreatic stellate cell function in vitro: biological and molecular effects of all-trans retinoic acid", Biochemical Pharmacology, Aug. 15, 2003, vol. 66, No. 4, pp. 633-641.
McCarroll, J.A, et al., "Vitamin A inhibits pancreatic stellate cell activation: implications for treatment of pancreatic fibrosis", Gut, Jan. 2006, vol. 55, No. 1, pp. 79-89.
Froeling, F.E.M, et al., "Retinoic Acid-Induced Pancreatic Stellate Cell Quiescence Reduces Paracrine Wnt-β-Catenin Signaling to Slow Tumor Progression", Gastroenterology, Oct. 2011, vol. 141, No. 4, pp. 1486-1497.
Sherman, M.H., et al., "Vitamin D Receptor-Mediated Stromal Reprogramming Suppresses Pancreatitis and Enhances Pancreatic Cancer Therapy", Cell, Sep. 25, 2014, vol. 159, No. 1, pp. 80-93 (pp. 1-14).
Chronopoulos, A., et al., "ATRA mechanically reprograms pancreatic stellate cells to suppress matrix remodelling and inhibit cancer cell invasion", Nature Communications, Sep. 7, 2016, 7:12630, doi: 10.1038/ncomms12630, pp. 1-12.
English translation of International Preliminary Report on Patentability mailed Jan. 5, 2023 in International (PCT) Application No. PCT/JP2021/024382.

\* cited by examiner

[Figure 1]
Anaplastic carcinoma
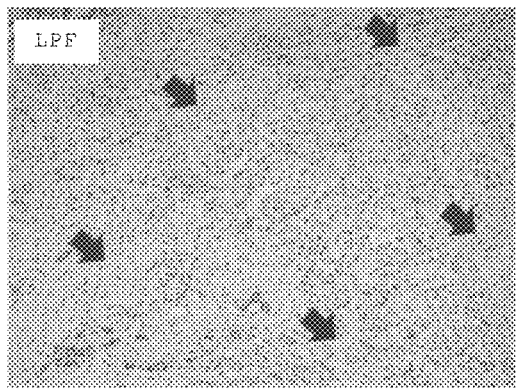
LPF: Low Power Field
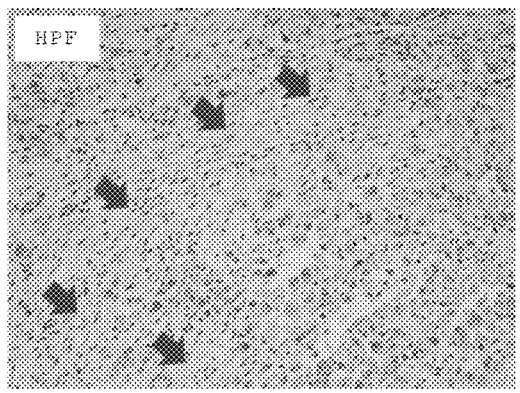
HPF: High Power Field
[Figure 2]
Intrapancreatic papillary mucinous adenoma (invasive cancer)
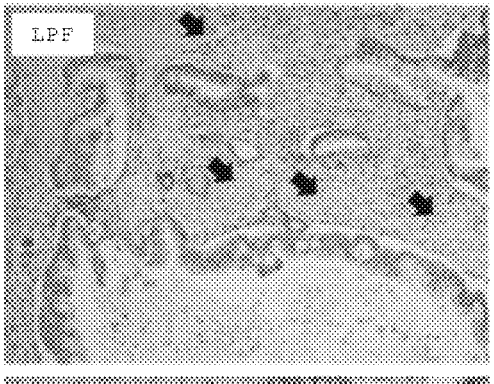
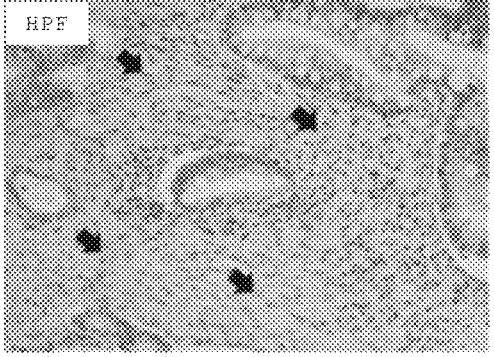

[Figure 3]
Tubular adenocarcinoma (case 1)
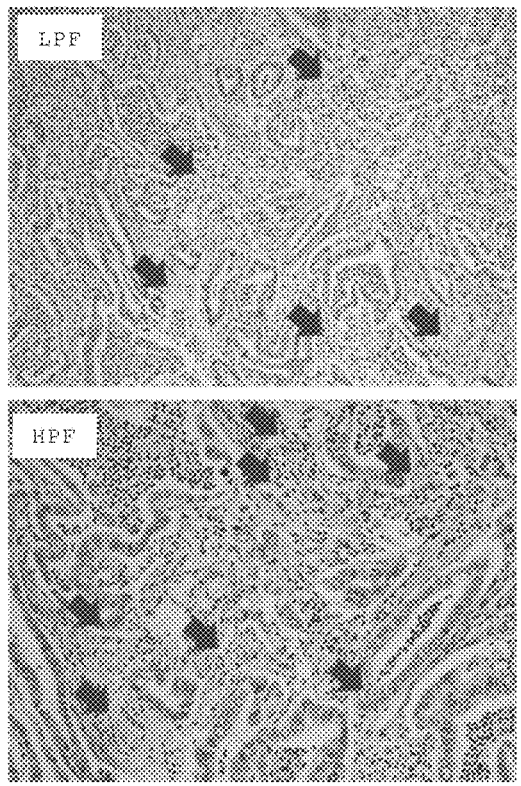
[Figure 4]
Tubular adenocarcinoma (case 2)
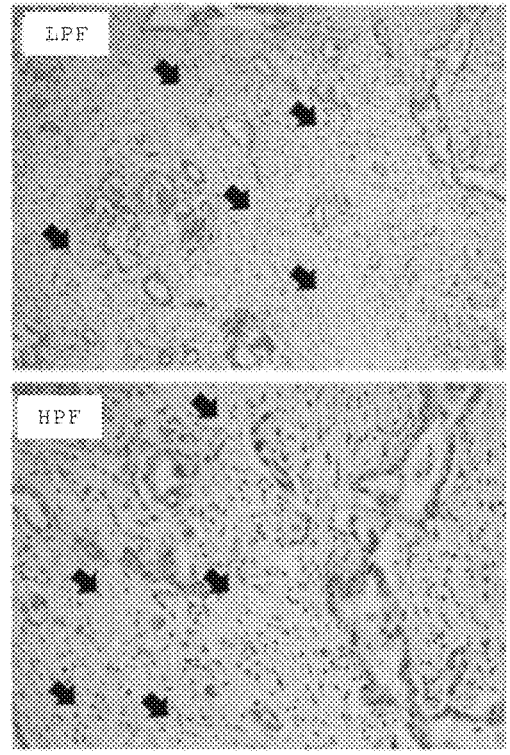

[Figure 5]
Acinar cell carcinoma (case 1)
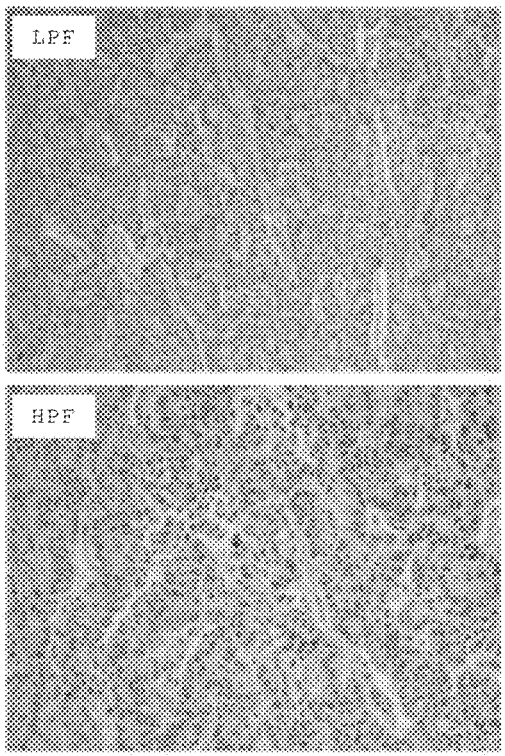
[Figure 6]
Acinar cell carcinoma (case 2)
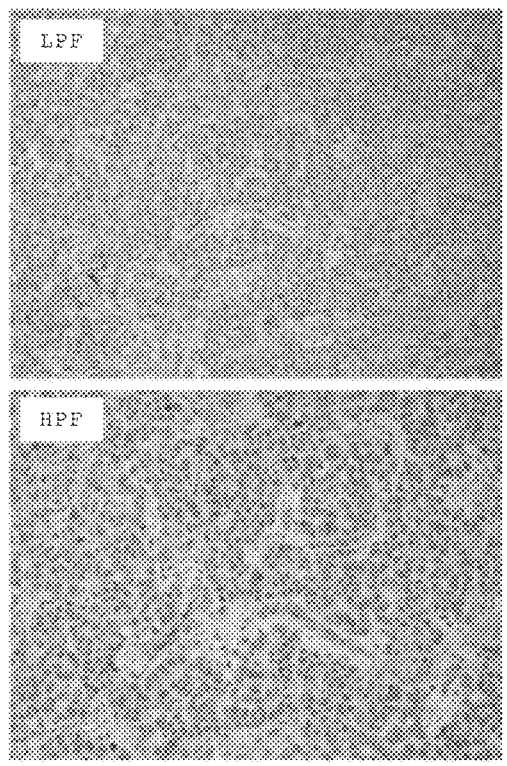

[Figure 7]
Intrapancreatic papillary mucinous adenoma (non-invasive cancer)
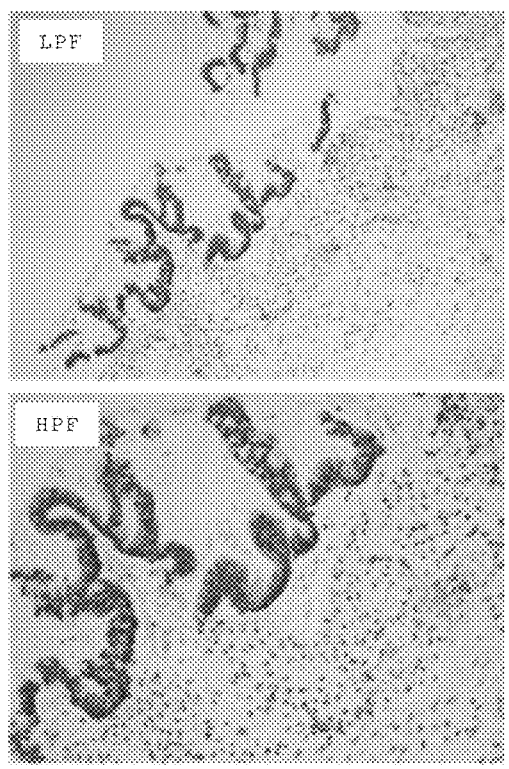
[Figure 8]
Intrapancreatic papillary mucinous adenoma (IPMA)
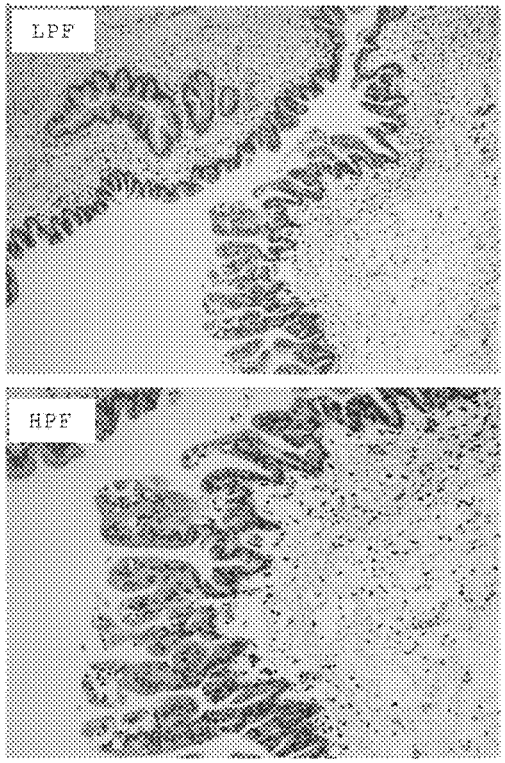

[Figure 9]
Mucous cyst tumor
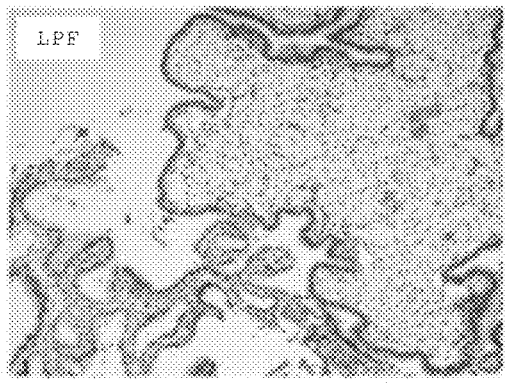
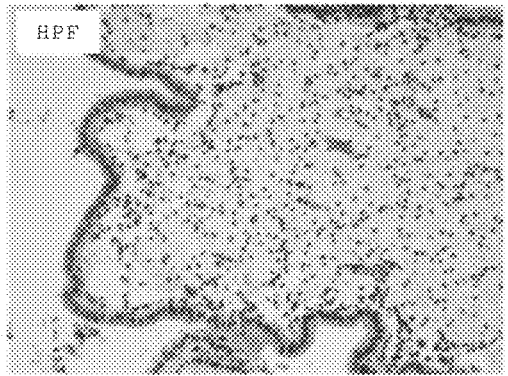
[Figure 10]
Neuroendocrine tumor (G1, insulinoma)
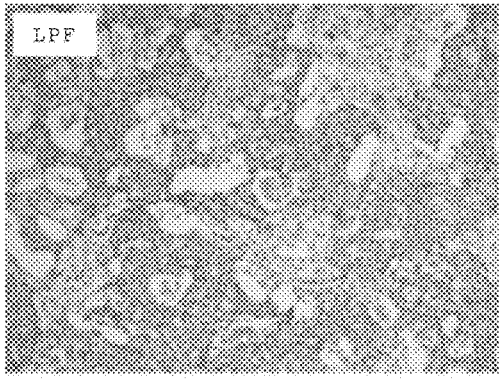
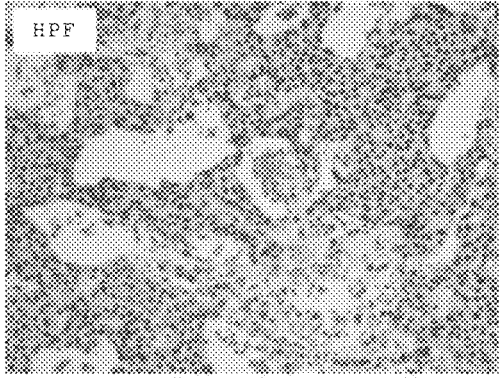

[Figure 11]
Neuroendocrine tumor (G1, gastrinoma)
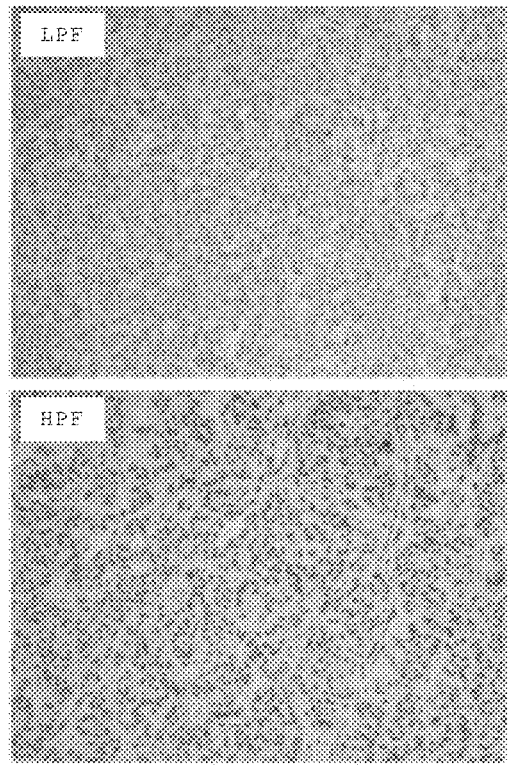
[Figure 12]
Pancreatic intraepithelial neoplastic lesion (PanIN)
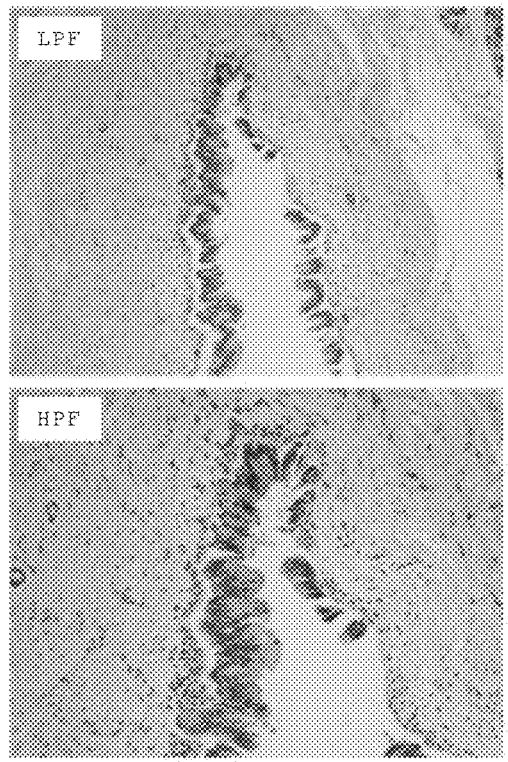

[Figure 13]
Serous cystadenoma
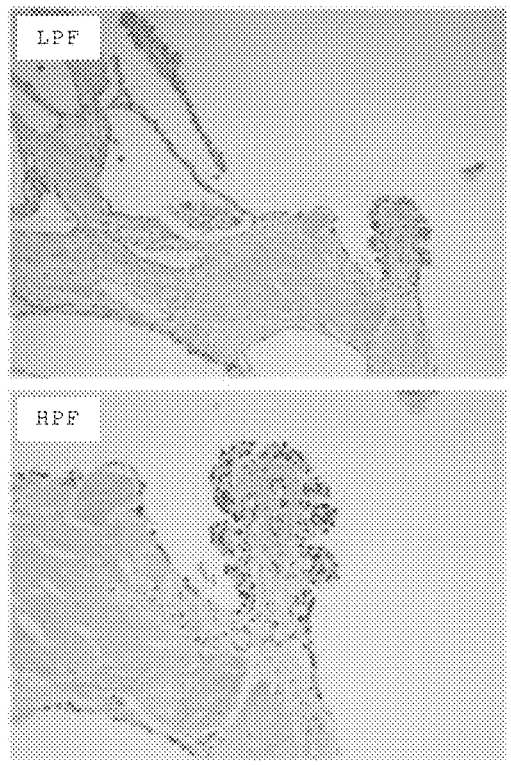
[Figure 14]
Solid pseudopapillary neoplasm (SPN)
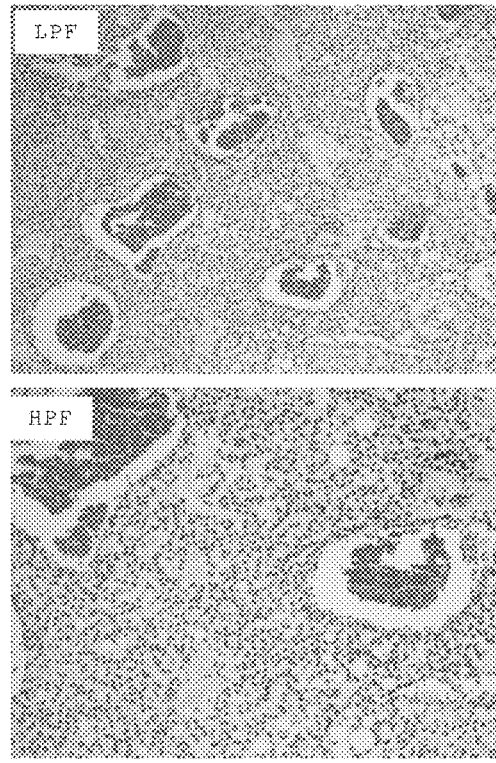

[Figure 15]
Tubular adenocarcinoma
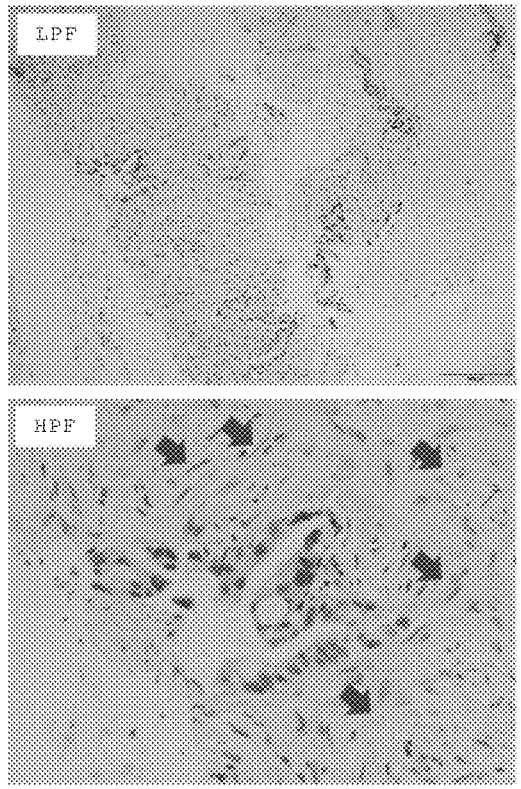
[Figure 16]
Anaplastic carcinoma
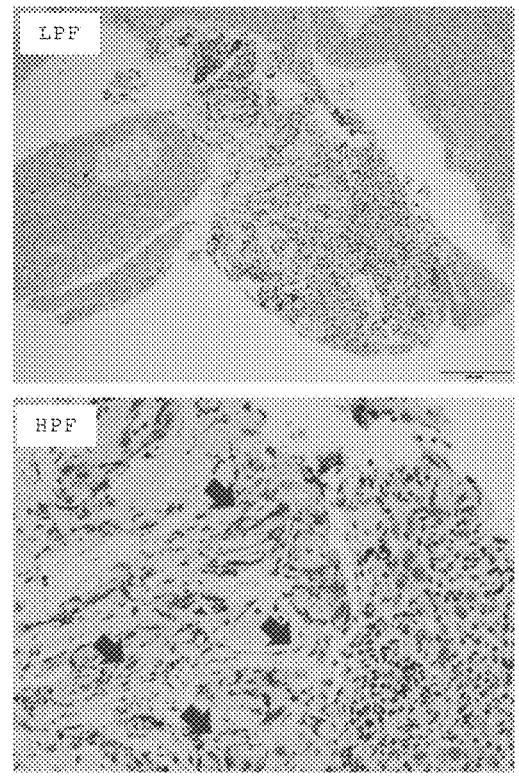

[Figure 17]
Intrapancreatic papillary mucosal adenocarcinoma (invasive cancer)
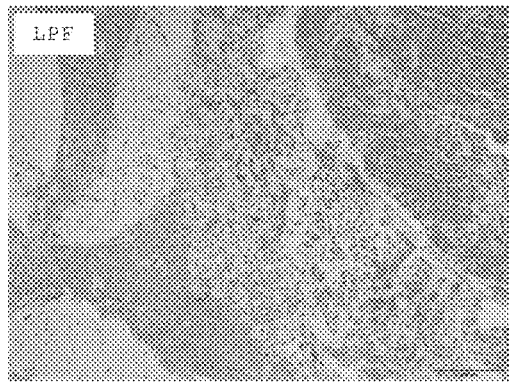
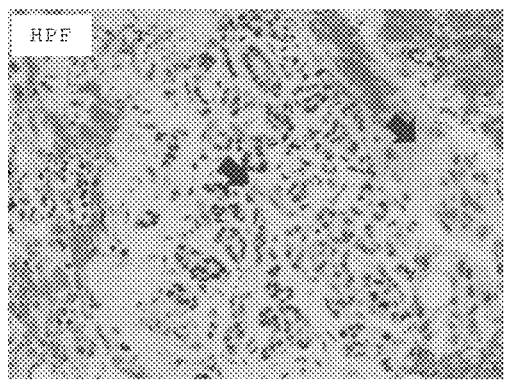
[Figure 18]
Acinar cell carcinoma
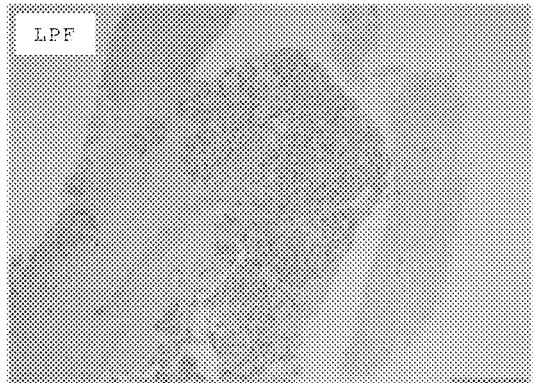
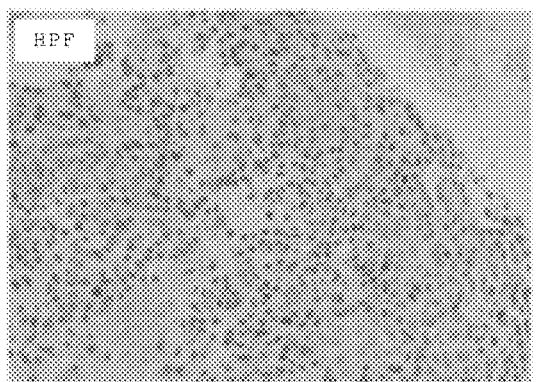

[Figure 19]
Solid pseudopapillary neoplasm (SPN)
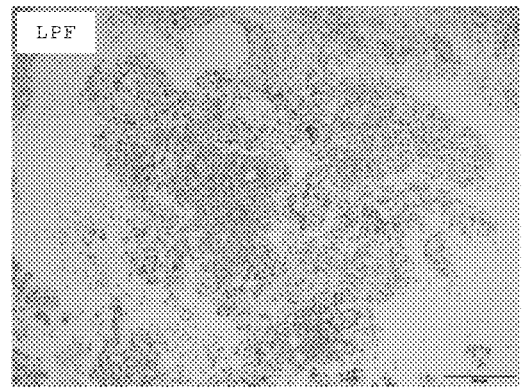
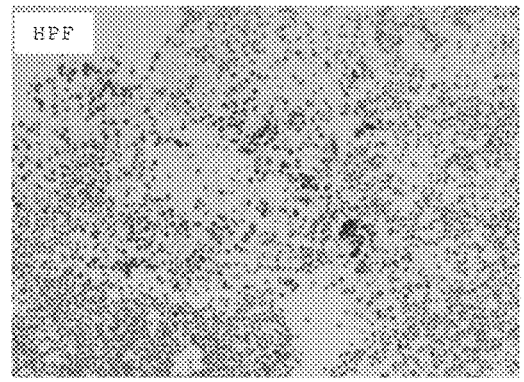
[Figure 20]
Neuroendocrine tumor
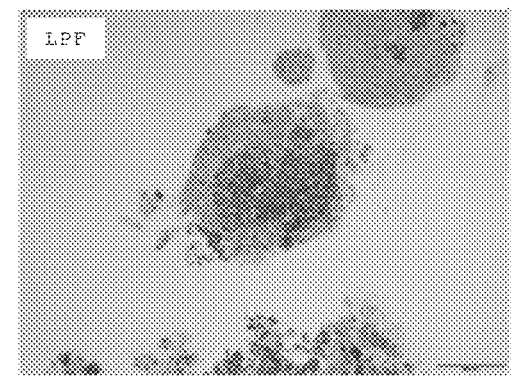
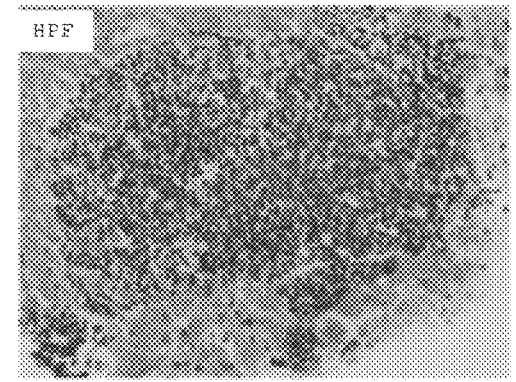

[Figure 21]
Intrapancreatic papillary mucinous adenoma (IPMA)
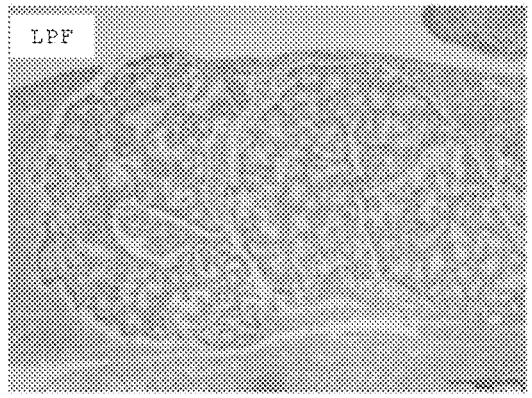
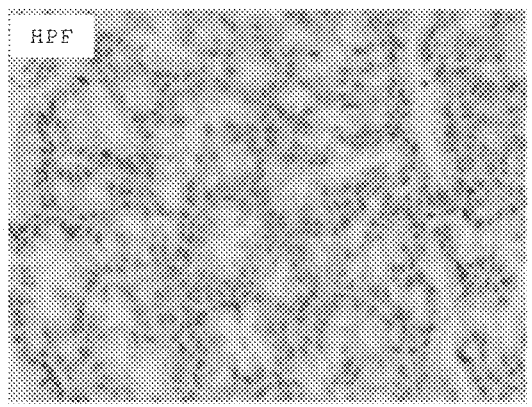
[Figure 22]
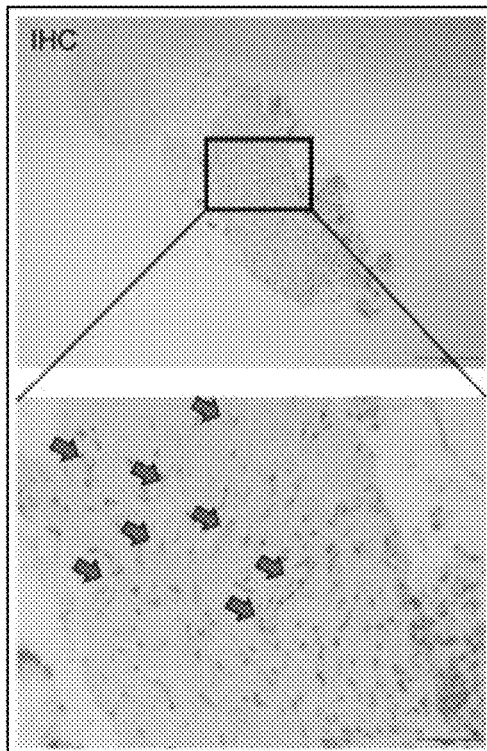
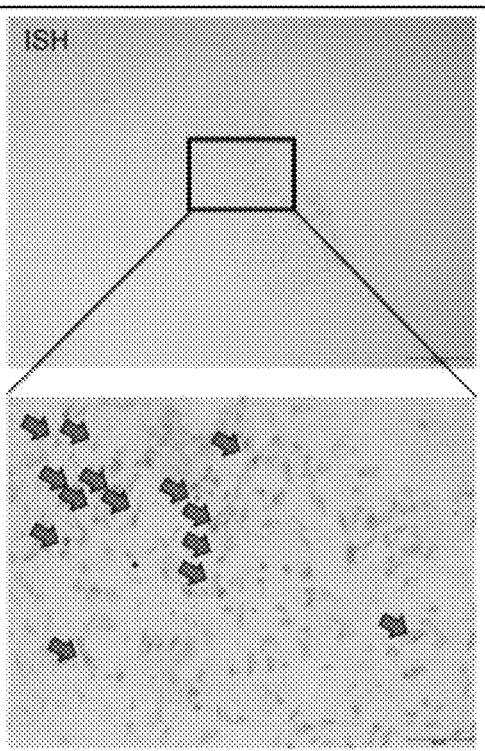

[Figure 23]
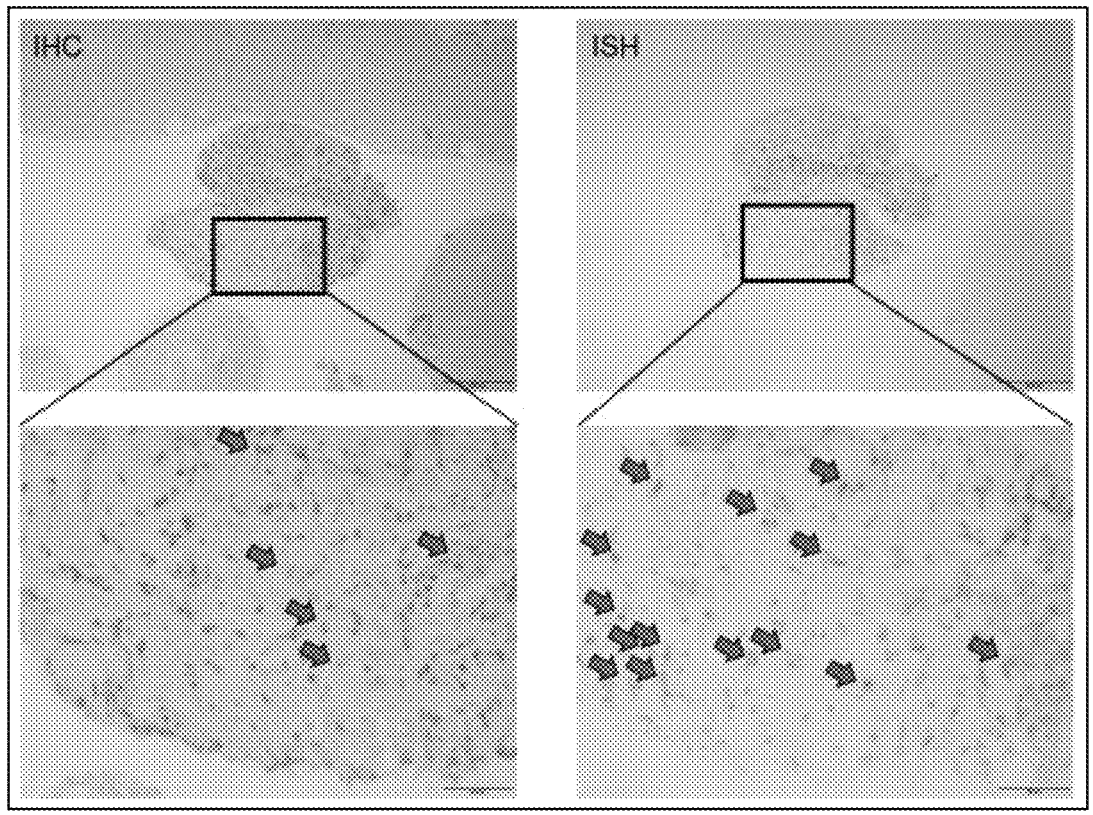
[Figure 24]
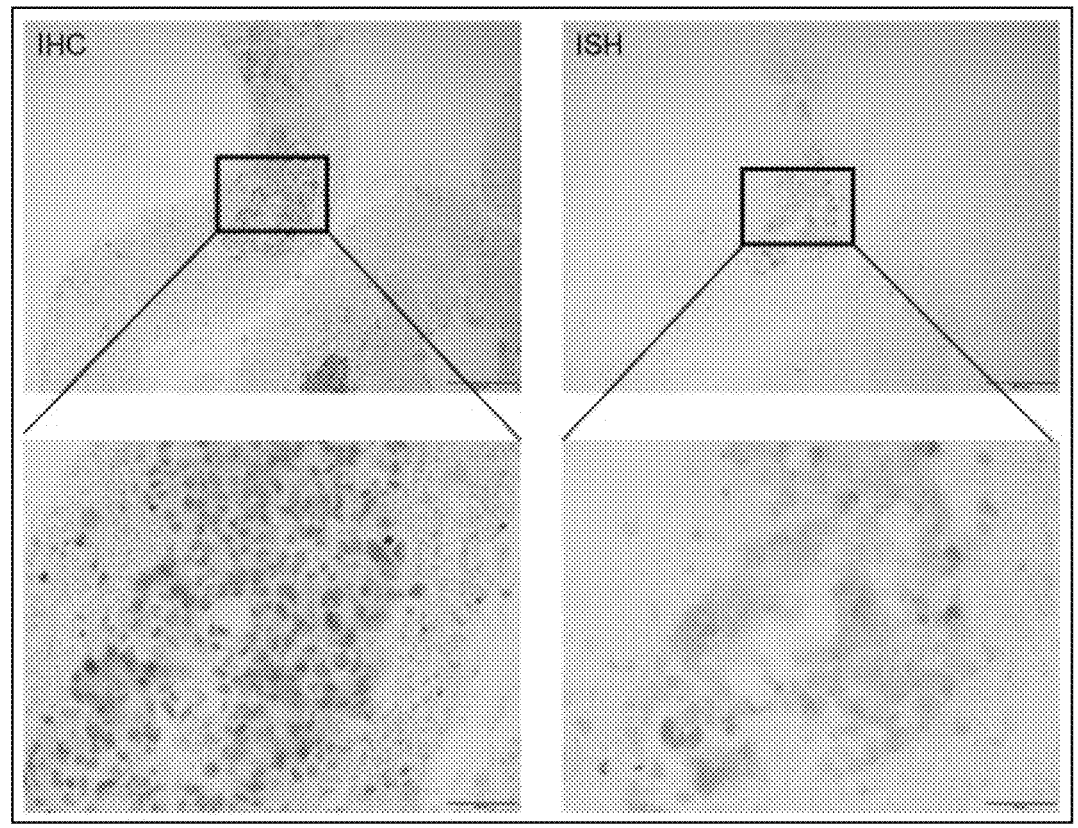

[Figure 25]
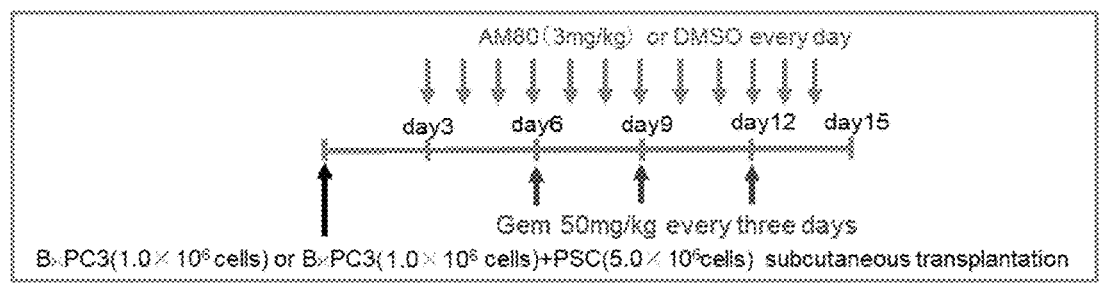
[Figure 26]
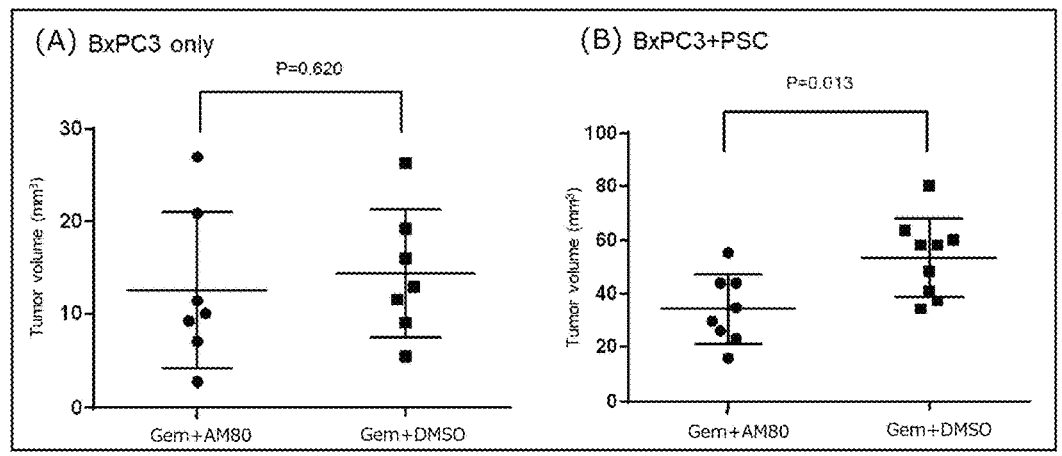
[Figure 27]
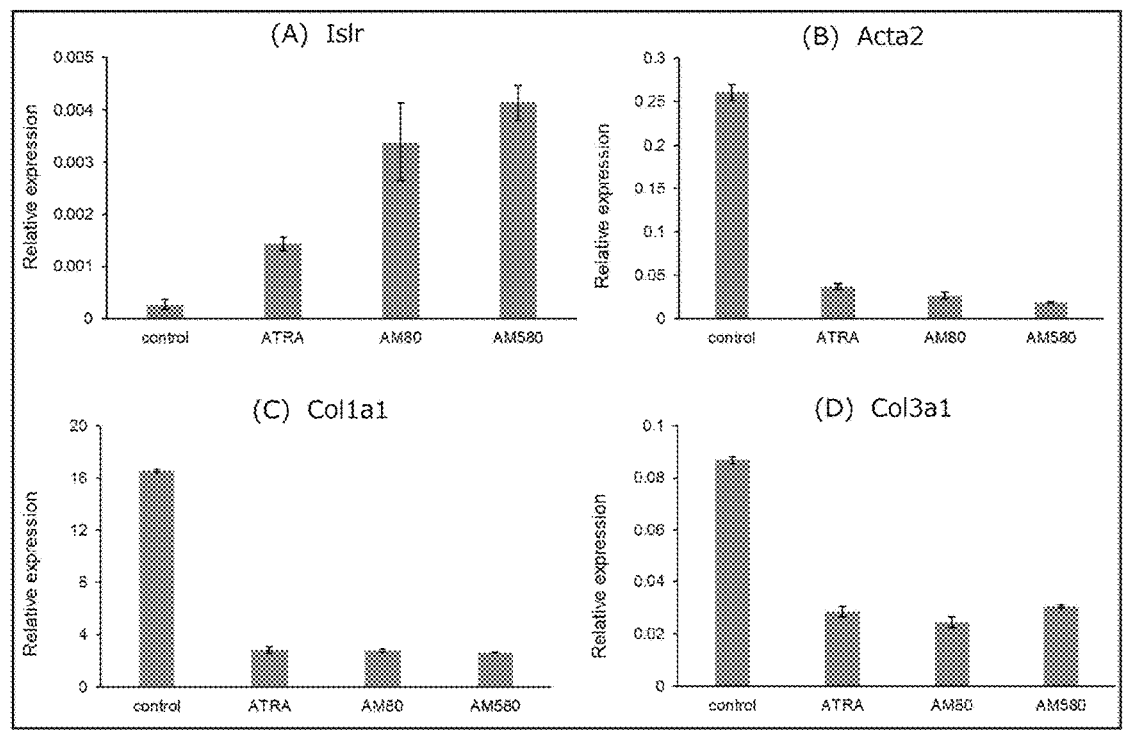

[Figure 28]
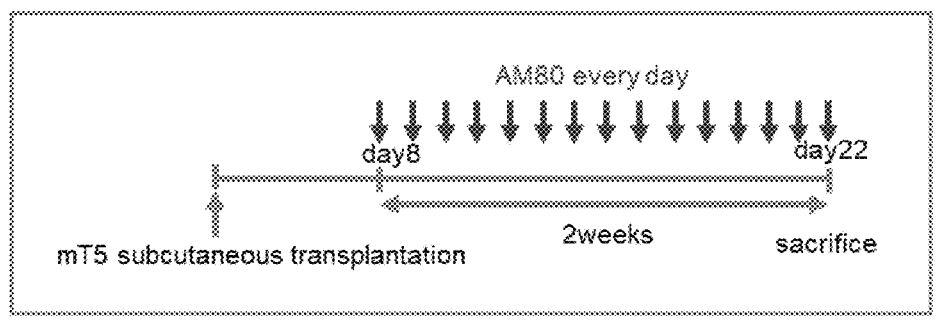
[Figure 29]
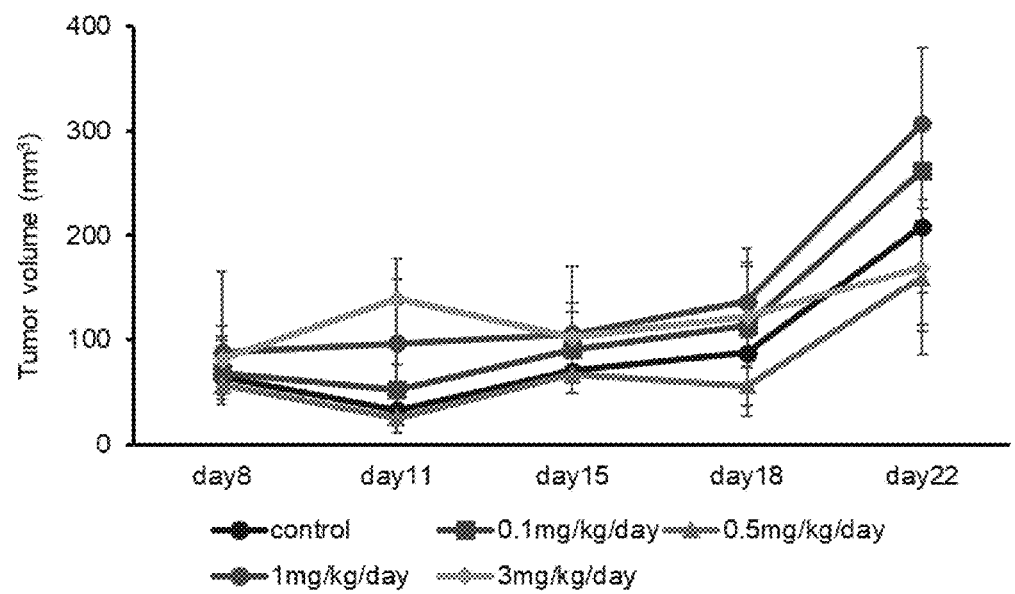

[Figure 30]
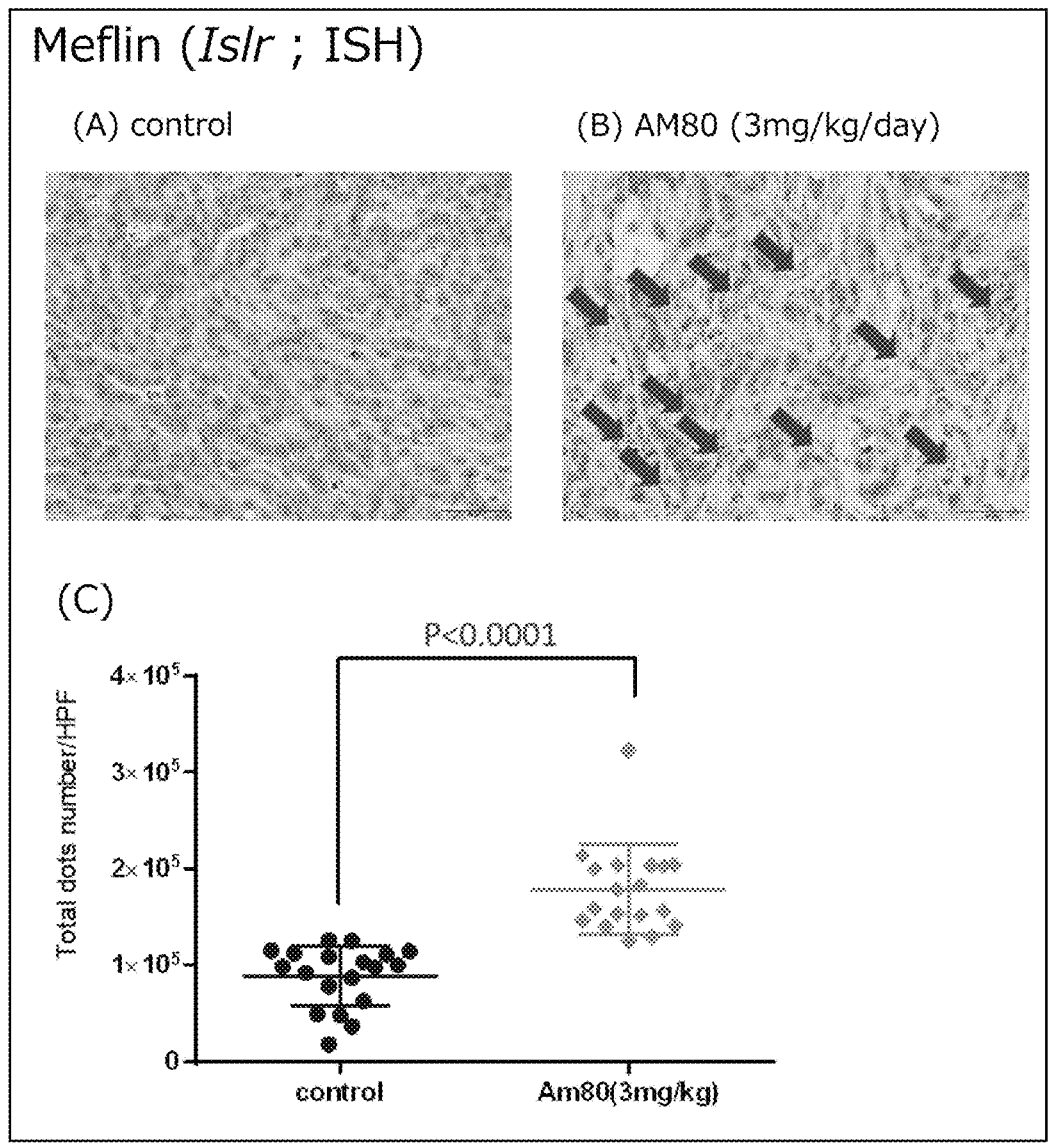

[Figure 31]
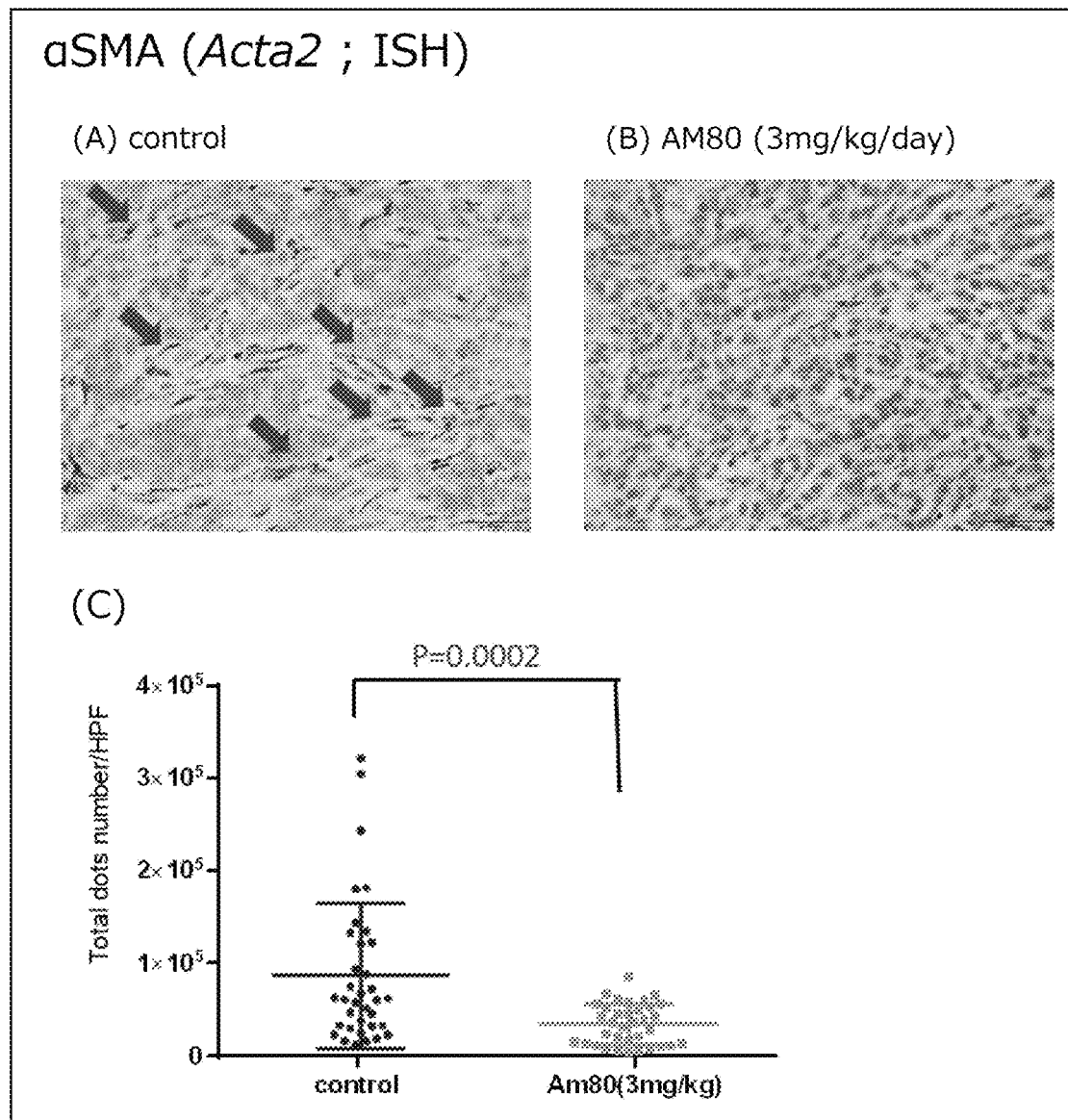

[Figure 32]
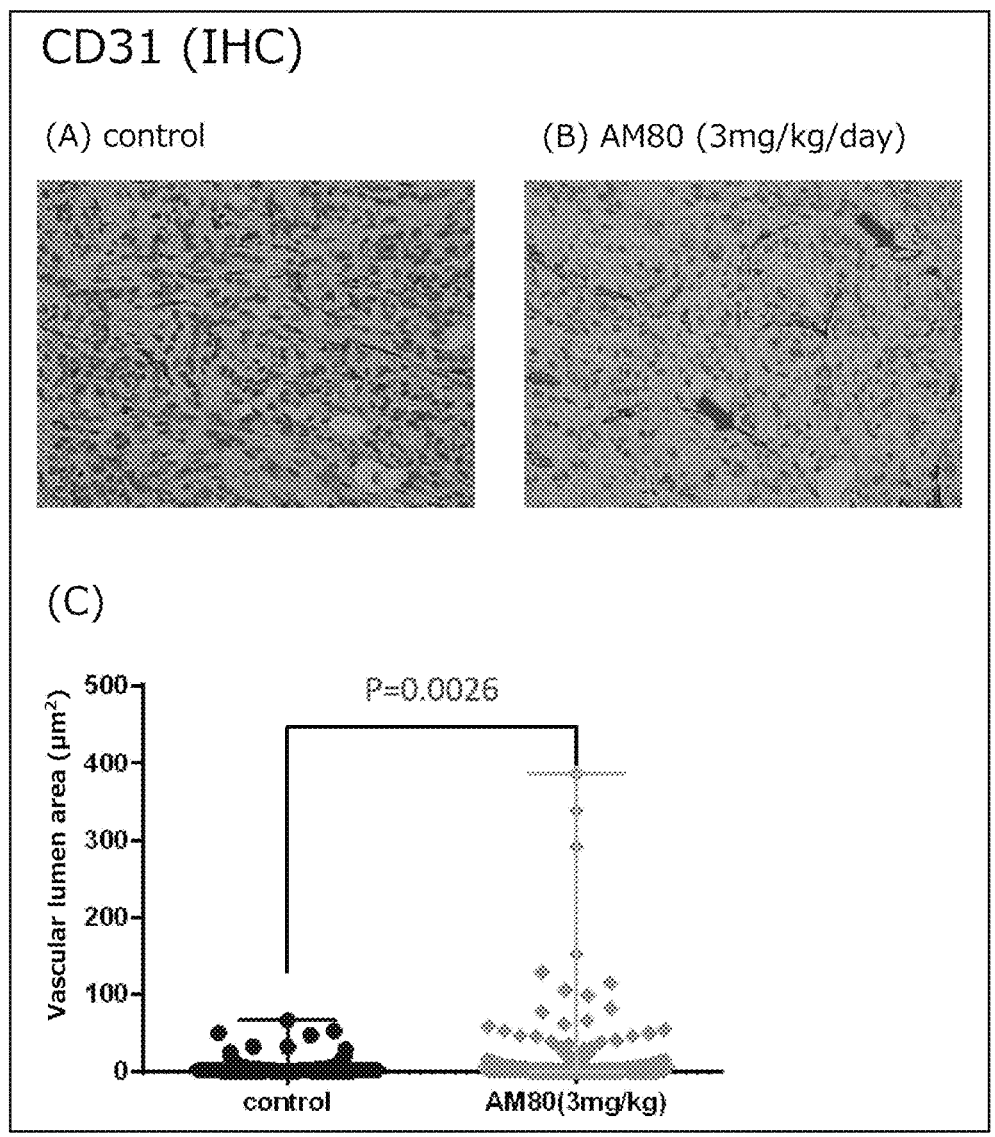
[Figure 33]
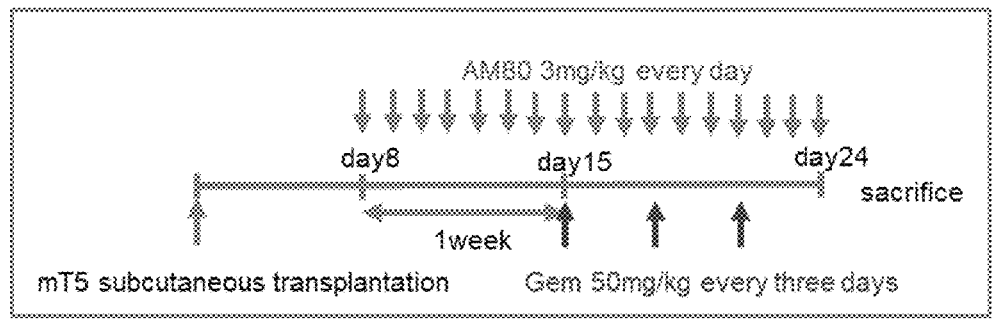

[Figure 34]
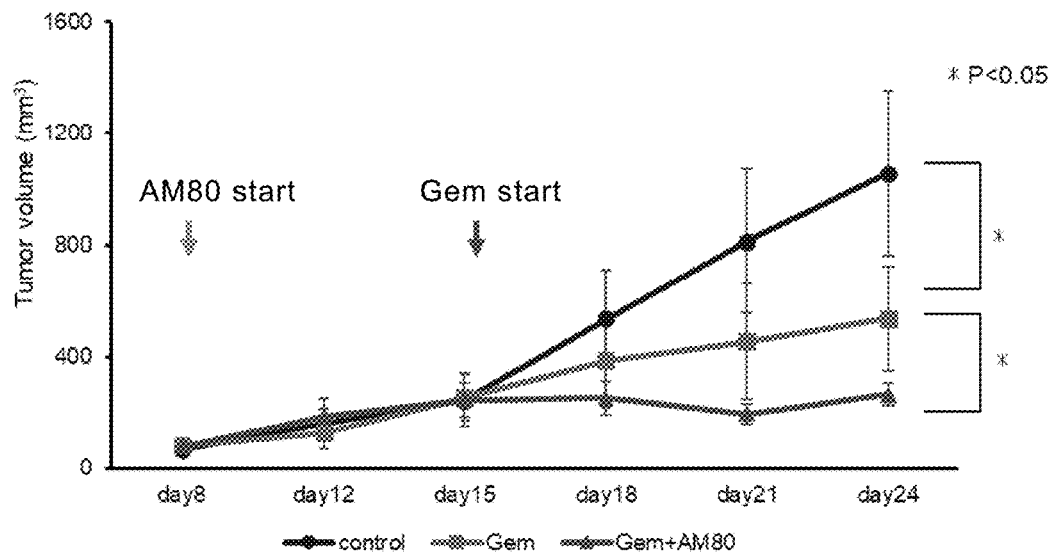
[Figure 35]
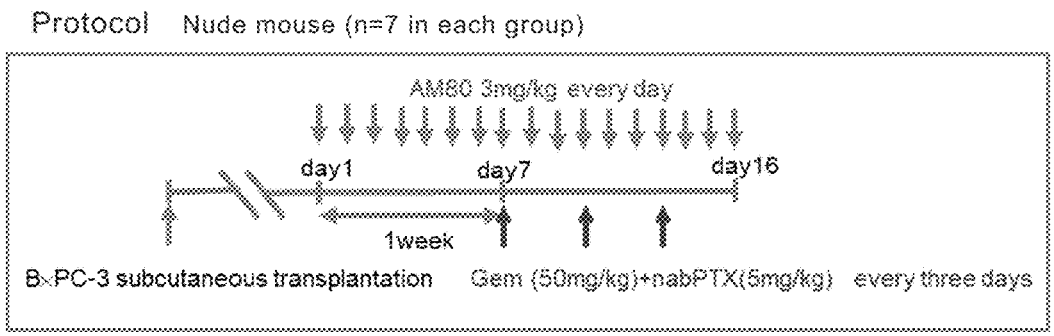
[Figure 36]
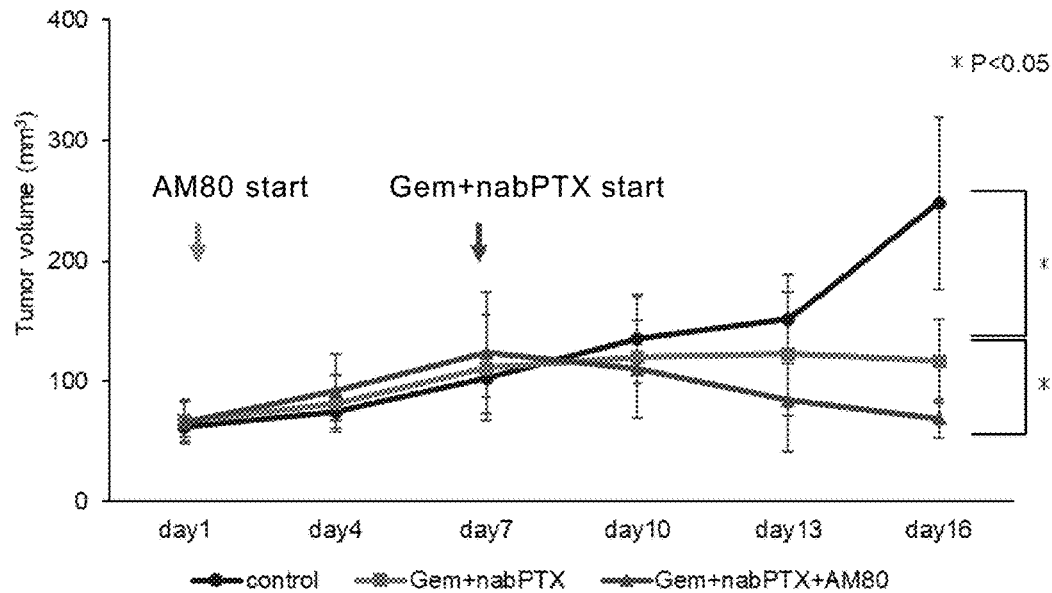

[Figure 37]
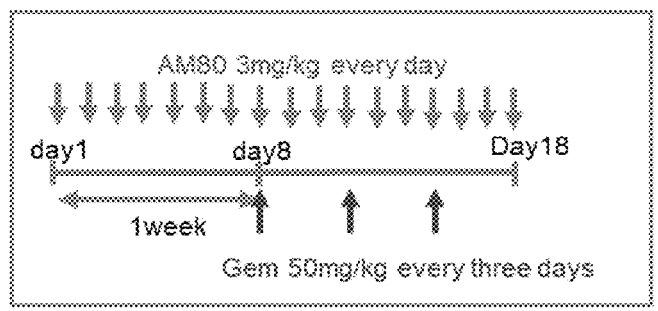
Protocol  KPC mouse (n=5 in each group)
[Figure 38]
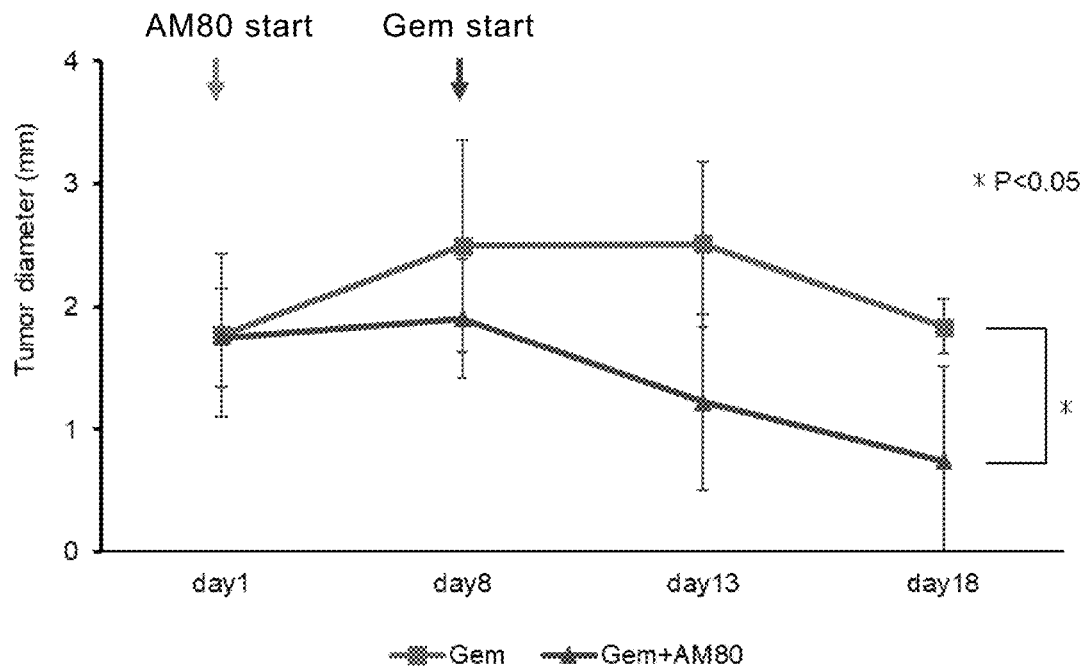
[Figure 39]
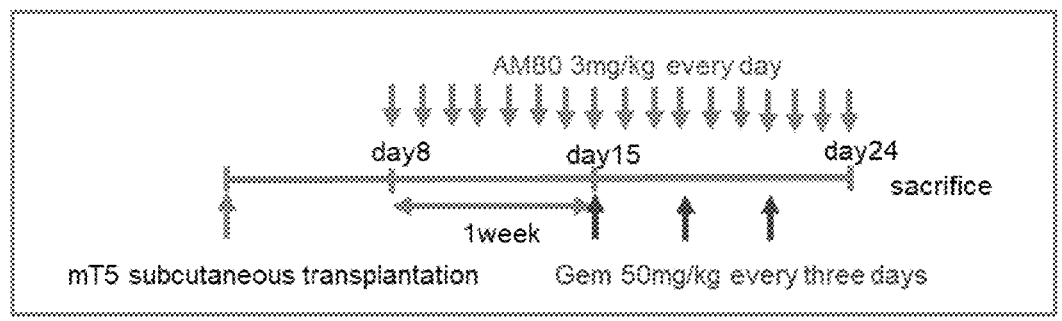
Protocol  Meflin KO mouse (n=6 in each group)

[Figure 40]
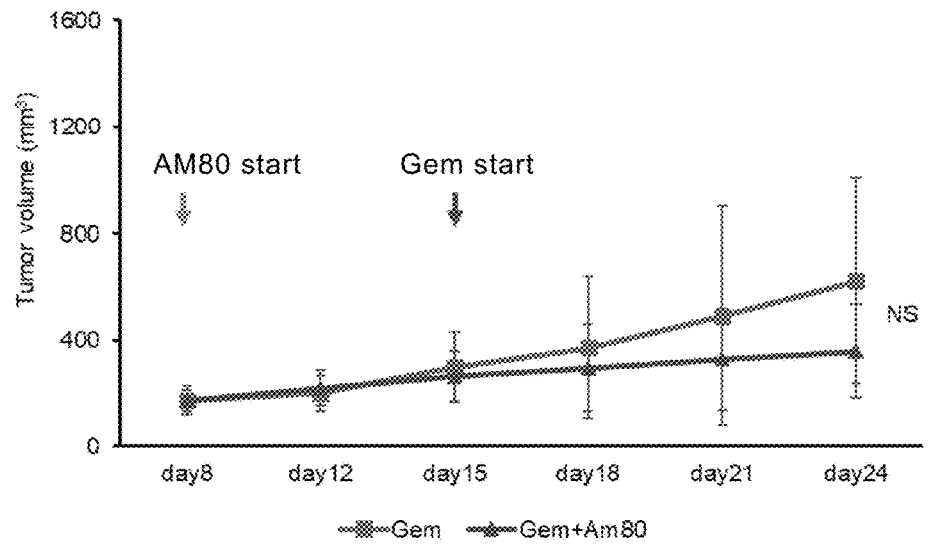
[Figure 41]
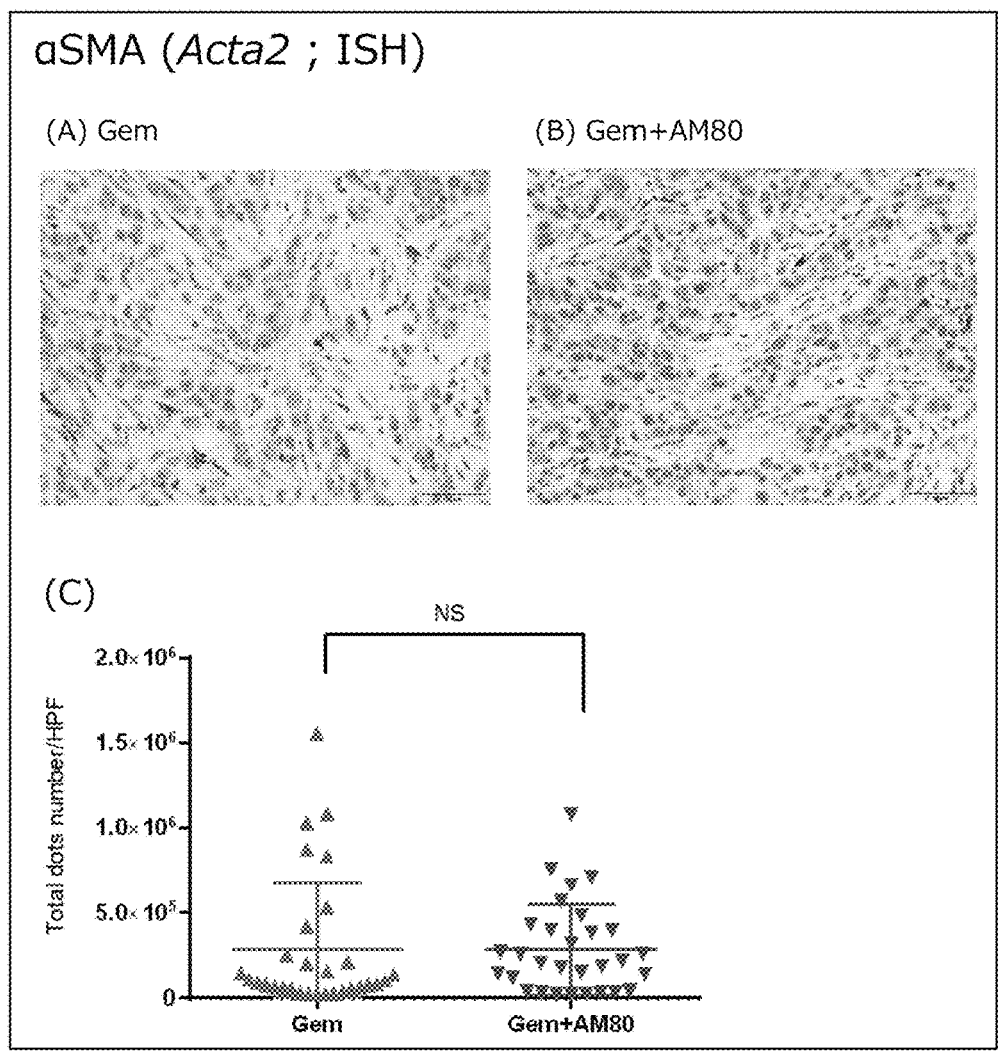

[Figure 42]
Protocol   C57/BL6J mouse (n=7 in each group)
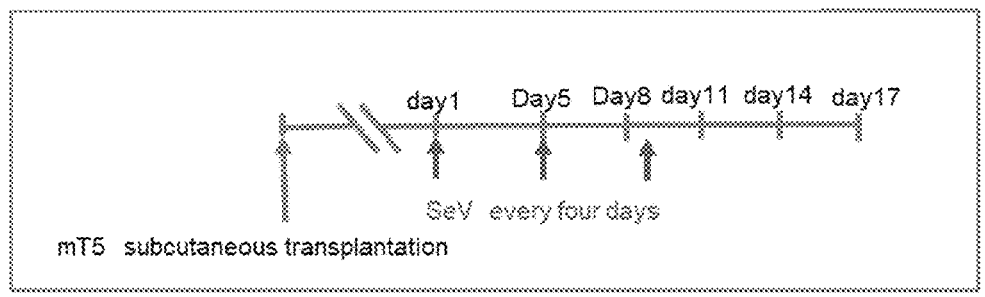
[Figure 43]
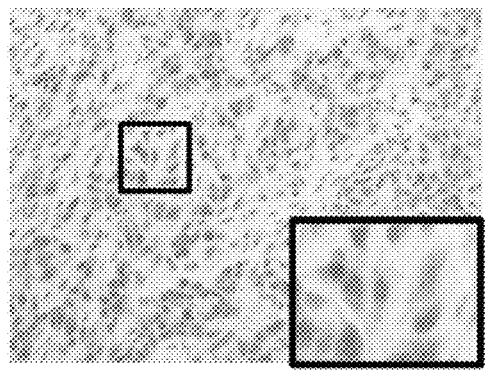
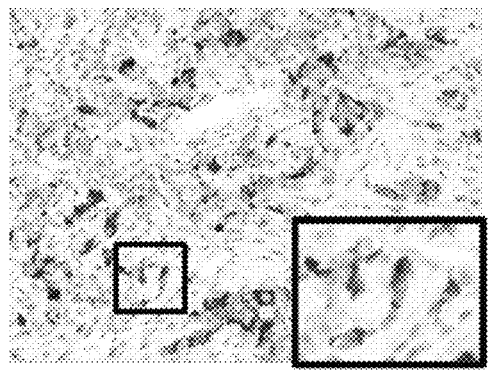
[Figure 44]
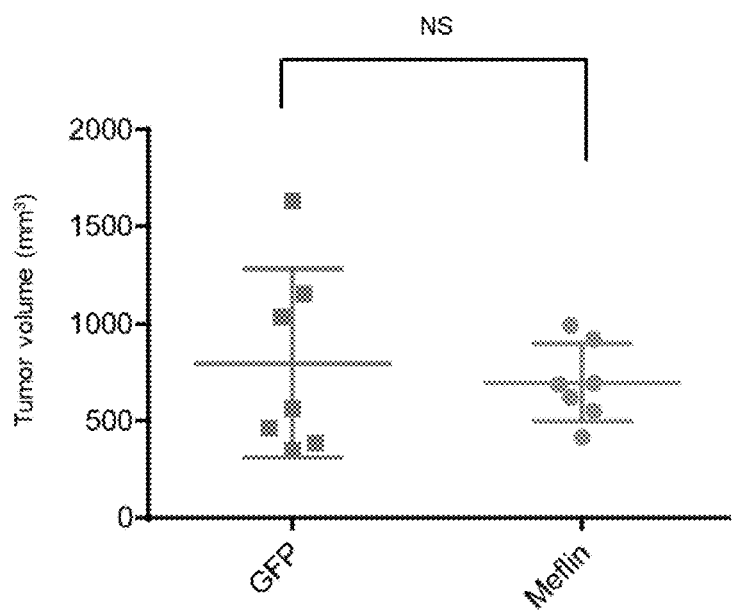

[Figure 45]
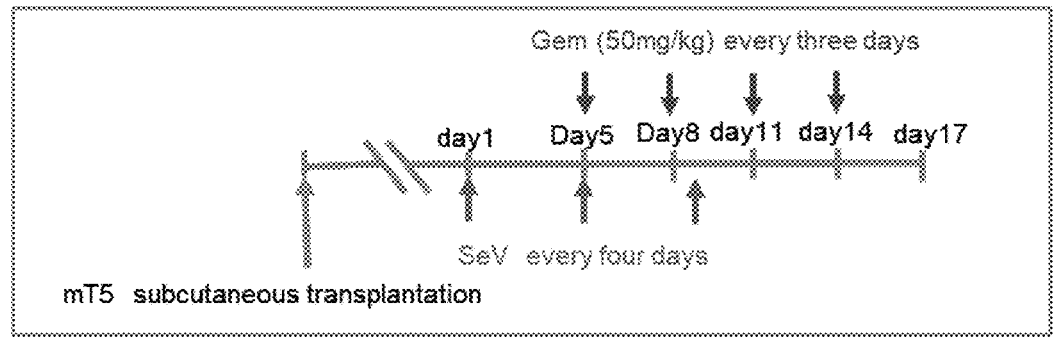
[Figure 46]
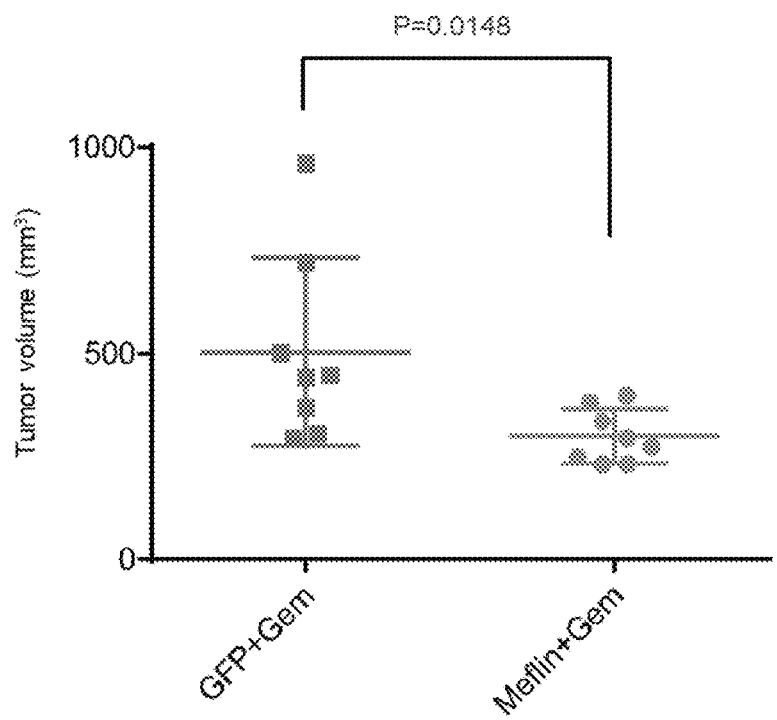

[Figure 47]
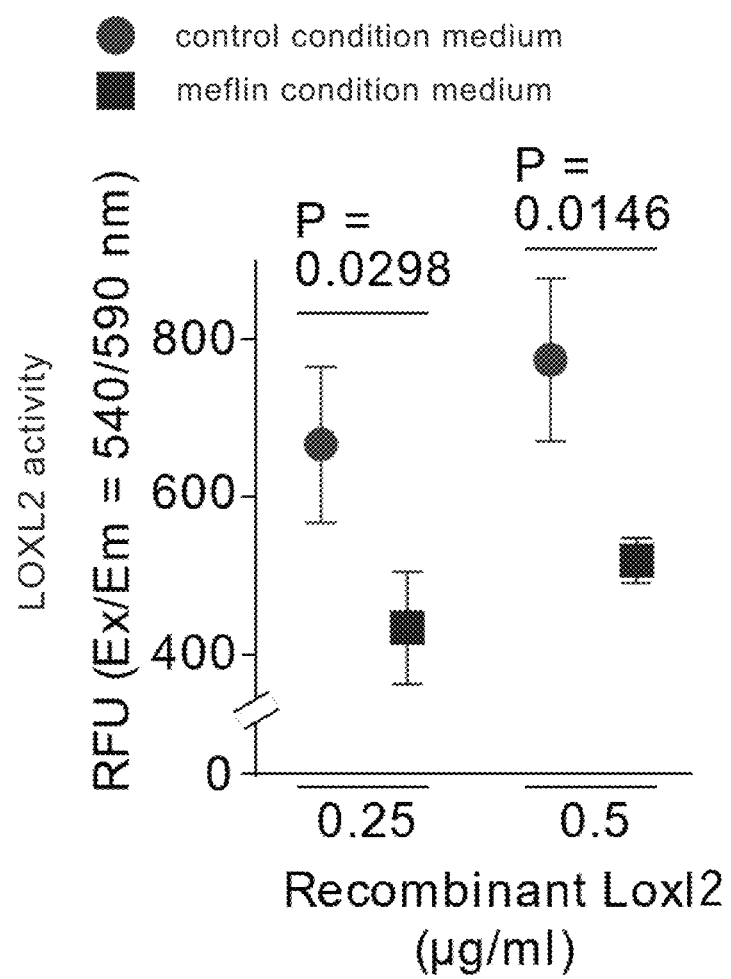

[Figure 48]
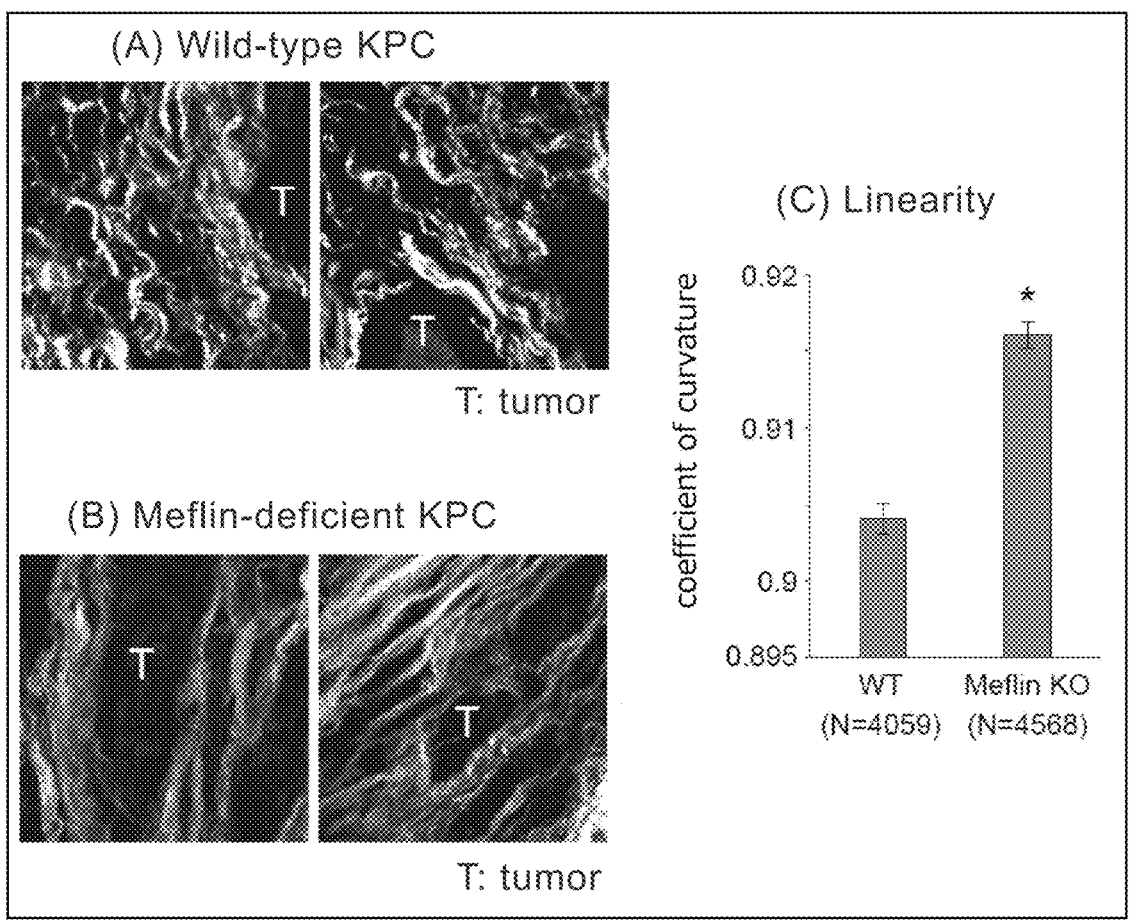

[Figure 49]
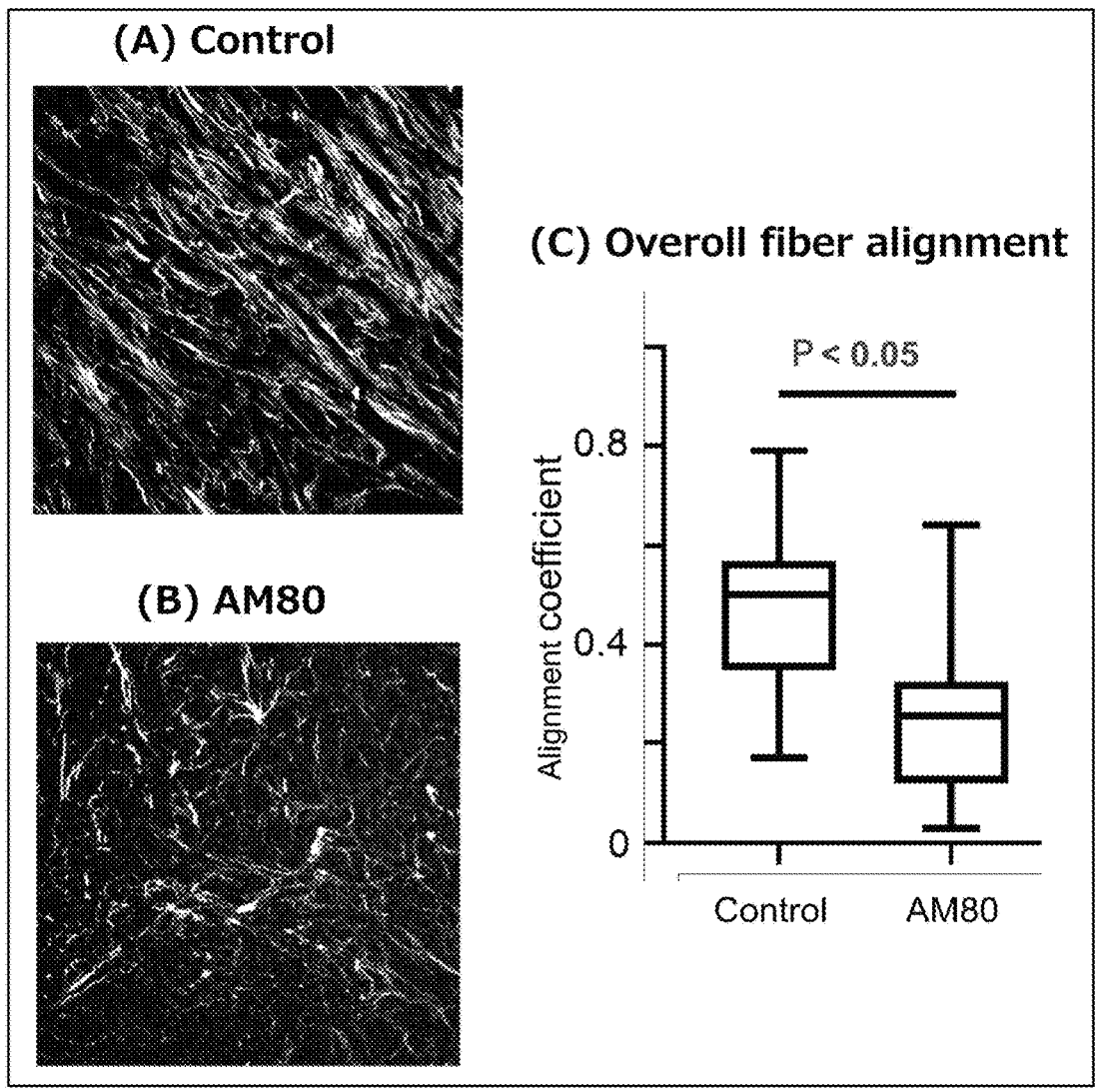
[Figure 50]
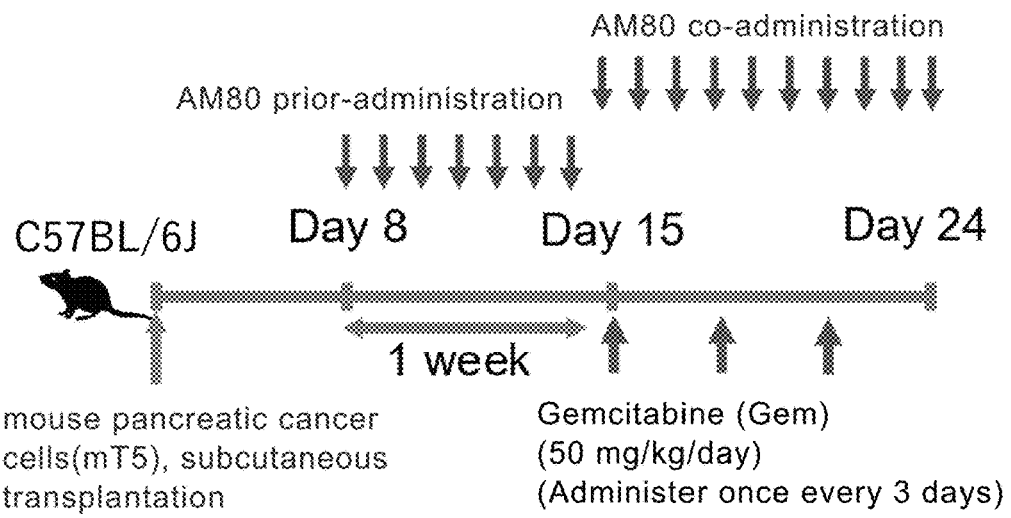

[Figure 51]
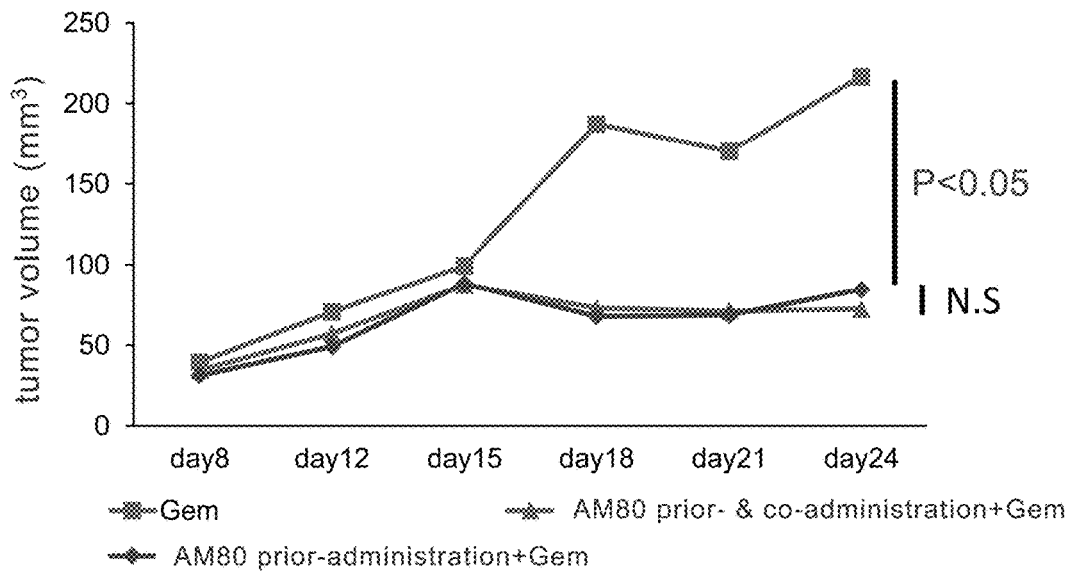
[Figure 52]
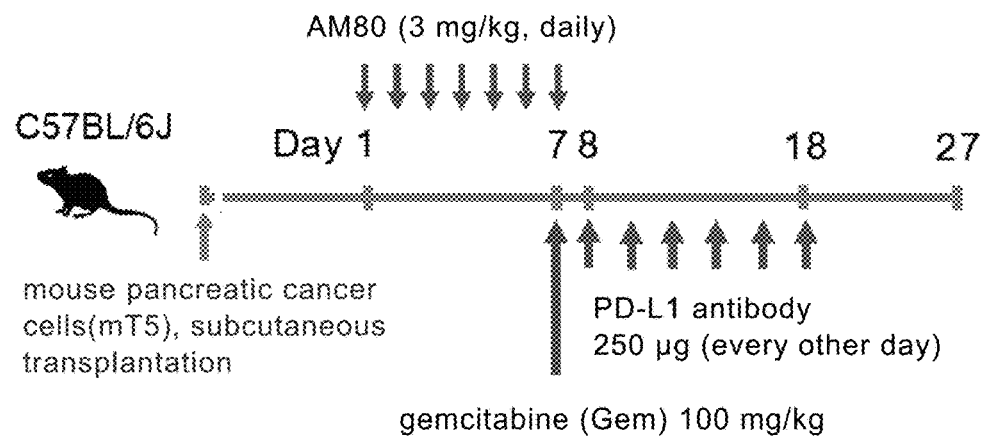
[Figure 53]
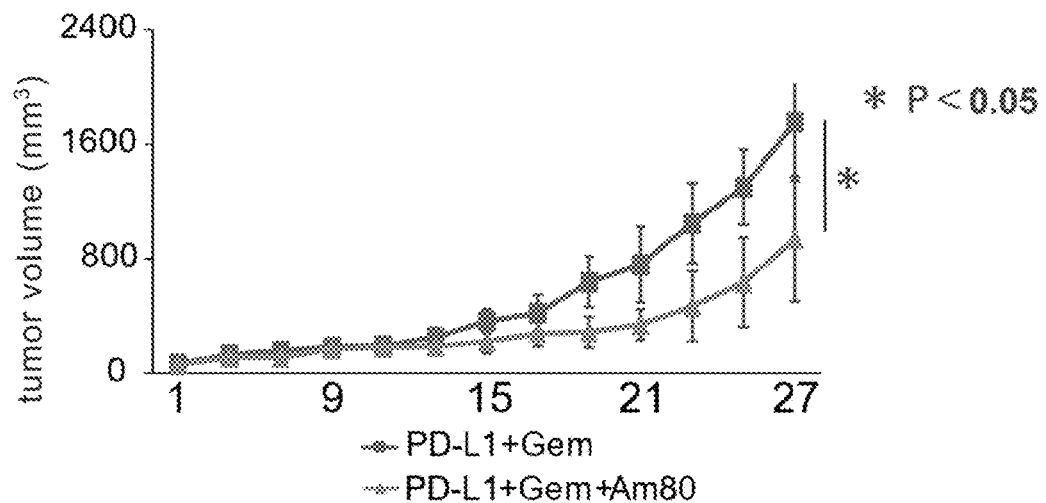

[Figure 54]
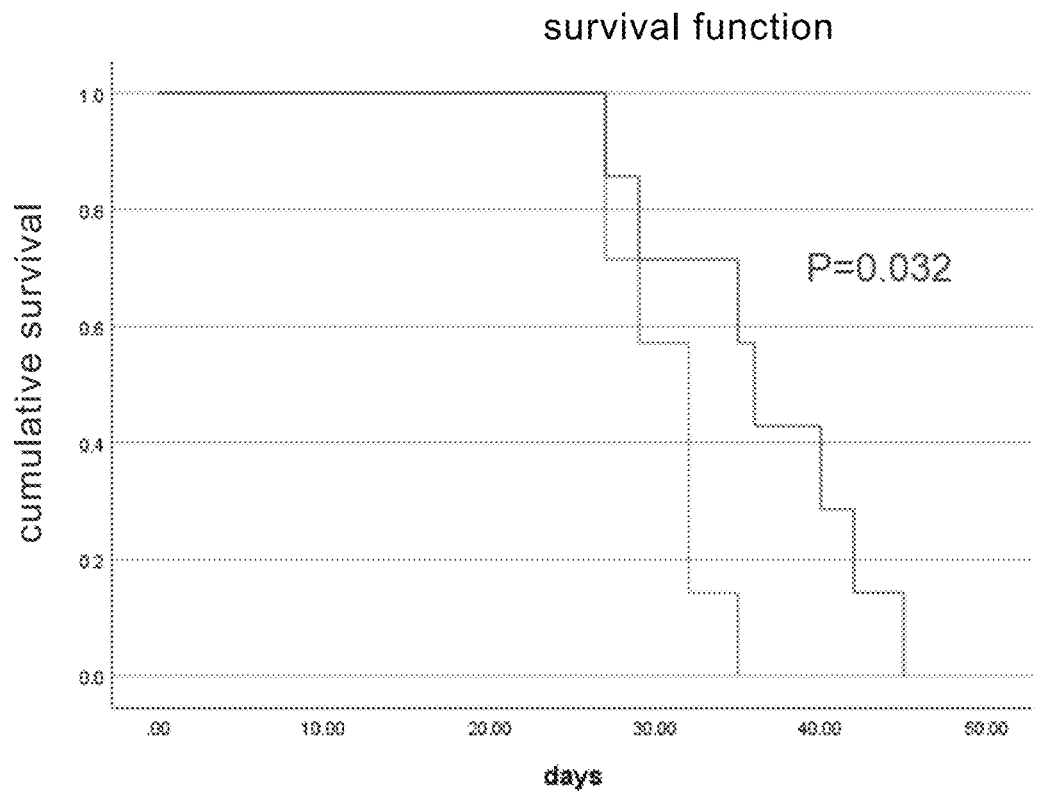
[Figure 55]
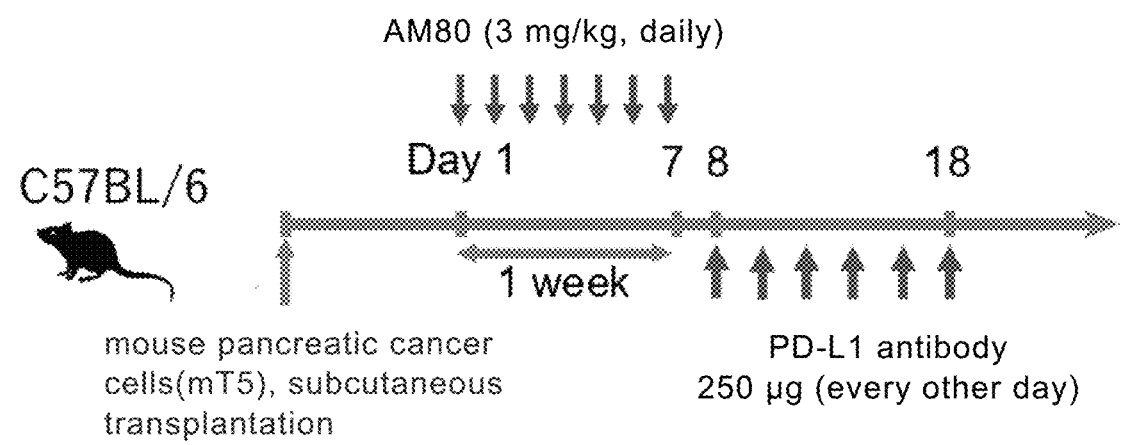

[Figure 56]
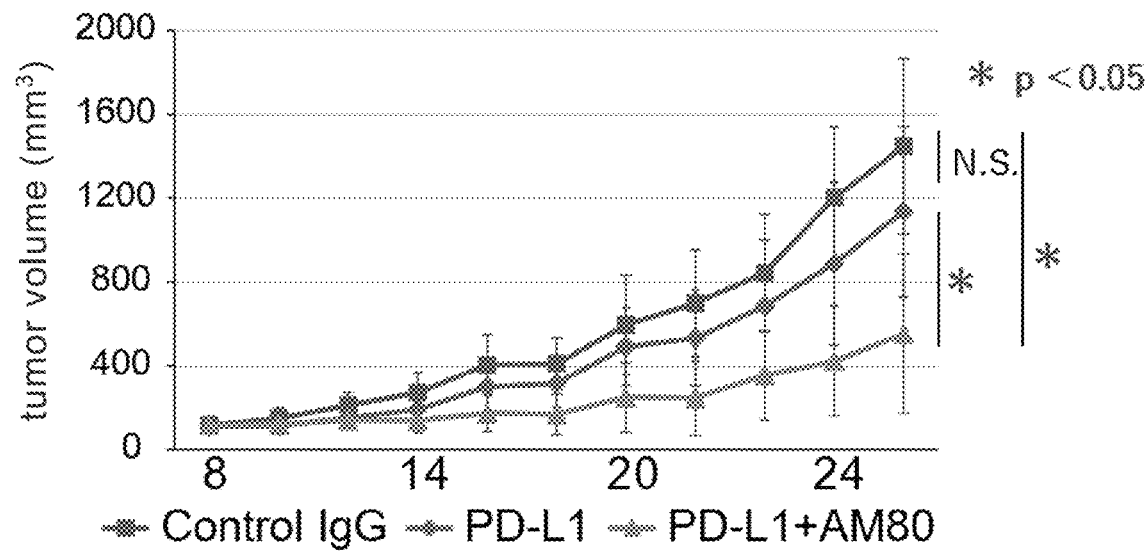
[Figure 57]
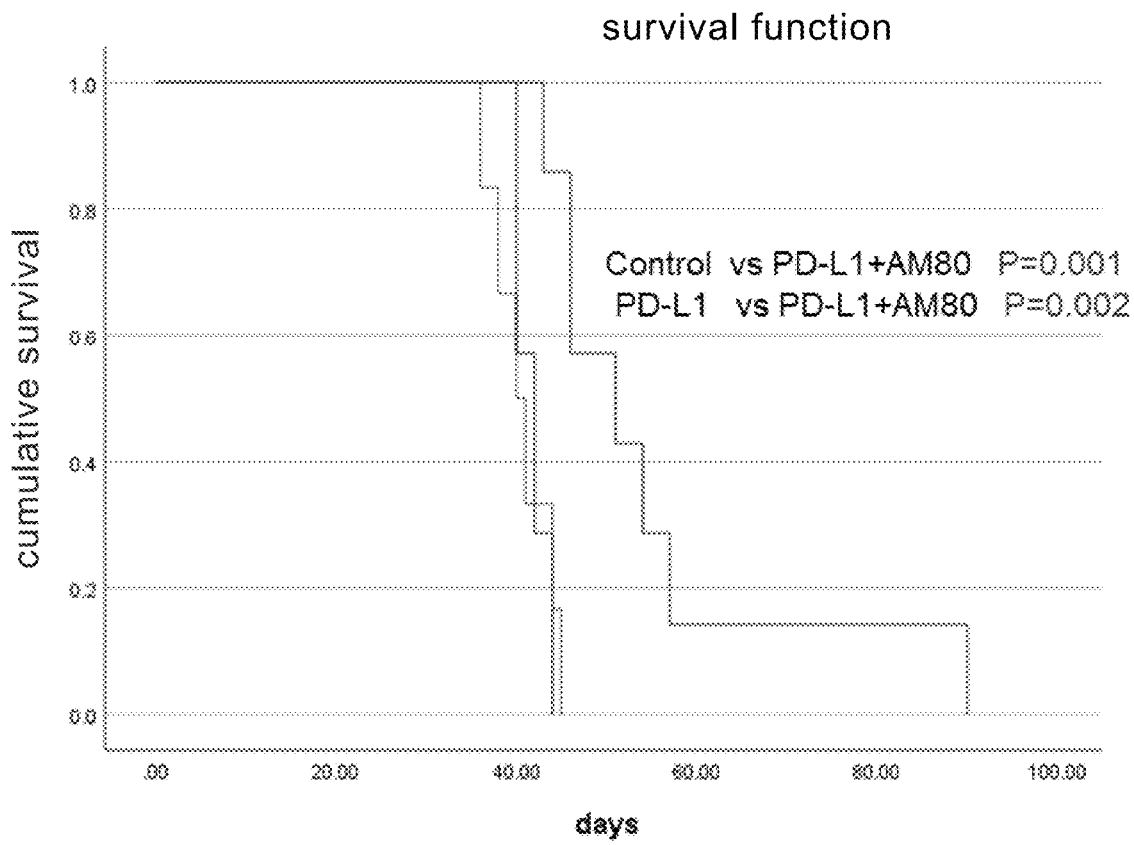

[Figure 58]
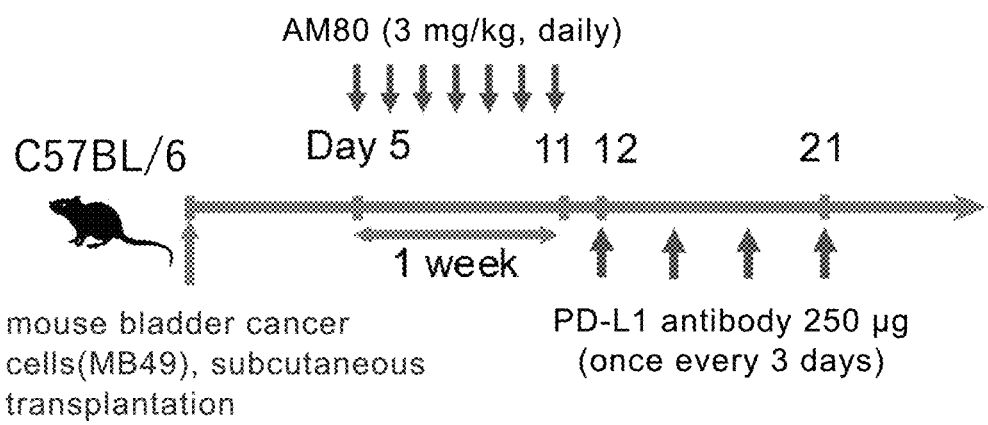

[Figure 59]
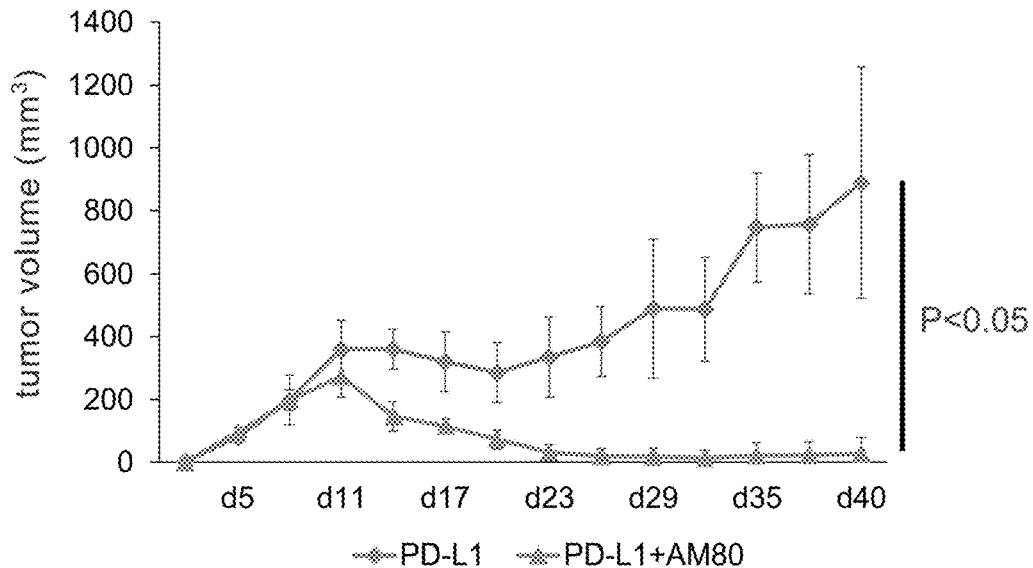
[Figure 60]
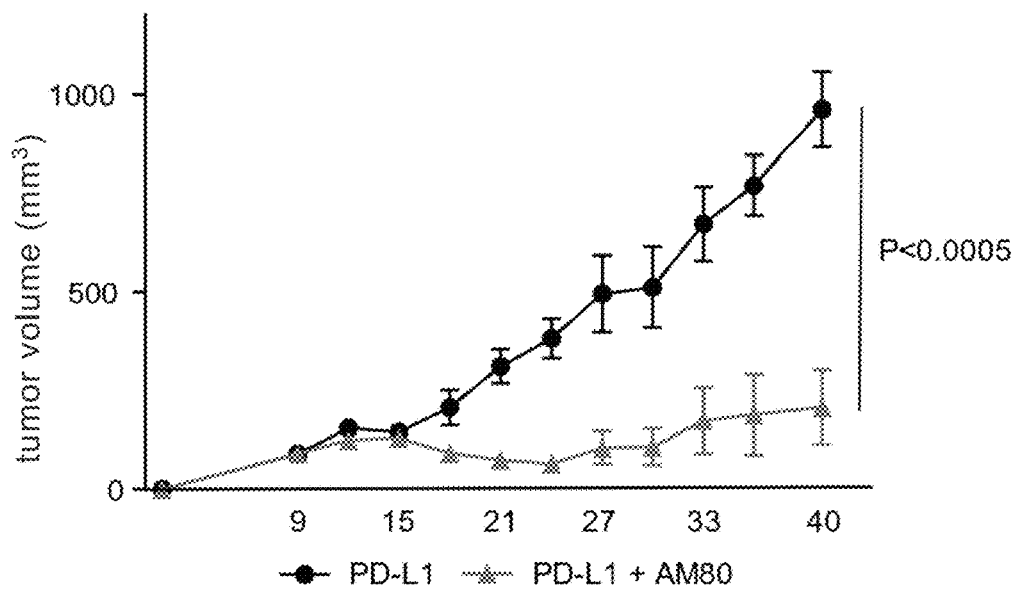
[Figure 61]
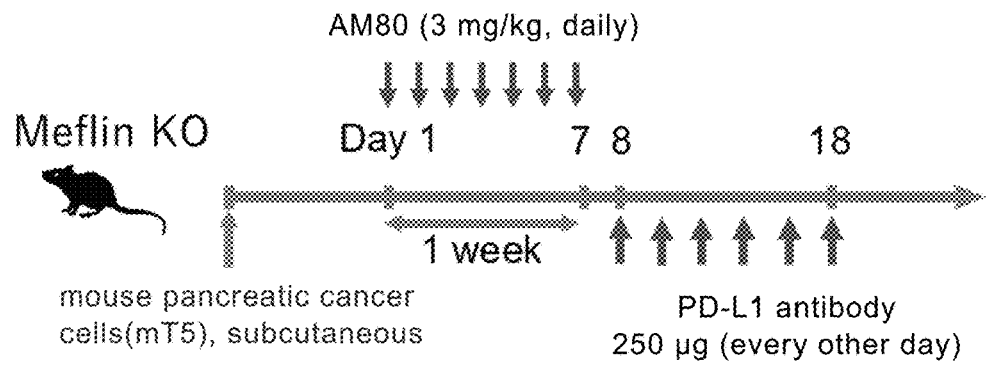

[Figure 62]
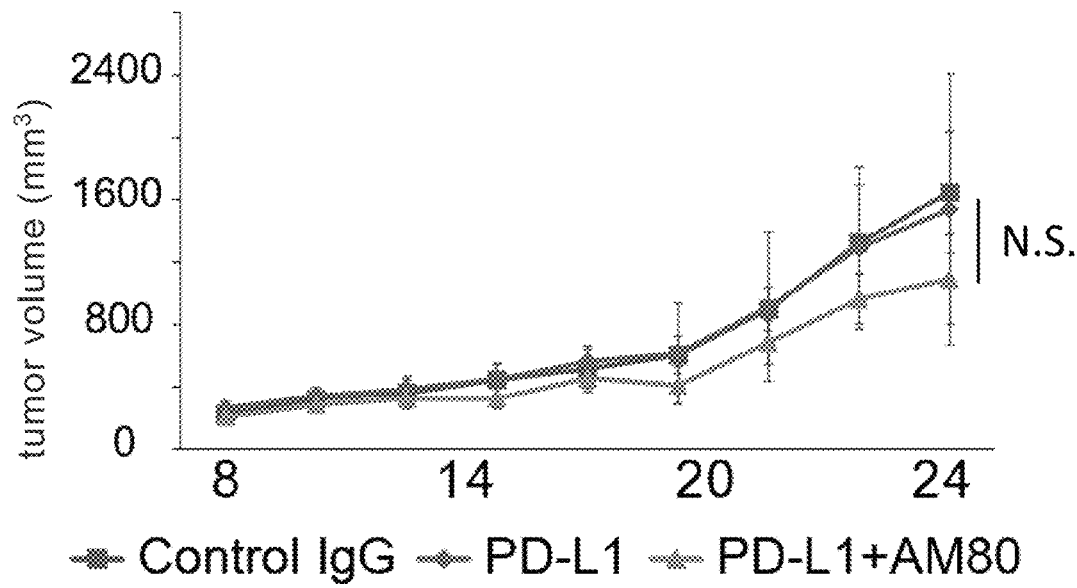
[Figure 63]
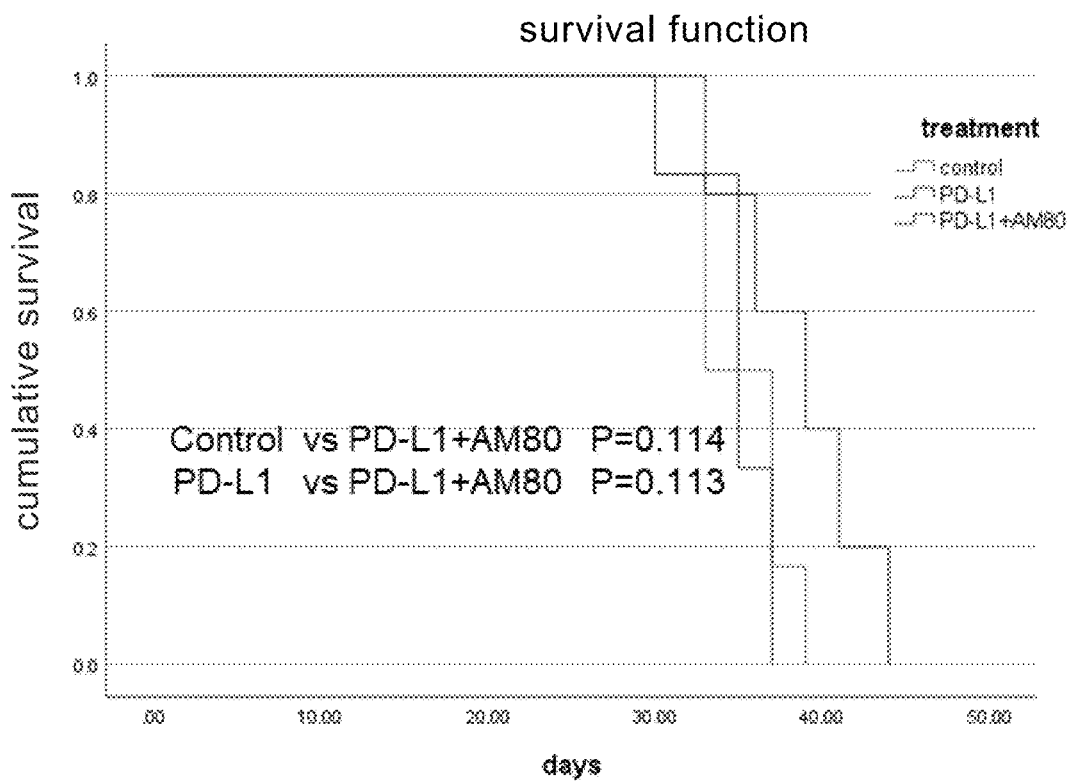

[Figure 64]
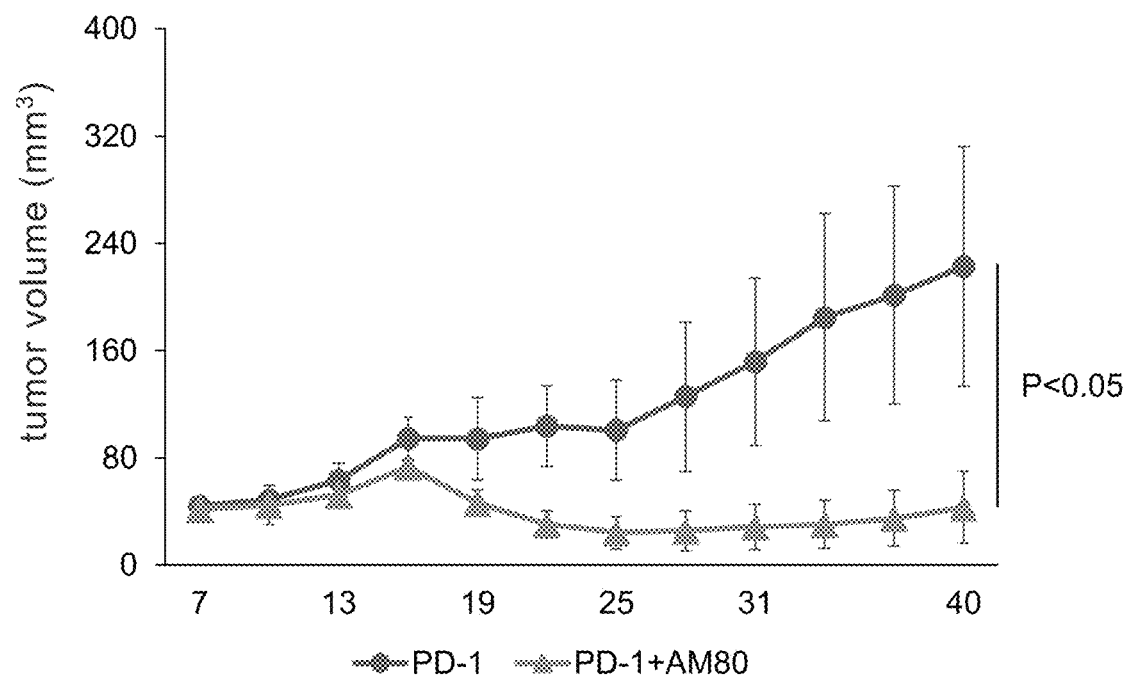

METHOD FOR SELECTING CANCER PATIENTS FOR WHOM COMBINATION THERAPY WITH RETINOID AND CANCER THERAPEUTIC AGENT IS EFFECTIVE, AND COMBINATION MEDICAMENT WITH RETINOID AND CANCER THERAPEUTIC AGENT

TECHNICAL FIELD

The present invention relates to a method for selecting a cancer patient for whom a combination therapy of a retinoid and a cancer therapeutic agent is effective, and a combination medicament for which a retinoid and a cancer therapeutic agent are effective for the selected cancer patient.

BACKGROUND ART

Stroma is a general term for cancer-associated fibroblasts, extracellular matrix, immune cells, blood vessels, etc. that constitute the microenvironment of cancer. Some malignant tumors such as pancreatic cancer (also referred to as "pancreatic tumor"), bile duct cancer, breast cancer, and lung cancer contain a large amount of the stroma, which is thought to be the cause of anticancer drug resistance. Cancer-associated fibroblasts, which are the main components of the stroma, promote the growth of cancer cells by various mechanisms, and the abundant extracellular matrix derived from cancer-associated fibroblasts prevents the penetration of anticancer drugs. Therefore, cancer-associated fibroblasts have been considered a cancer-promoting factor. Based on the above, cancer therapy targeting cancer-associated fibroblasts was attempted, but cancer cells having a high malignancy have been generated contrary to expectations (Non-Patent Literature 1).

On the other hand, recent studies have revealed that in addition to the above-mentioned cancer-promoting cancer-associated fibroblasts, there exist also cancer-suppressing cancer-associated fibroblasts, and a GPI-anchored membrane molecule, meflin, has been identified as a specific molecular marker (Non-Patent Literatures 2 to 4). Further, as cancer progresses, cancer-suppressing cancer-associated fibroblasts change (transform) into cancer-promoting cancer-associated fibroblasts, while cancer-associated fibroblasts can also revert (reprogram) to tumor-suppressive cancer-associated fibroblasts by specific drugs. Currently, ATRA (all-trans retinoic acid) or vitamin D is known as a drug for reprogramming cancer-promoting cancer-associated fibroblasts into cancer-suppressing cancer-associated fibroblasts (Non-Patent Literatures 5 to 9).

If a highly specific treatment method is developed for some cancer patients having a malignant tumor with a lot of anticancer drug-resistant stroma, and furthermore, if a method that can accurately select some cancer patients for whom the treatment is effective is developed, it is thought that the chances of administering ineffective treatments to cancer patients can be reduced, contributing to a reduction in medical expenses, as well as improving the patient's prognosis through the optimal treatment.

PRIOR ART LITERATURE

Non-Patent Literature

[Non-Patent Literature 1] https://www.sec.gov/Archives/edgar/data/1113148/000119312512026049/d290658dex991.htm (U.S. Securities and Exchange Commission Home Page website)
[Non-Patent Literature 2] Cancer Cell. 2014; 25: 719-734.
[Non-Patent Literature 3] Cancer cell. 2014; 25: 735-747.
[Non-Patent Literature 4] Meflin-positive cancer-associated fibroblasts inhibit pancreatic carcinogenesis. Cancer Res 79:5367-81, 2019
[Non-Patent Literature 5] Biochem Pharmacol. 2003 Aug. 15; 66(4):633-41. doi: 10.1016/s0006-2952(03)00390-3.
[Non-Patent Literature 6] Gut. 2006 January; 55(1): 79-89. doi: 10.1136/gut.2005.064543
[Non-Patent Literature 7] Gastroenterology. 2011 October; 141(4):1486-97, 1497.e1-14. doi: 10.1053/j.gastro.2011.06.047. Epub 2011 Jun. 24.
[Non-Patent Literature 8] Cell. 2014 Sep. 25; 159(1):80-93. doi: 10.1016/j.cell.2014.08.007.
[Non-Patent Literature 9] Nat Commun. 2016 Sep. 7; 7:12630. doi: 10.1038/ncomms12630.

SUMMARY OF INVENTION

Technical Problem

An object of the present invention is to provide a highly effective medicament for treating cancer for a cancer patient having a malignant tumor with a lot of anticancer drug-resistant stroma, and to provide a method for selecting a cancer patient for whom the treatment using the said medicament is effective.

Solution to Problem

The present invention includes the following inventions in order to solve the above problems.
[1] A method for selecting a cancer patient for whom a combination therapy with a retinoid and a cancer therapeutic agent is effective, which comprises a step of selecting a cancer patient having a malignant tumor with the infiltration of cancer-associated fibroblasts in the stroma.
[2] The method according to [1] above, wherein the step of selecting the cancer patient comprises detecting at least one cancer-associated fibroblast in a malignant tumor tissue obtained from a cancer patient to be examined.
[3] The method according to [1] or [2] above, wherein the step of selecting the cancer patient comprises preparing a histopathological specimen of a malignant tumor tissue obtained from a cancer patient to be examined and detecting at least one cancer-associated fibroblast under microscopic observation.
[4] The method according to any of [1] to [3] above, wherein the step of selecting the cancer patient comprises observing a histopathological specimen of a malignant tumor tissue obtained from a cancer patient to be examined under a microscope, and detecting at least one cancer-associated fibroblast in any high-magnification field including a cancer cell region and a stromal region.
[5] The method according to [3] or [4] above, wherein detecting cancer-associated fibroblasts is performed by microscopically observing a Hematoxylin-Eosin stained histopathological specimen.
[6] The method according to [3] or [4] above, wherein detecting cancer-associated fibroblasts is performed by the immunohistochemical staining or the in situ hybridization to a marker molecule of cancer-associated fibroblasts.

[7] A medicament, which comprises the cancer patient selected by the method according to any of [1] to [6] above is a subject and is administered in combination of a retinoid and a cancer therapeutic agent.

[8] The medicament according to [7] above, wherein the cancer therapeutic agent is a chemotherapeutic agent, a molecular target agent, an immunotherapeutic agent or a hormone therapeutic agent.

[9] The medicament according to [7] or [8] above, wherein the retinoid is tamibarotene.

[10] The medicament according to any of [7] to [9] above, wherein the retinoid is used so as to be administered in advance.

[11] A medicament for enhancing the action of a cancer therapeutic agent and/or for promoting the delivery of a cancer therapeutic agent to a target tumor tissue, wherein the cancer patient selected by the method according to any of [1] to [6] above is a subject and a retinoid is an active ingredient.

[12] The medicament according to [11] above, wherein the cancer therapeutic agent is a chemotherapeutic agent, a molecular target agent, an immunotherapeutic agent or a hormone therapeutic agent.

[13] The medicament according to [11] or [12] above, wherein the retinoid is tamibarotene.

[14] A medicament for enhancing the action of a cancer therapeutic agent, wherein the cancer patient selected by the method according to any of [1] to [6] above is a subject and a composition that overexpresses meflin in tumor tissue cells is an active ingredient.

[15] The medicament according to [14] above, wherein the composition that overexpresses meflin is a viral vector containing a meflin gene.

[16] The medicament according to [14] or [15] above, wherein the cancer therapeutic agent is a chemotherapeutic agent, a molecular target agent, an immunotherapeutic agent or a hormone therapeutic agent.

[17] A medicament which comprises the cancer patient selected by the method according to any of [1] to [6] above is a subject and is administered in combination of an agent that induces the suppression of the lysyl oxidase activity in the stroma of cancer and a cancer therapeutic agent.

[18] The medicament according to [17] above, wherein the cancer therapeutic agent is a chemotherapeutic agent, a molecular target agent, an immunotherapeutic agent or a hormone therapeutic agent.

[19] The medicament according to [17] or [18] above, wherein an agent that induces the suppression of the lysyl oxidase activity in the stroma of cancer is used so as to be administered in advance.

[20] A medicament for enhancing the action of a cancer therapeutic agent and/or for promoting the delivery of a cancer therapeutic agent to a target tumor tissue, wherein the cancer patient selected by the method according to any of [1] to [6] above is a subject and an agent that induces the suppression of the lysyl oxidase activity in the stroma of cancer is an active ingredient.

[21] The medicament according to [20] above, wherein the cancer therapeutic agent is a chemotherapeutic agent, a molecular target agent, an immunotherapeutic agent or a hormone therapeutic agent.

Advantageous Effect

The present invention can provide a highly effective medicament for treating cancer for a cancer patient having a malignant tumor with a lot of anticancer drug-resistant stroma. In addition, the present invention can provide a method for selecting a cancer patient for whom the treatment using the said medicament is effective. According to the present invention, since a cancer patient with a high therapeutic effect can be identified and only selected cancer patients can be treated, it is possible to avoid wasteful treatment by paying high medical expenses to cancer patients with a low therapeutic effect.

BRIEF EXPLANATION OF DRAWINGS

FIG. 1 shows the results of the observations on the HE-stained specimen, which was obtained by the operation for the pancreatic tumor (anaplastic cancer) with the infiltration of cancer-associated fibroblasts in the stroma.

FIG. 2 shows the results of the observations on the HE-stained specimen, which was obtained by the operation for the pancreatic tumor (intrapancreatic papillary mucinous adenoma) with the infiltration of cancer-associated fibroblasts in the stroma.

FIG. 3 shows the results of the observations on the HE-stained specimen, which was obtained by the operation for the pancreatic tumor (tubular adenocarcinoma) with the infiltration of cancer-associated fibroblasts in the stroma.

FIG. 4 shows the results of the observations on the HE-stained specimen, which was obtained by the operation for the pancreatic tumor (tubular adenocarcinoma) with the infiltration of cancer-associated fibroblasts in the stroma.

FIG. 5 shows the results of the observations on the HE-stained specimen, which was obtained by the operation for the pancreatic tumor (acinar cell carcinoma) without the infiltration of cancer-associated fibroblasts in the stroma.

FIG. 6 shows the results of the observations on the HE-stained specimen, which was obtained by the operation for the pancreatic tumor (acinar cell carcinoma) without the infiltration of cancer-associated fibroblasts in the stroma.

FIG. 7 shows the results of the observations on the HE-stained specimen, which was obtained by the operation for the pancreatic tumor (intrapancreatic papillary mucosal adenocarcinoma (non-invasive cancer)) without the infiltration of cancer-associated fibroblasts in the stroma.

FIG. 8 shows the results of the observations on the HE-stained specimen, which was obtained by the operation for the pancreatic tumor (intrapancreatic papillary mucinous adenoma (IPMA)) without the infiltration of cancer-associated fibroblasts in the stroma.

FIG. 9 shows the results of the observations on the HE-stained specimen, which was obtained by the operation for the pancreatic tumor (mucous cyst tumor) without the infiltration of cancer-associated fibroblasts in the stroma.

FIG. 10 shows the results of the observations on the HE-stained specimen, which was obtained by the operation for the pancreatic tumor (neuroendocrine tumor (G1, insulinoma)) without the infiltration of cancer-associated fibroblasts in the stroma.

FIG. 11 shows the results of the observations on the HE-stained specimen, which was obtained by the operation for the pancreatic tumor (neuroendocrine tumor (G1, gastrinoma)) without the infiltration of cancer-associated fibroblasts in the stroma.

FIG. 12 shows the results of the observations on the HE-stained specimen, which was obtained by the operation for the pancreatic tumor (pancreatic intraepithelial neoplastic lesion (PanIN)) without the infiltration of cancer-associated fibroblasts in the stroma.

FIG. 13 shows the results of the observations on the HE-stained specimen, which was obtained by the operation for the pancreatic tumor (serous cystadenoma) without the infiltration of cancer-associated fibroblasts in the stroma.

FIG. 14 shows the results of the observations on the HE-stained specimen, which was obtained by the operation for the pancreatic tumor (solid pseudopapillary neoplasm (SPN)) without the infiltration of cancer-associated fibroblasts in the stroma.

FIG. 15 shows the results of the observations on the HE-stained specimen, which was obtained by biopsy for the pancreatic tumor (tubular adenocarcinoma) with the infiltration of cancer-associated fibroblasts in the stroma.

FIG. 16 shows the results of the observations on the HE-stained specimen, which was obtained by biopsy for the pancreatic tumor (anaplastic carcinoma) with the infiltration of cancer-associated fibroblasts in the stroma.

FIG. 17 shows the results of the observations on the HE-stained specimen, which was obtained by biopsy for the pancreatic tumor (intrapancreatic papillary mucosal adenocarcinoma (invasive cancer)) with the infiltration of cancer-associated fibroblasts in the stroma.

FIG. 18 shows the results of the observations on the HE-stained specimen, which was obtained by biopsy for the pancreatic tumor (acinar cell carcinoma) without the infiltration of cancer-associated fibroblasts in the stroma.

FIG. 19 shows the results of the observations on the HE-stained specimen, which was obtained by biopsy for the pancreatic tumor (solid pseudopapillary neoplasm (SPN)) without the infiltration of cancer-associated fibroblasts in the stroma.

FIG. 20 shows the results of the observations on the HE-stained specimen, which was obtained by biopsy for the pancreatic tumor (neuroendocrine tumor) without the infiltration of cancer-associated fibroblasts in the stroma.

FIG. 21 shows the results of the observations on the HE-stained specimen, which was obtained by biopsy for the pancreatic tumor (intrapancreatic papillary mucinous adenoma (IPMA)) without the infiltration of cancer-associated fibroblasts in the stroma.

FIG. 22 shows the results of the immunohistochemical staining (left) using an anti-meflin antibody and the in situ hybridization (ISH) using a probe that hybridizes to the mRNA of the meflin gene for tissue specimens of pancreatic tumors with the infiltration of cancer-associated fibroblasts in the stroma.

FIG. 23 shows the results of the immunohistochemical staining (left) using an anti-meflin antibody and the in situ hybridization (ISH) using a probe that hybridizes to the mRNA of the meflin gene for tissue specimens of pancreatic tumors with the infiltration of cancer-associated fibroblasts in the stroma.

FIG. 24 shows the results of the immunohistochemical staining (left) using an anti-meflin antibody and the in situ hybridization (ISH) using a probe that hybridizes to the mRNA of the meflin gene for tissue specimens of pancreatic tumors without the infiltration of cancer-associated fibroblasts in the stroma.

FIG. 25 shows the protocol of Example 3.

FIG. 26 shows the results of measuring the tumor volume 15 days after transplantation, wherein (A) shows the results of the gemcitabine and tamibarotene administration group (Gem+AM80 group) and the gemcitabine and DMSO administration group (Gem+DMSO group) in nude mice solely transplanted with human pancreatic cancer cells, and (B) shows the results of the Gem+AM80 group and the Gem+DMSO group in nude mice co-transplanted with human pancreatic cancer cells and human pancreatic astrocytes.

FIG. 27 shows the results of culturing the primary mouse mesenchymal stem cells until 100% confluent and measuring the gene expression 48 hours after adding ATRA, AM80 or AM580 to the medium, wherein (A) is the meflin gene (Islr), (B) is the actin gene (Acta2), (C) is the type I collagen gene (Col1a1), and (D) is the type III collagen gene (Col3a1).

FIG. 28 shows the protocol of Example 6.

FIG. 29 shows the results of measuring the tumor volume over time after transplantation in each group in Example 6, in which mice with mouse pancreatic cancer cells subcutaneously transplanted are used.

FIG. 30 shows the results of the in situ hybridization (ISH) detection of the meflin gene (Islr) expression in the tumor in Example 6 in which the tumor is removed 22 days after transplantation and tissue sections are prepared, wherein (A) is a representative microscopic image of the control group, (B) is a representative microscopic image of the AM80 3 mg/kg/day group, and (C) is a figure comparing the number of dots of the Islr positive signal per high-magnification field between the both groups.

FIG. 31 shows the results of the in situ hybridization (ISH) detection of the actin gene (Acta2) expression in the tumor in Example 6 in which the tumor is removed 22 days after transplantation and tissue sections are prepared, wherein (A) is a representative microscopic image of the control group, (B) is a representative microscopic image of the AM80 3 mg/kg/day group, and (C) is a figure comparing the number of dots of the Acta2 positive signal per high-magnification field between the both groups.

FIG. 32 shows the results of measuring the vascular lumen area in Example 6 in which the tumor is removed 22 days after transplantation and tissue sections are prepared and immunostained with anti-CD31 antibody, wherein (A) is a representative microscopic image of the control group, (B) is a representative microscopic image of the AM80 3 mg/kg/day group, and (C) is a figure comparing the vascular lumen area between the both groups.

FIG. 33 shows the protocol of Example 7.

FIG. 34 shows the results of measuring the tumor volume over time after transplantation in each group in Example 7 in which mice with mouse pancreatic cancer cells subcutaneously transplanted are used.

FIG. 35 shows the protocol of Example 8.

FIG. 36 shows the results of measuring the tumor volume over time after transplantation in each group in Example 8 in which nude mice with mouse pancreatic cancer cells subcutaneously transplanted are used.

FIG. 37 shows the protocol of Example 9.

FIG. 38 shows the results of measuring the tumor volume over time after grouping into each group in Example 9 in which a mouse spontaneous pancreatic cancer onset model (KPC mouse) is used.

FIG. 39 shows the protocol of Example 11.

FIG. 40 shows the results of measuring the tumor volume over time after transplantation in each group in Example 11 in which meflin-deficient mice are used.

FIG. 41 shows the results of the in situ hybridization (ISH) detection of the actin gene (Acta2) expression in the tumor in Example 11 in which the tumor is removed 24 days after transplantation and tissue sections are prepared, wherein (A) is a representative microscopic image of the gemcitabine administration group (Gem group), (B) is a representative microscopic image of the gemcitabine and tamibarotene administration group (Gem+AM80 group), and (C) is a figure comparing the number of dots of the Acta2 positive signal per high-magnification field between the both groups.

FIG. 42 shows the protocol of Example 12.

FIG. 43 shows the results of the in situ hybridization (ISH) detection of the meflin gene (Islr) expression in the tumor in Example 12 in which mice with mouse pancreatic cancer cells subcutaneously transplanted are used. Herein Sendai virus (SeV-Meflin) that overexpresses meflin in infected cells and Sendai virus (SeV-Meflin) that overexpresses GFP in infected cells are each administered intratumorally, the tumor is removed 17 days after transplantation and tissue sections are prepared, wherein (A) is a representative microscopic image of the SeV-GFP administration group, and (B) is a representative microscopic image of the SeV-Meflin administration group.

FIG. 44 shows a figure comparing the tumor volume between the both groups on day 17 after transplantation in Example 12.

FIG. 45 shows the protocol of Example 13.

FIG. 46 shows a figure a comparison of tumor volume 17 days after transplantation in Example 13 in which mice with mouse pancreatic cancer cells subcutaneously transplanted are used between the group intratumorally administered SeV-Meflin followed by administered gemcitabine and the group intratumorally administered SeV-GFP followed by administered gemcitabine.

FIG. 47 shows the results of measuring the human lysyl oxidase activity by each mixing the culture supernatant of cells stably expressing mouse meflin and the culture supernatant of control cells with recombinant human lysyl oxidase L2 (LoxL2).

FIG. 48 shows the results of measuring the collagen arrangement in the stroma of pancreatic tumor in a wild-type mouse spontaneous pancreatic cancer onset model (KPC mouse) and a meflin-deficient KPC mouse with a second harmonic microscope, wherein (A) is a representative second harmonic microscopic image of the wild-type KPC group, (B) is a representative second harmonic microscopic image of the meflin-deficient KPC group, and (C) is a figure comparing the curvature (linearity) of collagen between the both groups.

FIG. 49 shows the results of administering tamibarotene or solvent (DMSO) to mice subcutaneously transplanted with mouse pancreatic cancer cells, and measuring the collagen arrangement in the stroma of tumor with a second harmonic microscope, wherein (A) is a representative second harmonic microscope image of the control group, (B) is a representative second harmonic microscope image of the tamibarotene administration group, (C) is a figure comparing the curvature (linearity) of collagen between the both groups.

FIG. 50 shows the protocol of Example 17.

FIG. 51 shows the results of measuring the tumor volume over time after transplantation in a group to which gemcitabine was administered after prior-administration of tamibarotene, a group to which tamibarotene and gemcitabine were co-administered after the prior-administration of tamibarotene, and a group to which DMSO and gemcitabine were administered instead of tamibarotene, in Example 17 in which mice with mouse pancreatic cancer cells subcutaneously transplanted are used.

FIG. 52 shows the protocol of Example 18.

FIG. 53 shows the results of measuring the tumor volume over time after transplantation in a group to which an anti-PD-L1 antibody was administered and the group to which an anti-PD-L1 antibody and tamibarotene were administered in Example 18 in which mice with mouse pancreatic cancer cells subcutaneously transplanted are used.

FIG. 54 shows trends in the survival rate until all mice in both groups died in Example 18.

FIG. 55 shows the protocol of Example 19.

FIG. 56 shows the results of measuring the tumor volume over time after transplantation in a group to which an anti-PD-L1 antibody was administered, a group to which an anti-PD-L1 antibody and tamibarotene were administered, and a control group to which an IgG was administered in Example 19 in which mice with mouse pancreatic cancer cells subcutaneously transplanted are used.

FIG. 57 shows trends in the survival rate until all mice in whole groups died in Example 19.

FIG. 58 shows the protocol of Example 20.

FIG. 59 shows the results of measuring the tumor volume over time after transplantation in a group to which an anti-PD-L1 antibody was administered and a group to which an anti-PD-L1 antibody and tamibarotene were administered in Example 20 in which mice with mouse bladder cancer cells subcutaneously transplanted are used.

FIG. 60 shows the results of measuring the tumor volume over time after transplantation in a group to which an anti-PD-L1 antibody was administered and a group to which an anti-PD-L1 antibody and tamibarotene were administered in Example 19 in which mice with mouse lung cancer cells subcutaneously transplanted are used.

FIG. 61 shows the protocol of Example 23.

FIG. 62 shows the results of measuring the tumor volume over time after transplantation in a group to which an anti-PD-L1 antibody is administered, a group to which an anti-PD-L1 antibody and tamibarotene are administered, and a control group to which an IgG is administered in Example 23 in which meflin-deficient mice with mouse pancreatic cancer cells subcutaneously transplanted are used.

FIG. 63 shows trends in the survival rate until all mice in whole groups died in Example 23.

FIG. 64 shows the results of measuring the tumor volume over time after transplantation in a group to which an anti-PD-L1 antibody was administered, and a group to which an anti-PD-L1 antibody and tamibarotene were administered in Example 24 in which mice with mouse gastric cancer cells subcutaneously transplanted are used.

EMBODIMENT OF INVENTION

[Combination Medicament of Retinoid and Cancer Therapeutic Agent]

The present invention provides a medicament for treating cancer, which is administered in combination of a retinoid and a cancer therapeutic agent (hereinafter, referred to as "the first medicament of the present invention"). The subject of the administration of the first medicament of the present invention is a cancer patient having a malignant tumor with the infiltration of cancer-associated fibroblasts in the stroma. The cancer patient having a malignant tumor with the infiltration of cancer-associated fibroblasts in the stroma can be selected by the methods described below. The present invention also includes a method for selecting a cancer patient for whom a combination therapy of a retinoid and a cancer therapeutic agent is effective.

The method for selecting a cancer patient for whom a combination therapy with a retinoid and a cancer therapeutic agent is effective (hereinafter, referred to as "the method for selecting a cancer patient of the present invention") comprises a step of selecting a cancer patient having a malignant tumor with the infiltration of cancer-associated fibroblasts in the stroma. The step of selecting the cancer patient may include detecting at least one cancer-associated fibroblast (hereinafter, may be abbreviated as "CAF") in a malignant tumor tissue obtained from a cancer patient to be examined. The malignant tumor tissue may be obtained by biopsy or surgery, as long as it is a malignant tumor tissue obtained from a cancer patient to be examined. The histopathological specimen may be prepared, a cell suspension may be prepared, or a cell disruption liquid may be prepared from a malignant tumor tissue obtained from a cancer patient to be examined. The means for detecting CAF is not particularly limited, and may be something that detects a CAF-specific nucleic acid, something that detects a CAF-specific protein, or something that detects a CAF-specific morphology.

In the method for selecting a cancer patient of the present invention, the step of selecting a cancer patient having a malignant tumor with the infiltration of CAF in the stroma may comprise preparing a histopathological specimen of a malignant tumor tissue obtained from a cancer patient to be examined and detecting at least one CAF under microscopic observation. The method for preparing the histopathological specimen is not particularly limited, and a known method can be appropriately selected depending on the staining method or the detection method to be used. Microscopic observation may be performed over the entire area of the histopathological specimen, and when at least one CAF is detected in the microscopic observation, the patient to be examined is considered to be a cancer patient for whom the administration of the first medicament of the present invention is effective. When a plurality of histopathological specimens are prepared, when at least one CAF is detected in any of the histopathological specimens, the patient to be examined can be regarded as a cancer patient for whom the administration of the first medicament of the present invention is effective.

In the method for selecting a cancer patient of the present invention, the step of selecting a cancer patient having a malignant tumor with the infiltration of CAF in the stroma may comprise observing a histopathological specimen of a malignant tumor tissue obtained from a cancer patient to be examined under a microscope and detecting one or more CAFs in any high-magnification field including a cancer cell region and an interstitial region. The number of CAFs in one high-magnification field may be at least one, and may be 2, 3, 4, 5, 6, 7, 8, 9, 10 or more. The "high-magnification field" in the microscopic observation means observing at 400× using a 40× objective lens and a 10× eyepiece, and is also referred to as a high-power field (HPF).

CAF may be detected by performing Hematoxylin-Eosin staining (hereinafter, may be abbreviated as "HE stain") on the histopathological specimen. In this case, a pathologist usually observes the HE-stained specimen under a microscope to morphologically determine the presence or absence of CAF.

In the method for selecting a cancer patient of the present invention, a method for detecting a marker molecule of CAF by immunohistochemistry (hereinafter, may be abbreviated as "IHC") may be used, and a method for detecting the marker molecule of CAF by the in situ hybridization (hereinafter, may be abbreviated as "ISH") may be used. When detected by IHC, the IHC specimen can be prepared according to a conventional method using an antibody that specifically binds to a marker molecule of CAF. When detected by ISH, the ISH specimen can be prepared according to a conventional method using a probe that specifically hybridizes to the mRNA of the marker molecule of CAF.

The marker molecules of CAF include α-smooth muscle actin (αSMA), meflin, fibroblast activation protein (FAP), platelet-derived growth factor receptor α (PDGFRα), platelet-derived growth factor receptor β (PDGFRβ), fibroblast specific protein1 (FSP1), podoplanin, periostin, gremlin, desmin, CXCL12, vimentin, tenascin-C, NG2, ASPN, Stanniocalucin-1 (STC-1), Gli1, type I collagen (Col1a1) and the like. As an antibody that specifically binds to these marker molecules, a commercially available antibody can be used. Probes that hybridize to these marker molecules in an mRNA-specific manner can be produced by a known method based on the base sequence of the gene encoding these marker molecules. The base sequences of the genes encoding these marker molecules can be obtained from known databases (NCBI, etc.).

Examples of the retinoid used in the first medicament of the present invention include acitretinoin, adapalene, AGN194204 (also referred to as IRX4204, NRX194204 and VTP194204), AGN195183, alitretinoin (also referred to as 9-cis-retinoic acid), amsilarotene, AM580, bexarotene, bisphenol A diglycidyl ether (also referred to as BADGE), fenretinide, 4-hydroxyretinoic acid, isotretinoin (also referred to as 13-cis-retinoic acid), LG268, LGD1550, peretinoin, retinyl acetate, tamibarotene (also referred to as AM80), tazarotene, tretinoin (also referred to as all trans retinoic acid (ATRA)), TTNPB, and the like. Preferred is tamibarotene. As used herein, "retinoid" includes "vitamin A derivative", "vitamin A analog", "retinoic acid receptor (RAR) agonist" and "retinoic X receptor (RXR) agonist", but it does not include "acid receptor (RAR) antagonist" or "retinoic X receptor (RXR) antagonist".

The retinoid may form a salt, and the salt is preferably a pharmaceutically acceptable salt. Such examples include salts with acids such as hydrochloric acid, sulfuric acid, lactic acid, tartaric acid, maleic acid, fumaric acid, oxalic acid, malic acid, citric acid, oleic acid, palmitic acid, nitrate, phosphoric acid, trifluoroacetic acid, methanesulfonic acid, benzenesulfonic acid, p-toluene sulfonic acid; salts with alkali metals or alkaline earth metals such as sodium, potassium, calcium; salts with aluminum hydroxide or carbonate; and salts with triethylamine, benzylamine, diethanolamine, t-butylamine, dicyclohexylamine, arginine, and the like.

As shown in the examples in the later section, the present inventors have found that a retinoid enhances the action of a cancer therapeutic agent by improving delivery of a concomitant cancer therapeutic agent to a malignant tumor with the infiltration of CAF in the stroma. Therefore, it can be said that a retinoid is an active ingredient of an agent for enhancing the action of a cancer therapeutic agent used in combination. In addition, it can be said that a retinoid is an active ingredient of a medicament for promoting the delivery of a concomitant cancer therapeutic agent to a target tumor tissue. Therefore, the present invention includes a medicament for enhancing the action of a cancer therapeutic agent, wherein a cancer patient having a malignant tumor with the infiltration of CAF in the stroma is a patient and a retinoid is an active ingredient. Further, the present invention includes a medicament for promoting the delivery of a cancer therapeutic agent to a target tumor tissue, wherein a cancer patient having a malignant tumor with the infiltration of CAF in the stroma is a patient and a retinoid is an active ingredient.

The retinoid used in the first medicament of the present invention can be produced by appropriately blending with a pharmaceutically acceptable carrier or additive in accordance with a known production method for pharmaceutical preparations (e.g., the methods described in the Japanese pharmacopoeia, etc.). In particular, the pharmaceutical composition may be, for example, an oral preparation or a parenteral preparation, including tablets (including sugar-coated tablets, film-coated tablets, sublingual tablets, orally disintegrating tablets, and buccal tablets), pills, powders, granules, capsules (including soft capsules and microcapsules), troches, syrups, liquids, emulsions, suspensions, controlled-release preparations (e.g., fast-release preparations, sustained release preparations, sustained release microcapsules, etc.), aerosols, films (e.g., orally disintegrating films, oral mucosal adhesive films, etc.), injections (e.g., subcutaneous injections, intravenous injections, intramuscular injections, intraperitoneal injections, etc.), intravenous infusions, transdermal preparations, ointments, lotions, patches, suppositories (e.g., rectal suppositories, vaginal suppositories, etc.), pellets, transnasal preparations, transpulmonary preparations (inhalants), and eye drops. The amount of the carrier or additive to be added can be determined as appropriate based on the range typically used in the pharmaceutical field. The carrier or additive that may be added is not particularly limited and examples thereof include various types of carriers such as water, physiological saline, other aqueous solvents, and aqueous or oily vehicles; and various types of additives such as excipients, binders, pH adjusters, disintegrants, absorption promoters, lubricants, colorants, flavors and fragrances.

Examples of the additives that may be blended to tablets, capsules, etc. include binders such as gelatin, corn starch, tragacanth, and gum arabic; excipients such as crystalline cellulose; swelling agents such as corn starch, gelatin, and alginic acid; lubricants such as magnesium stearate; sweeteners such as sucrose, lactose, and saccharin; and flavors such as peppermint flavor, wintergreen oil, and cherry flavor. When the unit dosage form is a capsule, a liquid carrier such as oils and fats can be further added in addition to the above types of materials. A sterile composition for injection can be prepared in accordance with a usual formulation procedure (for example, by dissolving or suspending the active ingredient in a solvent such as water for injection or a natural vegetable oil). Aqueous liquids for injection that may be used are, for example, physiological saline and an isotonic solution containing glucose and/or other auxiliary substances (for example, D-sorbitol, D-mannitol, sodium chloride, etc.). The aqueous liquids for injection may be used in combination with an appropriate solubilizer, such as alcohols (ethanol etc.), polyalcohols (propylene glycol, polyethylene glycol, etc.), and nonionic surfactants (polysorbate 80, HCO-50, etc.). Oily liquids that may be used are, for example, sesame oil and soybean oil. The oily liquids may be used in combination with a solubilizer such as benzyl benzoate and benzyl alcohol. Other additives that may be added are, for example, buffering agents (e.g., a phosphate buffer, a sodium acetate buffer, etc.), soothing agents (e.g., benzalkonium chloride, procaine hydrochloride, etc.), stabilizers (e.g., human serum albumin, polyethylene glycol, etc.), preservatives (e.g., benzyl alcohol, phenol, etc.) and antioxidants.

The retinoid has low toxicity to humans and other mammals (e.g., rats, mice, rabbits, sheep, pig, cattle, cats, dogs, monkeys, etc.), and can be safely administered. The amount of the retinoid in the preparation varies depending on the dosage form, administration method, carrier, etc., but is usually 0.01 to 100% (w/w), relative to the total amount of the preparation, and may be 0.1 to 95% (w/w).

The dosage of the retinoid varies with the subject, the symptom, the route of administration, etc., but in the case of, for example, an oral administration, the dosage to a human with a body weight of about 60 kg is about 0.01 to 1000 mg per day, preferably about 0.1 to 100 mg per day, and more preferably about 0.5 to 500 mg per day. In the case of parenteral administration, the dose for single parenteral administration varies with the conditions of the patient, the symptom, the administration method, etc. In the case of, for example, an intravenous injection, the dose is, for example, usually about 0.01 to 100 mg per kg of body weight, preferably about 0.01 to 500 mg per kg of body weight, and more preferably about 0.01 to 20 mg per kg of body weight. The total daily dosage may be administered in a single dose or in divided doses.

The cancer therapeutic agent used in the first medicament of the present invention is not particularly limited, but for example, a chemotherapeutic agent, an immunotherapeutic agent or a hormone therapeutic agent is preferable. These cancer therapeutic agents may be a liposome preparation. Further, these cancer therapeutic agents may be a nucleic acid drug or an antibody drug.

Examples of chemotherapeutic agents include, but are not limited to, alkylating agents such as nitrogen mustard, nitrogen mustard hydrochloride N-oxide, chlorambucil, cyclophosphamide, ifosfamide, thiotepa, carbocone, improsulfan tosylate, busulfan, nimustine hydrochloride, mitobronitol, melphalan, dacarbazine, ranimustine, estramustine sodium phosphate, triethylenemelamine, carmustine, lomustine, streptozocin, pipobroman, etogluside, carboplatin, cisplatin, miboplatin, nedaplatin, oxaliplatin, altretamine, ambamustine, dibrospidium hydrochloride, fotemustine, prednimustine, pumitepa, ribomustin, temozolomide, treosulfan, trofosfamide, zinostatin stimalamer, adzelesin, cystemustine, bizelesin, and the like;

antimetabolites such as mercaptopurine, 6-mercaptopurine riboside, thioinosine, methotrexate, pemetrexed, enocitabine, cytarabine, cytarabine ocfosfate, ancitabine hydrochloride, 5-FU drugs (e.g., fluorouracil, tegafur, UFT, doxifluridine, carmofur, galocitabine, emitefur, capecitabine, etc.), aminopterin, nelzarabine, leucovorin calcium, tabloid, butocin, folinate calcium, levofolinate calcium, cladribine, emitefur, fludarabine, gemcitabine, hydroxycarbamide, pentostatin, piritrexim, Idoxuridine, mitoguazone, tiazofurin, ambamustine, bendamustine, and the like;

anticancer antibiotics, such as actinomycin D, actinomycin C, mitomycin C, chromomycin A3, bleomycin hydrochloride, bleomycin sulfate, peplomycin sulfate, daunorubicin hydrochloride, doxorubicin hydrochloride, aclarubicin hydrochloride, pirarubicin hydrochloride, epirubicin hydrochloride, neocarzinostatin, mithramycin, sarkomycin, carzinophilin, mitotane, zorubicin hydrochloride, mitoxantrone hydrochloride, idarubicin hydrochloride, and the like; and Plant-derived anticancer agents such as etoposide, etoposide phosphate, vinblastine sulfate, vincristine sulfate, vindesine sulfate, teniposide, paclitaxel, docetaxel, vinorelbine, irinotecan, irinotecan hydrochloride, and the like.

Examples of molecular targeted agents include, but are not limited to, afatinib, erlotinib, gefitinib, cetuximab, panitumumab, necitumumab, crizotinib, alectinib, lapatinib, trastuzumab, trastuzumab emtansine, pertuzumab, bevacizumab, axitinib, sunitinib, sorafenib, pazopanib, regorafenib, everolimus, temsirolimus, sirolimus, imatinib, dasatinib, nilotinib, bosutinib, ponatinib, ibritumomab tiuxetan, ofatumumab, rituximab, brentuximab vedotin, gemtuzumab ozogamicin, mogamulizumab, alemtuzumab, daratumumab, inotuzumab ozogamicin, denosumab, bortezomib, lenvatinib, vandetanib, ceritinib, ibrutinib, osimertinib, carfilzomib, elotuzumab, ixazomib, palbociclib, olaparib, abemaciclib, gilteritinib, lorlatinib, entrectinib, quizartinib, dacomitinib, venetoclax, cabozantinib, obinutuzumab, blinatumomab, romidepsin, vorinostat, panobinostat, encorafenib, vemurafenib, dabrafenib, binimetinib, trametinib, tocilizumab, siltuximab, infliximab, ramucirumab, and the like.

Examples of immunotherapeutic agents include, but are not limited to, picibanil, krestin, schizophyllan, lentinan, ubenimex, interferon, interleukin, macrophage colony-stimulating factor, granulocyte colony stimulating factor, erythropoietin, lymphotoxin, BCG vaccine, *Corynebacterium parvum*, levamisole, polysaccharide K, procodazole, ipilimumab, tremelimumab, nivolumab, pembrolizumab, spartalizumab, cemiplimab, avelumab, atezolizumab, durvalumab, and the like.

An immunotherapeutic agent may be an immune checkpoint inhibitor. Examples of target molecules for immune checkpoint inhibitors include CTLA-4, PD-1, LAG-3, BTLA, KIR, TIM-3, PD-L1, PD-L2, B7-H3, B7-H4, HVEM, GAL9, CD160, VISTA, BTNL2, TIGIT, PVR, BTN1A1, BTN2A2, BTN3A2, CSF-1R, and the like. The target molecule for the immune checkpoint inhibitor may be CTLA-4, PD-1 or PD-L1. Anti-CTLA-4 antibodies include ipilimumab, tremelimumab, and the like. Examples of anti-PD-1 antibodies include nivolumab, pembrolizumab, spartalizumab, semiplimab, and the like, and examples of anti-PD-L1 antibodies include avelumab, atezolizumab, durvalumab, and the like.

Examples of hormone therapeutic agents include, but are not limited to, fosfestrol, diethylstilbestrol, chlorotrianisene, medroxyprogesterone acetate, megestrol acetate, chlormadinone acetate, cyproterone acetate, danazol, allylestrenol, gestrinone, mepartricin, raloxifene, ormeloxifene, levormeloxifene, antiestrogens (e.g., tamoxifen citrate, toremifene citrate, etc.), pill formulations, mepitiostane, testololactone, aminoglutethimide, LH-RH agonists (e.g., goserelin acetate, buserelin, leuprorelin, etc.), droloxifene, epitiostanol, ethinyl estradiol sulfonate, aromatase inhibitors (e.g., fadrozole hydrochloride, anastrozole, letrozole, exemestane, vorozole, formestane, etc.), antiandrogens (e.g., flutamide, bicalutamide, nilutamide, etc.), 5α-reductase inhibitors (e.g., finasteride, epristeride, etc.), corticosteroids (e.g., dexamethasone, prednisolone, betamethasone, triamcinolone etc.), androgen synthesis inhibitors (e.g., abiraterone, etc.), and the like.

The retinoid and the cancer therapeutic agent used in the first medicament of the present invention may be co-administered to the subject or separately administered to the subject with a certain time interval between each administration. The term "administered in combination" as used herein, means that the period of applying the retinoid overlaps with the period of applying the cancer therapeutic agent, and does not require the simultaneous administration. In the first medicament of the present invention, it is preferable to start the administration of the retinoid in advance and then to start the administration of the cancer therapeutic agent with a time lag. The time difference between the start of retinoid administration and the start of cancer treatment is not particularly limited, but the time difference may be 1 day or more, 2 days or more, 3 days or more, 4 days or more, 5 days or more, 6 days or more, 7 days or more. The dosage of the cancer therapeutic agent may be determined in accordance with its clinically approved dosage, and is appropriately selected depending on the subject, the age and body weight of the subject, the symptom, the duration of the administration, the dosage form, the administration method, the combination of the drugs, etc.

[Medicament Comprising Composition that Overexpresses Meflin as Active Ingredient]

The present invention provides a medicament for enhancing the action of a cancer therapeutic agent, which comprises a composition that overexpresses meflin in tumor tissue cells as an active ingredient (hereinafter, referred to as "second medicament of the present invention"). The subject of the administration of the second medicament of the present invention is the same cancer patient as the subject of the administration of the first medicament of the present invention, who has a malignant tumor with the infiltration of CAF in the stroma. Therefore, the subject of the administration of the second medicament of the present invention can be selected by the above-mentioned method for selecting a cancer patient of the present invention.

As a composition that overexpresses meflin in tumor tissue cells, a composition comprising a plasmid vector, a viral vector, or the like into which DNA encoding meflin is expressively inserted can be preferably used. The base sequence of the gene encoding meflin can be easily obtained from a known database (NCBI, etc.). For example, the accession number of the base sequence of the human meflin gene (ISLR) is NM 201526.2 or NM 005545.4. A plasmid vector or viral vector expressing meflin can be prepared by using a known genetic engineering technique based on the obtained nucleotide sequence of the human meflin gene (ISLR).

When a composition that overexpresses meflin in tumor tissue cells is administered in the form of a non-viral vector, a method for introducing a meflin-expressing plasmid using a liposome (liposome method, HVJ-liposome method, cationic liposome method, lipofection method, lipofectamine method, etc.), a microinjection method, a method for transferring a meflin-expressing plasmid into a cell together with a carrier (metal particles) using a gene gun, and the like can be used. When administered in the form of a viral vector, the meflin gene can be introduced by introducing the meflin expression cassette into a DNA or RNA virus such as a detoxified retrovirus, adenovirus, adeno-associated virus, herpes virus, vaccinia virus, pox virus, polio virus, Sindbis virus, Sendai virus, SV40, and then infecting the target tumor with a viral vector. A viral vector containing the meflin gene is preferable as an active ingredient of the second medicament of the present invention.

The dose of the composition that overexpresses meflin in tumor tissue cells is preferably set appropriately in consideration of the type of vector, expression efficiency, tumor size, and the like.

Since the second medicament of the present invention is a medicament for enhancing the action of a cancer therapeutic agent, it is preferably administered in combination with the cancer therapeutic agent. The cancer therapeutic agent to be combined is the same as the cancer therapeutic agent used in the first medicament of the present invention mentioned above.

[Combination Medicament of Agent that Induces Inhibition of Lysyl Oxidase Activity in Stroma of Cancer and Cancer Therapeutic Agent]

The present invention provides a medicament for treating cancer, which is administered in combination of an agent that induces the suppression of the lysyl oxidase activity in the stroma of cancer and a cancer therapeutic agent (hereinafter, referred to as "the third medicament of the present invention"). The subject administered the third medicament of the present invention is the same cancer patient as the subject administered the first medicament of the present invention, who has a malignant tumor with the infiltration of CAF in the stroma. Therefore, the subject of the administration of the third medicament of the present invention can be selected by the above-mentioned method for selecting a cancer patient of the present invention.

Lysyl oxidase (hereinafter, referred to as "LOX") is a copper-containing amine oxidase that oxidizes a primary amine substrate to a reactive aldehyde. Lysyl oxidase catalyzes the oxidative deamination of peptidyllysine and hydroxylysine residues in collagen and peptidyllysine residues in elastin and is essential for the formation of the extracellular matrix. The resulting peptidyl aldehyde spontaneously condenses and undergoes an oxidation reaction to form lysine-derived covalent crosslinks required for the normal structural integrity of the extracellular matrix.

The agent that induces the suppression of the LOX activity in the stroma of cancer may be an agent that directly inhibits LOX or an agent that indirectly inhibits LOX. Examples of agents that directly inhibits LOX include LOX inhibitors and anti-LOX neutralizing antibodies. Examples of LOX inhibitors include antibodies disclosed in WO2011097513 such as simtuzumab; compounds disclosed in WO2016144703 such as GB2064; compounds disclosed in WO2020024017 such as PXS-5505, PXS-5446, PXS-6302; compounds disclosed in WO2017136870 such as PXS-5120A, PXS-5153A, PXS-5129A; azaindole haloallylamine derivatives disclosed in WO2017136871; haloallylamine pyrazole derivatives disclosed in WO2018157190; difluorohaloallylamine derivatives disclosed in WO2021012014; antibody AB-0023 disclosed in WO2011097513, WO2009017833, and US Patent Application Publication No. 2009/0053224; compounds disclosed in U.S. Pat. Nos. 4,965,288, 4,997,854, 4,943,593, 5,021,456, 5,059,714, 5,120,764, 5,182,297, 5,252,608, and US Patent Application Publication No. 2004/0248871; PXS-5382A, PXS-5033A; PAT-1251 (CAS number: 2007885-39-2), and the like. LOX inhibitors also include the primary amines reacting with the carbonyl group of the active site of the lysyl oxidases, including those which generate, after binding with the carbonyl, a product stabilized by resonance, such as the following primary amines: ethylenediamine, hydrazine, phenylhydrazine, and their derivatives, semicarbazide, and urea derivatives, aminonitriles, such as β-aminopropionitrile (BAPN), or 2-nitroethylamine, unsaturated or saturated haloamines, such as 2-bromo-ethylamine, 2-chloroethylamine, 2-trifluoroethylamine, 3-bromopropylamine, p-halobenzylamines, and selenohomocysteine lactone. Additional LOX inhibitors include indirect inhibitors such compounds blocking the aldehyde derivatives originating from the oxidative deamination of the lysyl and hydroxylysyl residues by the lysyl oxidases, such as the thiolamines, for example, D-penicillamine, or its analogues such as 2-amino-5-mercapto-5-methylhexanoic acid, D-2-amino-3-methyl-3-((2-acetamidoethyl)dithio)butanoic acid, p-2-amino-3-methyl-3-((2-aminoethyl)dithio)butanoic acid, sodium-4-((p-1-dimethyl-2-amino-2-carboxyethyl)dithio)butane sulphinate, 2-acetamidoethyl-2-acetamidoethanethiol sulphanate, sodium-4-mercaptobutanesulfinate trihydrate.

Examples of agents that indirectly inhibit LOX include agents that induce the expression of meflin in cancer-associated fibroblasts in the stroma of malignant tumors. The inventors have confirmed that meflin inhibits the LOX activity (see Example 14). In addition, the present inventors have confirmed that treatment of pancreatic stellate cells and mesenchymal stem cells, which are considered to be CAF origin cells, with a retinoid increases the expression level of the meflin gene (see Examples 4 and 5); and that when retinoid is administered to mice in which pancreatic cancer cells are subcutaneously transplanted to form a tumor, the expression of the meflin gene in the tumor is significantly increased (Example 6). Therefore, a retinoid used in the first medicament of the present invention can be suitably used as an agent that indirectly inhibits LOX. When a retinoid is used for the third medicament of the present invention, the retinoid can be carried out in the same manner as the first medicament of the present invention.

Furthermore, a composition, which overexpresses meflin in tumor tissue cells and is the active ingredient of the second medicament of the present invention, can also be suitably used as an agent that indirectly inhibits LOX. Specific examples include a composition comprising a plasmid vector, a viral vector, etc. into which DNA encoding meflin is expressively inserted can be preferably used. When a composition that overexpresses meflin in tumor tissue cells is used as the third medicament of the present invention, the composition can be carried out in the same manner as the second medicament of the present invention.

LOX is known to have cross-linking activity among collagen molecules. It is considered that the cross-linking of collagen molecules increases the strength of collagen fibers and hardens the tissue. Therefore, inhibiting or suppressing the LOX function in the stroma of cancer may suppress hardening of cancer tissue, dilate tumor blood vessels, improve delivery of the concomitant cancer therapeutic agent to the tumor, and enhance the effect of the cancer therapeutic agent. The present inventors refer to this concept as "stromal conditioning", and believe that the therapeutic effect can be enhanced by administering a cancer therapeutic agent after subjecting the target tumor to "stromal conditioning" in advance. Therefore, the agent that induces the suppression of the LOX activity in the stroma of cancer used in the third medicament of the present invention can be referred to as a medicament having a "stromal conditioning" effect.

It can be said that the agent used in the third medicament of the present invention that induces the suppression of the LOX activity in the stroma of cancer is an active ingredient of a medicament for enhancing the action of a concomitant cancer therapeutic agent, and is also an active ingredient of a medicament for promoting the delivery of a concomitant cancer therapeutic agent to a target tumor tissue. Therefore, the present invention includes a medicament for enhancing the action of a cancer therapeutic agent, wherein a cancer patient having a malignant tumor with the infiltration of CAF in the stroma is a patient and an agent that induces the suppression of the lysyl oxidase activity in the stroma of cancer is an active ingredient. Further, the present invention includes a medicament for promoting the delivery of a cancer therapeutic agent to a target tumor tissue, wherein a cancer patient having a malignant tumor with the infiltration of CAF in the stroma is a patient and an agent that induces the suppression of the lysyl oxidase activity in the stroma of cancer is an active ingredient.

The cancer therapeutic agent used in the third medicament of the present invention is the same as the cancer therapeutic agent used in the first medicament of the present invention mentioned above.

The agent for inducing the suppression of the lysyl oxidase activity in the stroma of cancer and the cancer therapeutic agent used in the third medicament of the present invention may be co-administered to the subject or separately administered to the subject with a certain time interval between each administration. The term "administered in combination" as used herein, means that the period of the agent for inducing the suppression of the lysyl oxidase activity in the stroma of cancer overlaps with the period of the cancer therapeutic agent, and does not require the simultaneous administration. In the third medicament of the present invention, it is preferable to start the administration of the agent for inducing the suppression of the lysyl oxidase activity in the stroma of cancer in advance and then to start the administration of the cancer therapeutic agent with a time lag. The time difference between the start of the agent for inducing the suppression of the lysyl oxidase activity in the stroma of cancer and the start of the cancer therapeutic agent is not particularly limited, but the time difference may be 1 day or more, 2 days or more, 3 days or more, 4 days or more, 5 days or more, 6 days or more, 7 days or more.

Examples of agents that do not involve LOX inhibition but have a "stroma conditioning" effect include hyaluronidase preparations such as PEGylated hyaluronan degrading enzyme PEGPH2O disclosed in WO2012012300; hyaluronic acid synthesis inhibitors such as 4-methylumbelliferone derivatives disclosed in US20180201640; hedgehog signaling inhibitors such as IPI-926 (patidegib, saridegib) disclosed in WO2006026430, sonidegib (Odomzo) disclosed in WO2007131201, vismodegib (erivedge) disclosed in WO2006028958, disclosed in US2009005416 PF-04449913 (Daurismo), LY-2940680 (taladegib) disclosed in WO2010147917, NLM-001 disclosed in WO2009107850, 4SC-208 disclosed in WO2014001464; stromal cell-derived factor 1 inhibitors, such as nucleic acid drugs NOX-A12 disclosed in WO2008009437, WO2009019007, WO2012031773; compound USL-311 disclosed in WO2012049277, WO2016157149, the compound LIT-927 disclosed in WO2018011376; hypoxia inducible factor 1-alpha inhibitors such as compound IDF-11774 disclosed in WO2013048164, compound PX-478 disclosed in WO2005007828; and hypoxia inducible factor 2-alpha inhibitors such as compound PT-2977 (belzutifan) disclosed in WO2015035223. The present invention also includes such a combination medicament of an agent having an "interstitial conditioning" effect without LOX inhibition and a cancer therapeutic agent.

The present invention includes each of the following inventions.
(1) A method for treating a cancer, which comprises the cancer patient selected by the method according to the present invention mentioned above is administered in combination of a retinoid and a cancer therapeutic agent.
(2) A method for treating a cancer, which comprises the cancer patient selected by the method for selecting a cancer patient according to the present invention mentioned above is administered in combination of an agent that induces the suppression of the lysyl oxidase activity in the stroma of cancer and a cancer therapeutic agent.
(3) A method for enhancing the action of a cancer therapeutic agent, which comprises the patient selected by the method for selecting a cancer patient according to the present invention mentioned above and receiving cancer therapeutic agents is administered a retinoid, a composition that overexpresses meflin in tumor tissue cells or an agent that induces the suppression of the lysyl oxidase activity in the stroma of cancer.
(4) A method for promoting the delivery of a cancer therapeutic agent to a target tumor tissue, which comprises the patient selected by the method for selecting a cancer patient according to the present invention mentioned above and receiving cancer therapeutic agents is administered in combination of a retinoid or an agent that induces the suppression of the lysyl oxidase activity in the stroma of cancer.
(5) Use of a retinoid or an agent that induces the suppression of the lysyl oxidase activity in the stroma of cancer for the manufacture of a cancer therapeutic agent, wherein the subject is a patient selected by the method for selecting a cancer patient according to the present invention mentioned above and is receiving cancer therapeutic agents.
(6) Use of a retinoid, a composition that overexpresses meflin in tumor tissue cells, or an agent that induces the suppression of the lysyl oxidase activity in the stroma of cancer for the manufacture of an agent for enhancing the action of a cancer therapeutic agent, wherein the subject is a patient selected by the method for selecting a cancer patient according to the present invention mentioned above and is receiving cancer therapeutic agents.
(7) Use of a retinoid or an agent that induces the suppression of the lysyl oxidase activity in the stroma of cancer for the manufacture of an agent for promoting the delivery of a cancer therapeutic agent to a target tumor tissue, wherein the subject is a patient selected by the method for selecting a cancer patient according to the present invention mentioned above and is receiving cancer therapeutic agents.
(8) A kit for cancer treatment comprising a retinoid and a cancer therapeutic agent, wherein the retinoid and the cancer therapeutic agent are contained in separate containers, and the cancer patient selected by the method for selecting a cancer patient according to the present invention mentioned above.
(9) A retinoid for use in cancer therapy, wherein the patient is selected by the method for selecting a cancer patient according to the present invention mentioned above and is receiving cancer therapeutic agents.
(10) An agent that induces the suppression of the lysyl oxidase activity in the stroma of cancer for use in cancer therapy, wherein the patient is selected by the method for selecting a cancer patient according to the present invention mentioned above and is receiving cancer therapeutic agents.
(11) Use of a retinoid, a composition that overexpresses meflin in tumor tissue cells, or an agent that induces the suppression of the lysyl oxidase activity in the stroma of cancer, for enhancing the action of a cancer therapeutic agent, wherein the patient is selected by the method for selecting a cancer patient according to the present invention mentioned above and is receiving cancer therapeutic agents.
(12) Use of a retinoid or an agent that induces the suppression of the lysyl oxidase activity in the stroma of cancer, for promoting the delivery of a cancer therapeutic agent to a target tumor tissue wherein the patient is selected by the method for selecting a cancer patient according to the present invention mentioned above and is receiving cancer therapeutic agents.

EXAMPLES

Hereinafter, the present invention is described in detail by examples, but the present invention is not limited thereto.

Example 1: Determination of Malignant Tumor with Infiltration of CAF in Stroma by HE Staining A tissue specimen is prepared according to a conventional method from the tumor tissue obtained by surgery or biopsy, and HE staining is performed. A pathologist examines the HE-stained specimen under a microscope and determines the presence or absence of CAF morphologically.

FIGS. 1 to 4 show examples of pancreatic tumors with the infiltration of CAF in the stroma in surgical specimens. FIG. 1 is anaplastic cancer, FIG. 2 is intraductal papillary mucinous adenocarcinoma, and FIGS. 3 and 4 are tubular glandular cancers. In FIGS. 1 to 4, the arrows indicate the positions of the CAFs. In addition, examples of pancreatic tumors without the infiltration of CAF in the stroma in surgical specimens are shown in FIGS. 5 to 14. FIGS. 5 and 6 are adenocarcinomas, FIG. 7 is intrapancreatic papillary mucinous adenoma (non-invasive cancer), FIG. 8 is intrapancreatic papillary mucinous adenoma (IPMA), and FIG. 9 is mucinous cyst tumor. FIG. 10 is neuroendocrine tumor (G1, insulinoma), FIG. 11 is neuroendocrine tumor (G1, gastrinoma), FIG. 12 is pancreatic intraepithelial neoplastic lesion (PanIN), FIG. 13 is serous cyst adenoma, and FIG. 14 is pseudopapillary tumor (SPN). In any figure, the magnification of the microscope is 100× for the upper row and 200× for the lower row.

FIGS. 15 to 17 show examples of pancreatic tumors with the infiltration of CAF in the stroma in biopsy specimens. FIG. 15 is tubular adenocarcinoma, FIG. 16 is anaplastic cancer, and FIG. 17 is intraductal papillary mucous adenocarcinoma (invasive cancer). In addition, examples of pancreatic tumors without the infiltration of CAF in the stroma in biopsy specimens are shown in FIGS. 18 to 21. FIG. 18 is acinar cell carcinoma, FIG. 19 is solid pseudopapillary tumor (SPN), FIG. 20 is neuroendocrine tumor, and FIG. 21 is intraductal papillary mucinous adenoma (IPMA). In any figure, the magnification of the microscope is 100× for the upper row and 200× for the lower row.

Example 2: Determination of Malignant Tumor with Infiltration of CAF in Stroma by IHC or ISH Tissue specimens prepared from tumor tissue obtained by surgery or biopsy are subjected to IHC using an antibody against the marker molecule of CAF or ISH using a probe hybridizing to the mRNA of the marker molecule of CAF. The presence or absence of a positive signal is determined by observation under a microscope. In this example, meflin is adopted as a marker molecule of CAF, and IHC using an anti-meflin antibody and ISH using a probe hybridizing to mRNA of the meflin gene are performed.

FIGS. 22 and 23 show examples of a meflin-positive pancreatic tumor, and FIG. 24 shows an example of a meflin-negative pancreatic tumor. Any figure is an image obtained by performing IHC and ISH on the same sample, and the high magnification is high-magnification field (400×). In FIGS. 22 and 23, the arrows indicate the location of positive cells. In the IHC high-magnification image of FIG. 24, deeply stained round cells are non-specific reactions to necrotic cells.

Example 3: Effect of Tumor Shrinkage by Tamibarotene on Malignant Tumors with Infiltration of CAF in Stroma (1) Experimental Method Human pancreatic cancer cells BxPC-3 ($1.0 \times 10^6$ cells) are subcutaneously transplanted into BALB/c-nu female nude mice to form a cancer cell single transplant group. In addition, human pancreatic cancer cells BxPC-3 ($1.0 \times 10^6$ cells) and human pancreatic stellate cells ($5.0 \times 10^6$ cells) are subcutaneously transplanted into BALB/c-nu female nude mice to form a co-transplant group. Pancreatic stellate cells are pancreatic fibroblasts and are considered to be the origin cells of CAF. The cancer cell single transplantation group and co-transplantation group are each divided into two groups, a gemcitabine (Gem) and tamibarotene (AM80) administration group (Gem+AM80 group) and a Gem and DMSO administration group (Gem+DMSO group). AM80 (3.0 mg/kg) or DMSO is orally administered daily from the 3rd day to the 14th day after transplantation. Gem (50 mg/kg) is administered intraperitoneally once every 3 days from the 6th day after transplantation. Tumor volume is measured 15 days after transplantation. The protocol is shown in FIG. 25.

(2) Results

The results are shown in FIG. 26. (A) is the result of the cancer cell single transplant group, and (B) is the result of the co-transplant group. In the cancer cell single transplant group, no significant difference is observed between the Gem+AM80 group and the Gem+DMSO group. In the co-transplant group, a significant reduction effect is obtained in the Gem+AM80 group. This result indicates that AM80 enhances the tumor shrinkage effect of anticancer agents in a malignant tumor with the infiltration of CAF in the stroma.

Example 4: Effect of Reprogramming by Retinoid on Human Pancreatic Stellate Cells and Mouse Mesenchymal Stem Cells (1) Experimental Method The primary human pancreatic stellate cells used are those provided by Dr. Masamune, Tohoku University. The primary mouse mesenchymal stem cells used are those purchased from Cyagen Co., Ltd. Both pancreatic stellate cells and mesenchymal stem cells are considered to be the origin of CAF. As the retinoid, the retinoid contained in SCREEN-WELL Nuclear Receptor ligand library (ENZO) is used. DMEM+10% FBS is used as a culture medium. The cells are seeded in a collagen-coated dish and cultured until they are 100% confluent, and various retinoids are added to a concentration of 1 µM. After 48 hours, cells are harvested, RNA is extracted using RNeasyPLUS KIT (QIAGEN), and cDNA is synthesized using ReverseTra Ace qPCR RT Master Mix (TOYOBO). The expression level of the meflin gene (ISLR and Islr) is measured by qPCR using the Gene expression assay (Thermo Fisher scientific).

(2) Results

The results of the primary human pancreatic stellate cells are shown in Table 1. The ISLR expression level is shown as a relative expression level when the ISLR expression level of the control (DMSO-treated cells) is 1. All retinoids used increase the ISLR expression level. Here, the marker for tumor-promoting CAF is αSMA (gene name: ACTA2), the marker for tumor-suppressive CAF is meflin (gene name: ISLR), and the expression levels of both markers in CAF are inversely proportional. Therefore, this result indicates that retinoids reprogram human tumor-promoting CAF into tumor-suppressive CAF.

TABLE 1

| Retinoid | ISLR expression level (mean value) |
|---|---|
| BADGE | 5089.576 |
| AM580 | 3625.326 |
| ATRA | 217.5011 |
| Acitretin | 47.59336 |

TABLE 1-continued

| Retinoid | ISLR expression level (mean value) |
| --- | --- |
| TTNPB | 15.93748 |
| 13-cis Retinoic | 7.251799 |
| 9-cis Retinoic acid | 4.894304 |
| Retinyl acetate | 3.289829 |
| 4-Hydroxyretinoic acid | 3.263734 |
| DMSO (control) | 1 |

The results of the primary mouse mesenchymal stem cells are shown in Table 2. The Islr expression level is shown as a relative expression level when the Islr expression level of the control (DMSO-treated cells) is 1. All retinoids used increase Islr expression. Here, the marker for tumor-promoting CAF is αSMA (gene name: Acta2), the marker for tumor-suppressive CAF is meflin (gene name: Islr), and the expression levels of both markers in CAF are inversely proportional. Therefore, this result indicates that retinoids reprogram mouse tumor-promoting CAF into tumor-suppressive CAF.

TABLE 2

| Retinoid | Islr expression level (mean value) |
| --- | --- |
| Acitretin | 7.65939471 |
| Adapalene | 5.4284275 |
| AM580 | 5.294880522 |
| TTNPB | 5.183251296 |
| 4-Hydroxyretinoic acid | 1.912238184 |
| ATRA | 1.692915345 |
| DMSO (control) | 1 |

Example 5: Effect of Reprogramming by Retinoid on Mouse Mesenchymal Stem Cells (1) Experimental Method The same method is performed as in the experiment using the primary mouse mesenchymal stem cells in Example 4. ATRA, AM80 and AM580 are used as retinoids. The expression levels of the meflin gene (Islr), actin gene (Acta2), type I collagen gene (Col1a1) and type III collagen gene (Col3a1) are measured by qPCR.

(2) Results

The results are shown in FIG. 27. (A) is the result of the meflin gene (Islr), (B) is the result of the actin gene (Acta2), (C) is the result of the type I collagen gene (Col1a1), and (D) is the result of the type III collagen gene (Col3a1). In control (DMSO), the expression levels of Acta2, Col1a1 and Col3a1 are high, and those of Islr are low. On the other hand, in the retinoid (ATRA, AM80 and AM580) treatment group, the expression levels of Islr are high and those of Acta2, Col1a1 and Col3a1 are low. This result indicates that tumor-promoting CAF is reprogrammed into tumor-suppressive CAF by retinoids.

Example 6: Effect of Tamibarotene (AM80) on Mouse Pancreatic Cancer Cells (1) Experimental Method Pancreatic cancer cell mT5, which was distributed by Dr. David Tuveson, Cold Spring Harbor Laboratory, is used. mT5 is a pancreatic cancer cell established from a pancreatic tumor developed in KPC mice, which is a pancreatic cancer spontaneous onset model (Organoid models of human and mouse ductal pancreatic cancer. Cell. 2015 Jan. 15; 160 (1-2)): 324-38. Doi: 10.1016/j. cell. 2014.12.021. Epub 2014 Dec. 31.).

C57BL/6J female mice are subcutaneously transplanted with mouse pancreatic cancer cells mT5 ($1.0 \times 10^6$ cells). Eight days later (Day 8), AM80 is orally administered for 15 days to mice in which tumor formation was confirmed. Depending on the dose of AM80 (0.1 mg/kg/day, 0.5 mg/kg/day, 1 mg/kg/day and 3 mg/kg/day), a total of 5 groups, namely, four AM80 administration groups and a control group (DMSO administration) are set up (n=5 in each group). Body weight and tumor volume are measured before the start of the AM80 administration (Day 8), Day 11, Day 15, Day 18 and Day 22. On Day 22, mice are euthanized, tumors are removed to prepare tissue specimens, the in situ hybridization (ISH) is performed to detect the expression of the meflin gene (Islr) and the actin gene (Acta2), and then the number of positive signals is counted for each. Furthermore, a tissue specimen of the tumor is prepared, immunostaining is performed with an anti-CD31 antibody to stain CD31, which is a marker for vascular endothelial cells, and the vascular lumen area is measured. The protocol is shown in FIG. 28.

(2) Results (2-1) Tumor Volume

The trends of tumor volume are shown in FIG. 29. There is no significant difference among the groups, and the administration of any concentration of AM80 does not suppress the growth of pancreatic cancer cells. In addition, the administration of AM80 does not affect the body weight of the mice.

(2-2) Expression of Meflin Gene (Islr) in Tumor

The results of the ISH detection of the Islr expression in tumor specimens are shown in FIG. 30. (A) is a representative microscopic image of the control group, (B) is a representative microscopic image of the AM80 3 mg/kg/day group, and (C) is a figure comparing the number of dots of the Islr positive signal per high-magnification field (400×) in the control and 3 mg/kg/day of AM80 groups. The expression of Islr, which is a marker for inhibitory CAF, is increased by the administration of AM80, and the number of dots of the Islr positive signal in the AM80 3 mg/kg/day group is significantly higher than that in the control group.

(2-3) Expression of Actin Gene (Acta2) in Tumor

The results of the ISH detection of Acta2-expressing cells in tumor specimens are shown in FIG. 31. (A) is a representative microscopic image of the control group, (B) is a representative microscopic image of the AM80 3 mg/kg/day group, (C) is a figure comparing the number of dots of the Islr-positive signal per high-magnification field (400×) between the control group and the AM80 3 mg/kg/day group. The expression of Acta2, which is a marker for promoting CAF, is reduced by the administration of AM80, and the number of dots of the Acta2 positive signal in the AM80 3 mg/kg/day group is significantly lower than that in the control group.

(2-4) Immunostaining of Tumor Specimens with Anti-CD31 Antibody

The results of the immunostaining of tumor specimens with anti-CD31 antibody are shown in FIG. 32. (A) is a representative microscopic image of the control group, (B) is a representative microscopic image of the 3 mg/kg/day group of AM80, and (C) is a figure comparing the vascular lumen area between the control group and the 3 mg/kg/day AM80 group. The vascular lumen area in the AM80 3 mg/kg/day group is significantly higher than that in the control group.

(2-5) Summary

Since tumors formed by subcutaneous transplantation of mouse pancreatic cancer mT5 cells in C57BL/6J female mice express Islr or Acta2, which is a marker for CAF, they are judged to be malignant tumors with the infiltration of CAF in the stroma. The results of Example 6 indicate that in the presence of cancer-promoting CAFs (control group, Acta2 positive), the stromal pressure is high and blood vessels are considered to be crushed by the pressure. When AM80 treatment reprograms the tumor-suppressive CAF (Islr-positive), collagen production and the like are altered and interstitial remodeling occurs, resulting in opening the crushed blood vessels due to a decrease in the stromal pressure.

Example 7: Effect of Combined Use of Tamibarotene and Gemcitabine on Mouse Pancreatic Cancer Cells (1) Experimental Method C57BL/6J female mice are subcutaneously transplanted with mouse pancreatic cancer cells mT5 ($1.0 \times 10^6$ cells). Eight days later (Day 8), the mice are divided into three groups, a control group, a gemcitabine administration group (Gem group), and a gemcitabine and tamibarotene administration group (Gem+AM80 group), to ensure equal tumor volume (n=8 in each group). In the Gem+AM80 group, tamibarotene (3.0 mg/kg) is orally administered once a day for 17 days from Day 8. In addition, in the Gem group and the Gem+AM80 group, gemcitabine (50 mg/kg) is intraperitoneally administered once each on Day 15, Day 18 and Day 21. In the control group, DMSO is orally administered instead of tamibarotene, and saline is intraperitoneally administered instead of gemcitabine. Tumor volume is measured before start of the AM80 administration (Day 8), Day 12, Day 15, Day 18, Day 21 and Day 24. The protocol is shown in FIG. 33.

(2) Results

The results are shown in FIG. 34. FIG. 34 shows that the Gem group more significantly suppresses the tumor growth than the control group, and the Gem+AM80 group more significantly suppresses the tumor growth than the Gem group. This result indicates that tamibarotene significantly enhances the tumor growth inhibitory effect of gemcitabine.

Example 8: Effect of Combined Use of Tamibarotene, Gemcitabine and Nab-Paclitaxel on Human Pancreatic Cancer Cells (1) Experimental Method BALB/c-nu female nude mice are subcutaneously transplanted with human pancreatic cancer cells BxPC-3 ($1.0 \times 10^6$ cells). When the tumor volume reaches 50 to 150 mm$^3$, the mice are divided into 3 groups, a control group, a gemcitabine and nab-paclitaxel administration group (Gem+nabPTX group), and the gemcitabine+nab-paclitaxel and tamibarotene administration group (Gem+nabPTX+AM80 group) to ensure equal tumor volume (n=7 in each group). In the Gem+nabPTX+AM80 group, tamibarotene (3.0 mg/kg) is orally administered once a day for 17 days from the day of grouping (Day 1). In the Gem+nabPTX group and the Gem+nabPTX+AM80 group, gemcitabine (50 mg/kg) is intraperitoneally administered once each on Days 7, 10 and 13, and nab-paclitaxel (5 mg/kg) is intravenously administered once each on Days 7, 10 and 13. In the control group, DMSO is orally administered instead of tamibarotene, saline is intraperitoneally administered instead of gemcitabine, and saline is intravenously administered instead of nab-paclitaxel. Tumor volume is measured before the start of the AM80 administration (Day 1), Day 4, Day 7, Day 10, Day 13 and Day 16. The protocol is shown in FIG. 35.

(2) Results

The results are shown in FIG. 36. FIG. 36 shows that the Gem+nabPTX group more significantly suppresses the tumor growth than the control group, and the Gem+nabPTX+AM80 group more significantly suppresses the tumor growth than the Gem+nabPTX group. This result indicates that tamibarotene further significantly enhances the tumor growth inhibitory effect of the combination of gemcitabine and nab-paclitaxel.

Example 9: Effect of Combined Use of Tamibarotene and Gemcitabine in a Mouse Spontaneous Pancreatic Cancer Onset Model (KPC Mouse)

(1) Experimental Method

Tamibarotene (3.0 mg/kg) is orally administered once a day for 17 days from the time (Day 1) when the pancreatic tumor length is confirmed to be 1 mm or more by abdominal ultrasonography in a mouse model of spontaneous pancreatic cancer (KPC mice) (S. R. Hingorani et al., Trp53R172H and KrasG12D cooperate to promote chromosomal instability and widely metastatic pancreatic ductal adenocarcinoma in mice. Cancer Cell 7, 469-483 (2005)). In the gemcitabine and tamibarotene administration group (Gem+AM80 group, n=5), gemcitabine (50 mg/kg) is intraperitoneally administered once each on Day 7, Day 10 and Day 13. In the control group (Gem group, n=5), gemcitabine (50 mg/kg) is intraperitoneally administered once each on Day 7, Day 10 and Day 13, but tamibarotene is not administered. The tumor major axis is measured before the start of the AM80 administration (Day 1), Day 8, Day 15 and Day 22. The protocol is shown in FIG. 37.

(2) Results

The results are shown in FIG. 38. FIG. 38 shows that the Gem+AM80 group more significantly suppresses the tumor growth than the control group (Gem group). KPC mice have more abundant stroma with the infiltration of CAF and are the closest mouse model to human pancreatic tumors. It is shown that tamibarotene also significantly enhances the tumor growth inhibitory effect of gemcitabine in this spontaneous onset model.

Example 10: Effect of Combined Use of Tamibarotene and Immune Checkpoint Inhibitor in a Mouse Spontaneous Pancreatic Cancer Onset Model (KPC Mouse)

(1) Experimental Method

The experiment is carried out in the same manner as in Example 9 except that an anti-PD1 antibody or an anti-PDL1 antibody is used instead of gemcitabine. As a result, the combination group of tamibarotene and anti-PD1 antibody or anti-PDL1 antibody more significantly suppresses the tumor growth than the control group (anti-PD1 antibody single administration group or anti-PDL1 antibody single administration group).

Example 11: Effect of Combined Use of Tamibarotene and Gemcitabine in Meflin-Deficient Mice (1) Experimental Method Meflin-deficient mice (Maeda K. et al., Sci Rep. 2016 Feb. 29; 6:22288. doi: 10.1038/srep22288.) are subcutaneously transplanted with mouse pancreatic cancer cells mT5 ($1.0 \times 10^6$ cells). Eight days later (Day 8), the mice are divided into two groups, a gemcitabine single administration group (Gem group, n=6) and a gemcitabine and tamibarotene administration group (Gem+AM80 group, n=6) to ensure equal tumor volume. In the Gem+AM80 group, tamibarotene (3.0 mg/kg) is orally administered once a day for 17 days from Day 8. In the Gem+AM80 group, tamibarotene (3.0 mg/kg) is orally administered once a day for 17 days from Day 8. In the Gem group and the Gem+AM80 group, gemcitabine (50 mg/kg) is intraperitoneally administered once each on Day 15, Day 18 and Day 21. Body weight and tumor volume are measured before the start of the AM80 administration (Day 8), Day 12, Day 15, Day 18, Day 21 and Day 24. Mice are euthanized on Day 24, tumors are removed to prepare tissue specimens, and the in situ hybridization (ISH) is performed to detect the expression of the actin gene (Acta2), and then the number of positive signals is counted for each. The protocol is shown in FIG. 39.

(2) Results (2-1) Tumor Volume

The trends of tumor volume are shown in FIG. 40. There is no significant difference between the both groups, and the combination of gemcitabine and tamibarotene does not suppress the growth of pancreatic cancer cells transplanted into meflin-deficient mice. There is also no significant difference in body weight between the two groups.

(2-2) Expression of Actin Gene (Acta2) in Tumor

The results of the ISH detection of Acta2-expressing cells in tumor specimens are shown in FIG. 41. (A) is a representative microscopic image of the Gem group, (B) is a representative microscopic image of the Gem+AM80 group, and (C) is a figure comparing the number of dots of the Acta2-positive signal per high-magnification field (400×) between the both groups. No difference is observed in the number of dots of the positive signal between the two groups. This result indicates that tamibarotene enhances the effect of a concomitant cancer therapeutic agent via meflin.

Example 12: Preparation of Meflin-Overexpressing Tumor (1) Experimental Method C57BL/6J female mice are subcutaneously transplanted with mouse pancreatic cancer cells mT5 ($1.0 \times 10^6$ cells). When the tumor volume reaches 50 to 100 mm3, the mice are divided into two groups to ensure equal tumor volume (n=7 in each group). Sendai virus (SeV-Meflin) that overexpresses meflin in infected cells and Sendai virus (SeV-GFP) that overexpresses GFP in infected cells are each administered intratumorally on the day of grouping (Day 1), Day 5 and Day 9. After measuring the tumor volume on Day 17, mice are euthanized, tumors are removed to prepare tissue specimens, and the in situ hybridization (ISH) is performed to detect the expression of the meflin gene (Islr). The protocol is shown in FIG. 42.

(2) Results

The results of ISH are shown in FIG. 43. (A) is a representative microscopic image of the SeV-GFP group, and (B) is a representative microscopic image of the SeV-Meflin group. Meflin is overexpressed in the SeV-Meflin group. The trends of tumor volume are shown in FIG. 44. There is no significant difference between the both groups.

Example 13: Effect of Gemcitabine in Meflin-Overexpressing Tumor (1) Experimental Method C57BL/6J female mice are subcutaneously transplanted with mouse pancreatic cancer cells mT5 ($1.0 \times 10^6$ cells). When the tumor volume reaches 50 to 100 mm$^3$, the mice are divided into two groups to ensure equal tumor volume (n=8 in each group). Sendai virus (SeV-Meflin) that overexpresses meflin in infected cells, and Sendai virus (SeV-GFP) that overexpresses GFP in infected cells are each administered intratumorally on the day of grouping (Day 1), Day 5 and Day 9. In addition, gemcitabine (50 mg/kg) is intraperitoneally administered once each on Day 5, Day 8, Day 11 and Day 14. Tumor volume is measured on Day 17. The protocol is shown in FIG. 45.

(2) Results

The results are shown in FIG. 46. The administration of gemcitabine to the SeV-Meflin group suppresses the tumor growth more significantly than the administration of gemcitabine to the SeV-GFP group. This result indicates that the effect of the anticancer agent is enhanced by introducing the meflin gene into the tumor and overexpressing meflin.

When a cancer patient is selected according to the technical ideas of the present invention, retinoids other than tamibarotene exhibit a similar effect when used in combination with gemcitabine. In addition, tamibarotene exhibits a similar effect when used in combination with cancer therapeutic agents other than gemcitabine. In addition, retinoids other than tamibarotene exhibit a similar effect in combination with cancer therapeutic agents other than gemcitabine. These effects can be easily confirmed according to the above examples.

Example 14: Functional Analysis of Meflin, Part 1

(1) Experimental Method

The culture supernatant of the control Flp-In-293 cells or cells stably expressing mouse meflin (referred to as a control condition medium or a meflin condition medium, respectively) is collected. Then, each conditioned medium is mixed with recombinant human LoxL2 at the indicated concentration, and the LOX activity is quantified using the LOX activity assay kit (Abcam, ab112139). LOXL2 is used because recombinant LOX has no activity.

(2) Results

The results are shown in FIG. 47. This result indicates that meflin significantly inhibits the LOX activity.

Example 15: Functional Analysis of Meflin, Part 2

(1) Experimental Method

KPC mice (wild type) and meflin-deficient KPC mice (Maeda K. et al. Identification of Meflin as a potential marker for mesenchymal stromal cells. Sci Rep 2016; 6:22288.), which are a mouse spontaneous pancreatic cancer onset model, are used (n=6 in each group). Mice (15 to 24 weeks old) just prior to tumor death are euthanized and the pancreas is removed to prepare tissue specimens of the tumor. Eight to sixteen images are randomly selected from the tumor tissue specimens, the collagen alignment is measured with a second harmonic microscope, and the coefficient of curvature is calculated to analyze the linearity of collagen.

(2) Results

The results are shown in FIG. 48. (A) is a representative second harmonic microscopic image of the wild-type KPC group, (B) is a representative second harmonic microscopic image of the meflin-deficient KPC group, and (C) is a figure comparing the curvature (linearity) of collagen between the both groups where N is the number of observation fields.

Example 16: Effect of Tamibarotene on Collagen in Stroma of Tumor (1) Experimental Method C57BL/6J female mice are subcutaneously transplanted with mouse pancreatic cancer cells mT5 (1.0×106 cells). Eight days later (Day 8), the mice are divided into two groups, a control group and a tamibarotene administration group (AM80 group) to ensure equal tumor volume (n=5 in each group). In the AM80 group, tamibarotene (3.0 mg/kg) is orally administered once a day for 7 days from Day 8. In the control group, DMSO is orally administered instead of tamibarotene. On Day 15, mice are euthanized, and tumors are removed to prepare tissue specimens. Eight to sixteen images are randomly selected from the tumor tissue specimen, the collagen arrangement is measured with a second harmonic microscope, and the curvature (linearity) is analyzed.

(2) Results

The results are shown in FIG. 49. (A) is a representative second harmonic microscope observation image of the control group, (B) is a representative second harmonic microscope observation image of the AM80 group, and (C) is a figure comparing the curvature (linearity) of collagen between the both groups. This result indicates that the linearity of collagen is significantly increased in the control group. The result suggests that in the AM80 group, the administration of tamibarotene induces the expression of meflin in CAF and inhibits the LOX activity in the stroma, thereby reducing the linearity of collagen.

Example 17: Examination of Effects Depending on Timing of Administration of Tamibarotene and Gemcitabine (1) Experimental Method C57BL/6J female mice are subcutaneously transplanted with mouse pancreatic cancer cells mT5 ($1.0 \times 10^6$ cells). Eight days later (Day 8), the mice are divided into three groups, a gemcitabine single administration group (Gem group), a tamibarotene prior-administration and gemcitabine administration group (AM80 prior-administration+Gem group), and a tamibarotene prior- & co-administration and gemcitabine administration group (AM80 prior- & co-administration+Gem group) to ensure equal tumor volume (n=5 in each group). In the prior administration of tamibarotene, tamibarotene (3.0 mg/kg) is orally administered once a day for 7 days from Day 8. In tamibarotene co-administration, tamibarotene (3.0 mg/kg) is orally administered once a day for 10 days from Day 15. Gemcitabine (50 mg/kg) is intraperitoneally administered once each on Day 15, Day 18 and Day 21. In tamibarotene-free mice (Gem group), DMSO is orally administered on the same day as the prior- & co-administration of tamibarotene. Tumor volume is measured before the start of the AM80 administration (Day 8), Day 12, Day 15, Day 18, Day 21 and Day 24. The protocol is shown in FIG. 50.

(2) Results

The trends of tumor volume are shown in FIG. 51. This result indicates that the AM80 prior-administration+Gem group suppresses the tumor growth to the same extent as the AM80 prior-/co-administration+Gem group.

Example 18: Effect of Combined Use of Tamibarotene, Gemcitabine and Immune Checkpoint Inhibitor (1) Experimental Method C57BL/6J female mice are subcutaneously transplanted with mouse pancreatic cancer cells mT5 ($1.0 \times 10^6$ cells). Eight days later (Day 8), the mice are divided into two groups, an anti-PD-L1 antibody administration group (PDL1 group) and an anti-PD-L1 antibody and tamibarotene administration group (PDL1+AM80 group) to ensure equal tumor volume (n=7 in each group). The day of grouping is designated as Day 1, and tamibarotene (3 mg/kg) is orally administered once a day for 7 days from Day 1. Gemcitabine (100 mg/kg) is intraperitoneally administered on Day 7, and an anti-PD-L1 antibody (10F.9G2) is intraperitoneally administered at 250 µg/mouse on Day 8, Day 10, Day 12, Day 14, Day 16 and Day 18. Tumor volume is measured every other day from Day 1, Day 4, and Day 7 to Day 27. The protocol is shown in FIG. 52. Furthermore, the survival rate until the death of all mice die is determined.

(2) Results

The trends of tumor volume are shown in FIG. 53. This result indicates that the PDL1+AM80 group significantly suppresses the tumor growth compared to the PDL1 group. The trends of the survival rate are shown in FIG. 54. This result indicates that the PDL1+AM80 group has significantly prolonged survival compared to the PDL1 group.

Example 19: Effect of Combined Use of Tamibarotene and Immune Checkpoint Inhibitor (1) Experimental Method C57BL/6J female mice are subcutaneously transplanted with mouse pancreatic cancer cells mT5 ($1.0 \times 10^6$ cells). Eight days later (Day 8), the mice are divided into three groups, a control group, an anti-PD-L1 antibody administration group (PDL1 group), and an anti-PD-L1 antibody and tamibarotene administration group (PDL1+AM80 group) to ensure equal tumor volume (n=7 in each group). The day of grouping is designated as Day 1, and tamibarotene (3 mg/kg) is orally administered once a day for 7 days from Day 1. An anti-PD-L1 antibody (10F.9G2) is intraperitoneally administered at 250 µg/mouse on Day 8, Day 10, Day 12, Day 14, Day 16 and Day 18. An IgG is administered to the control group instead of the anti-PD-L1 antibody. Tumor volume is measured every other day from Day 8 to Day 26. The protocol is shown in FIG. 55. Furthermore, the survival rate until the death of all mice die is determined.

(2) Results

The trends of tumor volume are shown in FIG. 56. This result indicates that the PDL1+AM80 group significantly suppresses the tumor growth compared to the PDL1 group. The trends of the survival rate are shown in FIG. 57. This result indicates that the PDL1+AM80 group has significantly prolonged survival compared to the PDL1 group.

Example 20: Effect of Combined Use of Tamibarotene and Immune Checkpoint Inhibitor on Bladder Cancer (1) Experimental Method C57BL/6J female mice are subcutaneously transplanted with mouse bladder cancer cells MB49 ($1.0 \times 10^6$ cells)(Day 1). Five days later (Day 5), the mice are divided into two groups, an anti-PD-L1 antibody administration group (PDL1 group) and an anti-PD-L1 antibody and tamibarotene administration group (PDL1+AM80 group) to ensure equal tumor volume (n=5 in each group). Tamibarotene (3 mg/kg) is orally administered once a day for 7 days from Day 5. An anti-PD-L1 antibody (10F.9G2) is intraperitoneally administered at 250 µg/mouse on Day 12, Day 15, Day 18 and Day 21. Tumor volume is measured once every 3 days from Day 2 to Day 40. The protocol is shown in FIG. 58.

(2) Results

The trends of tumor volume are shown in FIG. 59. This result indicates that the PDL1+AM80 group significantly suppresses the tumor growth compared to the PDL1 group.

Example 21: Effect of Combined Use of Tamibarotene and Immune Checkpoint Inhibitor on Lung Cancer (1) Experimental Method C57BL/6J female mice are subcutaneously transplanted with LCC-luc ($1.0 \times 10^6$ cells) in which luciferase is forcibly expressed in the Lewis lung carcinoma cell line (LCC), which is a mouse lung cancer cell line (Day 1). Five days later (Day 5), the mice are divided into two groups, an anti-PD-L1 antibody administration group (PDL1 group) and an anti-PD-L1 antibody and tamibarotene administration group (PDL1+AM80 group) to ensure equal tumor volume (n=5 in each group). Tamibarotene (3 mg/kg) is orally administered once a day for 7 days from Day 9. An anti-PD-L1 antibody (10F.9G2) is intraperitoneally administered at 250 µg/mouse on Day 16, Day 19 and Day 22. Tumor volume is measured once every 3 days from Day 9 to Day 40.

(2) Results

The trends of tumor volume are shown in FIG. 60. This result indicates that the PDL1+AM80 group significantly suppresses the tumor growth compared to the PDL1 group.

Example 22: Effect of Combined Use of Tamibarotene and Immune Checkpoint Inhibitor on Gastric Cancer (1) Experimental Method C57BL/6J female mice are subcutaneously transplanted with mouse gastric cancer cell lines YTN5 or YTN16 (1.0 to $5.0 \times 10^6$ cells) (Day 1). Five days later (Day 5), the mice are divided into two groups, an anti-PD-L1 antibody administration group (PDL1 group) and an anti-PD-L1 antibody and tamibarotene administration group (PDL1+AM80 group) to ensure equal tumor volume (n=5 in each group). The administration of tamibarotene is initiated on any of Days 5 to 9. Tamibarotene is orally administered at 3 mg/kg once a day for 7 days. PD-L1 antibody (10F.9G2) is intraperitoneally administered at 250 µg/mouse once every 3 days from the day after the end of the administration of tamibarotene, for 3 or 6 times in total. Tumor volume is measured once every 3 days from the start of the administration of tamibarotene.

The PDL1+AM80 group significantly suppresses the tumor growth compared to the PDL1 group.

Example 23: Effect of Combined Use of Tamibarotene and Immune Checkpoint Inhibitor in Meflin-Deficient Mice (1) Experimental Method Meflin-deficient mice (Maeda K. et al., Sci Rep. 2016 Feb. 29; 6:22288. doi: 10.1038/srep22288.) are subcutaneously transplanted with mouse pancreatic cancer cells mT5 ($1.0 \times 10^6$ cells). Eight days later (Day 8), the mice are divided into three groups, a control group, an anti-PD-L1 antibody administration group (PDL1 group), and an anti-PD-L1 antibody and tamibarotene administration group (PDL1+AM80 group) to ensure equal tumor volume (n=7 in each group). The day of grouping is designated as Day 1, and tamibarotene (3 mg/kg) is orally administered once a day for 7 days from Day 1. An anti-PD-L1 antibody (10F.9G2) is intraperitoneally administered at 250 µg/mouse on Day 8, Day 10, Day 12, Day 14, Day 16 and Day 18. An IgG is administered to the control group instead of the anti-PD-L1 antibody. Tumor volume is measured every other day from Day 8 to Day 26. The protocol is shown in FIG. 61. Furthermore, the survival rate until the death of all mice die is determined.

(2) Results

The trends of tumor volume are shown in FIG. 62. This result indicates that there is no significant difference in the tumor growth inhibitory effect between the PDL1 group and the PDL1+AM80 group. The trends of the survival rate are shown in FIG. 63. This result indicates that there is no significant difference in the survival rate between the PDL1 group and the PDL1+AM80 group.

Example 24: Effect of Combined Use of Tamibarotene and Immune Checkpoint Inhibitor on Gastric Cancer (1) Experimental Method C57BL/6J female mice are subcutaneously transplanted with mouse gastric cancer cell line YTN5 ($5.0 \times 10^6$ cells) (Day 1). Seven days later (Day 7), the mice are divided into two groups, an anti-PD-L1 antibody administration group (PDL1 group) and an anti-PD-L1 antibody and tamibarotene administration group (PDL1+AM80 group) to ensure equal tumor volume (n=6 in each group). The administration of tamibarotene is initiated on Day 7. Tamibarotene is orally administered at 3 mg/kg once a day for 6 days. PD-L1 antibody (10F.9G2) is intraperitoneally administered at 200 µg/mouse once every 3 days from the day after the end of the administration of tamibarotene, for 3 times in total. Tumor volume is measured once every 3 days from the start of the administration of tamibarotene.

(2) Results

The trends of tumor volume are shown in FIG. 64. This result indicates that the PD1+AM80 group significantly suppresses the tumor growth compared to the PD1 group.

The present invention is not limited to each of the embodiments and Examples described above, and various modifications are possible within the scope of the claims. Embodiments obtainable by appropriately combining the technical means disclosed in different embodiments of the present invention are also included in the technical scope of the present invention. The contents of the scientific literature and the patent literature cited herein are hereby incorporated by reference in their entirety.

The invention claimed is:

1. A method for treating a cancer patient, comprising:
selecting a cancer patient for whom a combination therapy with a retinoid and a cancer therapeutic agent is effective having a malignant tumor with an infiltration of cancer-associated fibroblasts (CAFs) in a stroma, wherein the step of selecting the cancer patient comprises preparing a histopathological specimen of a malignant tumor tissue obtained from the cancer patient to be examined and detecting at least one cancer-associated fibroblast under microscopic observation, and
separately administering to the cancer patient the retinoid and the cancer therapeutic agent in the combination therapy to convert the CAFs in the stroma from cancer-promoting CAFs to cancer-suppressing CAFs.

2. The method according to claim 1, wherein the cancer therapeutic agent is selected from the group consisting of a chemotherapeutic agent, a molecular target agent, an immunotherapeutic agent, and a hormone therapeutic agent.

3. The method according to claim 1, wherein the retinoid is tamibarotene.

4. The method according to claim 1, wherein the retinoid is separately administered before the cancer therapeutic agent.

5. A method for enhancing the action of a cancer therapeutic agent and/or for promoting the delivery of the cancer therapeutic agent to a target tumor tissue, comprising:
selecting a cancer patient for whom a combination therapy with a retinoid and the cancer therapeutic agent is effective having a malignant tumor with an infiltration of cancer-associated fibroblasts (CAFs) in a stroma, wherein the step of selecting the cancer patient comprises preparing a histopathological specimen of a malignant tumor tissue obtained from the cancer patient to be examined and detecting at least one cancer-associated fibroblast under microscopic observation, and
separately administering to the cancer patient the retinoid and the cancer therapeutic agent in the combination therapy to convert the CAFs in the stroma from cancer-promoting CAFs to cancer-suppressing CAFs.

6. The method according to claim 5, wherein the cancer therapeutic agent is a chemotherapeutic agent, a molecular target agent, an immunotherapeutic agent or a hormone therapeutic agent.

7. The method according to claim 5, wherein the retinoid is tamibarotene.

8. A method for enhancing an action of a cancer therapeutic agent, comprising:
selecting a cancer patient for whom a combination therapy with a retinoid and the cancer therapeutic agent is effective having a malignant tumor with an infiltration of cancer-associated fibroblasts (CAFs) in a stroma, wherein the step of selecting the cancer patient comprises preparing a histopathological specimen of a malignant tumor tissue obtained from the cancer patient to be examined and detecting at least one cancer-associated fibroblast under microscopic observation, and
separately administering to the cancer patient a composition that overexpresses meflin in tumor tissue cells as an active ingredient and the cancer therapeutic agent in the combination therapy,
wherein the composition that overexpresses meflin is selected from the group consisting of a retinoid, a viral vector containing a meflin gene, and a non-viral vector containing a meflin gene.

9. The method according to claim 8, wherein the cancer therapeutic agent is selected from the group consisting of a chemotherapeutic agent, a molecular target agent, an immunotherapeutic agent, and a hormone therapeutic agent.

10. A method for treating a cancer patient, comprising:
selecting a cancer patient for whom a combination therapy with a retinoid and a cancer therapeutic agent is effective having a malignant tumor with an infiltration of cancer-associated fibroblasts (CAFs) in a stroma, wherein the step of selecting the cancer patient comprises preparing a histopathological specimen of a malignant tumor tissue obtained from the cancer patient to be examined and detecting at least one cancer-associated fibroblast under microscopic observation, and
separately administering to the cancer patient an agent that induces the suppression of the lysyl oxidase activity in the stroma of cancer and the cancer therapeutic agent in the combination therapy,
wherein the agent that induces the suppression of the lysyl oxidase activity in the stroma of cancer is selected from the group consisting of a LOX inhibitor, an anti-LOX neutralizing antibody, a retinoid, a viral vector containing a meflin gene, and a non-viral vector containing a meflin gene.

11. The method according to claim 10, wherein the cancer therapeutic agent is selected from the group consisting of a chemotherapeutic agent, a molecular target agent, an immunotherapeutic agent, and a hormone therapeutic agent.

12. The method according to claim 10, wherein the agent that induces the suppression of the lysyl oxidase activity in the stroma of cancer is separately administered before the cancer therapeutic agent.

13. A method for enhancing an action of a cancer therapeutic agent and/or for promoting the delivery of the cancer therapeutic agent to a target tumor tissue, comprising:
selecting a cancer patient for whom a combination therapy with a retinoid and the cancer therapeutic agent is effective having a malignant tumor with an infiltration of cancer-associated fibroblasts (CAFs) in a stroma, wherein the step of selecting the cancer patient comprises preparing a histopathological specimen of a malignant tumor tissue obtained from the cancer patient to be examined and detecting at least one cancer-associated fibroblast under microscopic observation, and
separately administering to the cancer patient an agent that induces the suppression of the lysyl oxidase activity in the stroma of cancer and the cancer therapeutic agent in the combination therapy,
wherein the agent that induces the suppression of the lysyl oxidase activity in the stroma of cancer is selected from the group consisting of a LOX inhibitor, an anti-LOX neutralizing antibody, a retinoid, a viral vector containing a meflin gene, and a non-viral vector containing a meflin gene.

14. The method according to claim 13, wherein the cancer therapeutic agent is selected from the group consisting of a chemotherapeutic agent, a molecular target agent, an immunotherapeutic agent, and a hormone therapeutic agent.

* * * * *